United States Patent [19]

Sato

[11] Patent Number: 5,598,983
[45] Date of Patent: Feb. 4, 1997

[54] BAITCASTING REEL HAVING A CLUTCH MECHANISM FOR TRANSMITTING A DRIVE FROM A HANDLE TO A SPOOL

[75] Inventor: Jun Sato, Sakai, Japan

[73] Assignee: Shimano Inc., Osaka, Japan

[21] Appl. No.: 248,515

[22] Filed: May 24, 1994

[30] Foreign Application Priority Data

| May 25, 1993 | [JP] | Japan | 5-122261 |
| Aug. 3, 1993 | [JP] | Japan | 5-192093 |
| Aug. 3, 1993 | [JP] | Japan | 5-192094 |

[51] Int. Cl.⁶ ............................................. A01K 89/015
[52] U.S. Cl. ........................................................ 242/261
[58] Field of Search .................................... 242/259, 260, 242/261, 262

[56] References Cited

U.S. PATENT DOCUMENTS

| 4,341,366 | 7/1982 | Kawada | 242/261 |
| 4,512,536 | 4/1985 | Sato | 242/261 |
| 4,557,429 | 12/1985 | Atobe | 242/261 |
| 4,570,878 | 2/1986 | Nakajima | 242/261 |
| 5,222,995 | 6/1993 | Sato | 242/262 |
| 5,318,244 | 6/1994 | Morimoto | 242/261 |
| 5,350,133 | 9/1994 | Morimoto | 242/261 |

FOREIGN PATENT DOCUMENTS

| 59-32284 | 9/1984 | Japan . |
| 60-78526 | 5/1985 | Japan . |
| 4-46550 | 11/1992 | Japan . |

Primary Examiner—Katherine Matecki
Attorney, Agent, or Firm—Knobbe, Martens, Olson & Bear

[57] ABSTRACT

A baitcasting reel includes a spool, right and left frames rotatably supporting the spool therebetween, and a clutch mechanism for selectively allowing, when disengaged, free rotation of the spool and transmitting, when engaged, a dive force from a handle to the spool. The clutch mechanism is disengaged and engaged respectively by a disengaging portion and an engaging portion disposed distantly from each other. The engaging portion and the disengaging portion are disposed between the right and left frames and opposed to the spool.

11 Claims, 35 Drawing Sheets

BAITCASTING REEL HAVING A CLUTCH MECHANISM FOR TRANSMITTING A DRIVE FROM A HANDLE TO A SPOOL

BACKGROUND OF THE INVENTION

1. Field of the Invention

The present invention relates to a baitcasting reel, and more particularly to a baitcasting reel including a spool rotatably supported between right and left frames and a clutch mechanism for selectively allowing, when disengaged, free rotation of the spool or transmitting, when engaged, a drive force from a handle to the spool.

2. Description of the Related Art

A construction for controlling a clutch mechanism of a baitcasting reel is known from e.g. Japanese published utility model gazette Sho. 59-32284. This conventional construction includes a clutch lever for disengaging the clutch mechanism and a clutch return lever for engaging the clutch mechanism. The construction further includes a control system for engaging the clutch mechanism when the handle is operated in a line retrieving direction when the clutch mechanism is disengaged.

Incidentally, in the above-described conventional construction, the clutch lever and the clutch return lever are provided to the side frame mounting the handle, so that the clutch mechanism may be engaged with a left-hand operation of the return lever while gripping a fishing rod with the right hand.

According to the above prior art, for instance, for a lure casting operation, the clutch mechanism is disengaged. Then, immediately after casting the rod with one hand, the clutch mechanism may be engaged with an operation by the other hand, without operating the handle, thereby to restrict excessive feeding of the fishing line and also to effect a 'hooking' in response to a bite of a fish.

In the lure casting, generally, the hand which grips the rod is brought into a rod cast posture and then during the period between the lure casting to the landing of the lure, a thumbing operation is effected with the thumb of the hand gripping the rod in the above posture.

After the landing of the lure, the clutch mechanism is engaged for starting a reeling operation. Then, if the angler feels a bite of a fish immediately after the landing of the lure and wishes to effect a hooking, he/she has to immediately engage the clutch mechanism. However, according to the above-described conventional reel, since the hand gripping the rod is maintained at the rod cast posture, such speedy clutch operation is difficult since the other hand has to be moved by a significant distance to the reel located at the rod cast position.

Further, with this type of reel, a lure casting operation and a reeling operation are repeatedly carried out. Then, improvement has been desired for facilitating the engaging and disengaging operations of the clutch mechanism.

A primary object of the present invention is to provide a baitcasting Peel which allows easy engaging and disengaging operations of the clutch mechanism and which allows the clutch engaging operation without the necessity of detaching the angler's thumb engaged in a thumbing operation.

SUMMARY OF THE INVENTION

For accomplishing the above-noted object, a baitcasting reel, according to the present invention, comprises:

a clutch mechanism for selectively allowing, when disengaged, free rotation of a spool supported between right and left frames or transmitting, when engaged, a drive force from a handle to the spool, the clutch mechanism being disengaged and engaged respectively by a disengaging portion and an engaging portion disposed distantly from each other;

said engaging portion and said disengaging portion being disposed between the right and left frames and opposed to the spool.

This construction facilitates the disengaging and, engaging operations of the clutch mechanism and also allows the engaging operation without the necessity of detaching the angler's thumb engaged in a thumbing operation.

According to one aspect of the present invention, the disengaging portion for disengaging the clutch mechanism is disposed rearwardly of the spool between the right and left frames; and the engaging portion for engaging the clutch mechanism is disposed above an outer periphery of the spool between the right and left frames and with a distance from said disengaging portion allowing insertion of a thumb or finger therebetween.

With this construction, as shown in FIGS. 1 and 2 for example, as the thumb T is inserted between the disengaging portion A and the engaging portion B, this thumb T may be brought into contact with e.g. a flange portion 4A of the spool 4. Therefore, for casting a lure, by operating, with this thumb T, the disengaging portion A disposed rearwardly of the spool 4, the clutch mechanism may be disengaged to allow free rotation of the spool 4.

In order to prevent free rotation of the spool, the clutch mechanism may be engaged by operating the engaging portion B disposed above the spool 4, thereby to allow a hooking of a fish.

That is to say, according to the present invention, the disengaging portion and the engaging portion are disposed adjacent the outer periphery of the spool with a distance for allowing insertion of a thumb or finger therebetween. So that, the disengaging and engaging operations of the clutch mechanism are possible with a small movement of a finger of one hand of the angler. More specifically, when the clutch mechanism is to be engaged immediately after landing of a lure, since the operating portion is disposed adjacent the thumb used for a thumbing, the clutch engaging operation is possible with maintaining the thumbing condition.

According to a still further aspect of the invention, the disengaging portion for disengaging the clutch mechanism is disposed above an outer periphery of the spool between the right and left frames; and the engaging portion for engaging the clutch mechanism is disposed rearwardly of the spool between the right and left frames and with a distance from said disengaging portion allowing insertion of a thumb or finger therebetween.

With this construction, as shown in FIG. 8, for example, as the thumb T is inserted between the disengaging portion A and the engaging portion B, this thumb T may be brought into contact with e.g. the flange portion 4A of the spool 4. Therefore, for casting a lure, by operating, with this thumb T, the disengaging portion A disposed above the spool 4, the clutch mechanism may be disengaged to allow free rotation of the spool 4.

In order to prevent free rotation of the spool, as shown in FIG. 10, for example, the clutch mechanism may be engaged by operating the engaging portion B disposed rearwardly of the spool 4, thereby to allow a hooking of a fish.

That is to say, according to the present invention, the disengaging portion and the engaging portion are disposed adjacent the outer periphery of the spool with a distance for allowing insertion of a thumb or finger therebetween. So that, the disengaging and engaging operations of the clutch mechanism are possible with a small movement of a finger of one hand of the angler. More specifically, when the clutch mechanism is to be engaged immediately after landing of a lure, since the operating portion is disposed adjacent the thumb used for a thumbing, the clutch engaging operation is possible with maintaining the thumbing condition.

Hence, the present invention has fully achieved its intended object of providing a baitcasting reel which allows easy engaging and disengaging operations 15 of the clutch mechanism and which allows the clutch engaging operation without the necessity of detaching the angler's thumb engaged in a thumbing operation.

According to a still further aspect of the present invention, the disengaging portion and the engaging portion are formed on members which are operable independently of each other.

With this feature, the disengaging portion and the engaging portion are formed on members operable independently of each other. Thus, this construction has the advantage of reducing the necessary operation force over the further construction in which the disengaging portion and the engaging portion are operated together. The construction has the further advantage of reducing the operational strokes of the portions over the above-described integral type. Moreover, the construction allows such designing freedom for setting different operations strokes or different operation directions for the disengaging portion and the engaging portion.

Needless to say, it is also conceivable to construct the disengaging portion and the engaging portion to be operated integrally. This construction has the advantage that the single integral portion may contact either one of the right and left frame thus providing stability of the operation as well as sturdiness of the construction. Further, this construction facilitates visual confirmation of the clutch mechanism condition by viewing the position of either of the control portions.

According to a still further aspect of the invention, the disengaging portion, the engaging portion and the clutch mechanism are operatively connected so that the clutch mechanism is disengaged by a downward operation of the disengaging portion while the clutch mechanism is engaged by a forward operation of the engaging portion.

With the above construction, by keeping the finger between the disengaging portion and the engaging portion, a disengaging operation of the clutch mechanism is possible simply by moving said finger downwards. Also, for engaging the clutch mechanism, this is possible simply by forwardly shifting the finger at a position in the close proximity of the outer periphery of the spool.

That is to say, with the above construction in which the clutch mechanism is disengaged by the downward operation and is engaged by the forward operation, the clutch operations may be effected speedily with natural and comfortable movements of the finger.

According to a still further aspect of the present invention, the clutch mechanism is engaged with a forward operation of the engaging portion, and this engaging portion is disposed downwardly of a thumb rest extending between upper faces of the right and left frames, an operation stoke of the engaging portion being set so that the engaging portion projects rearwardly from a rear end of the thumb rest when the clutch mechanism is disengaged.

With the above-described construction, when the clutch mechanism is disengaged, the engaging portion projects rearwardly. Then, if a finger accidentally comes into contact with the thumb rest in the course of a reeling operation for instance, the finger will hardly come into contact with the engaging portion accidentally. Also, it becomes possible to reduce the possibility of damaging the clutch control construction with a strong impact to the engaging portion. Further, based on the position of this engaging portion, the condition of the clutch mechanism may be readily recognized.

As a result, with the construction where the control portion is disposed downwardly of the thumb rest, it becomes possible to avoid the inconvenience that the engaging portion may be accidentally contacted by the finger when the finger is placed into contact with the thumb rest. Further, this construction achieves the further effect of facilitating the visual confirmation of the clutch mechanism condition.

According to a still further aspect of the present invention, the disengaging portion for disengaging the clutch mechanism is disposed above the outer periphery of the spool between the right and left frames; and the engaging portion for engaging the clutch mechanism is disposed rearwardly of the spool between the right and left frames with a distance from the disengaging portion allowing insertion of a thumb or finger therebetween; and the disengaging portion, the engaging portion and the clutch mechanism are operatively connected so that the clutch mechanism is disengaged by a forward operation of the disengaging portion while the clutch mechanism is engaged by a downward operation of the engaging portion.

With the above construction, by keeping the finger between the disengaging portion and the engaging portion, a disengaging operation of the clutch mechanism is possible simply by moving said finger forwards. Also, for engaging the clutch mechanism, this is possible simply by downwardly shifting the finger at a position in the close proximity of the outer periphery of the spool. In particular, in such a situation where a strong force tends to be applied in the direction for gripping the reel and the rod, for instance, where the angler desires to effect a hooking as he/she feels a fish bite immediately after the landing of the lure, simultaneously with this gripping action, a force in the gripping direction may be applied to the engaging portion, thereby to engage the clutch mechanism for speedily allowing the hooking and reeling operation subsequent thereto.

As a result, with the above construction where the clutch mechanism is disengaged by the forward operation and is engaged by the downward operation, quick clutch operations are possible in a natural and comfortable manner. Further, a hooking operation may be speedily effected with a sufficiently strong force.

According to a still further aspect of the present invention, the engaging portion for engaging the clutch mechanism is disposed at a portion of at least one of faces of the right and left frames exposed to the spool in a direction along an axis of the spool and in the vicinity of the outer periphery of the spool.

With this construction, when a lure is cast during use of the reel, as shown in FIGS. 17 and 18 for instance, a thumbing operation may be effected by placing the thumb T into contact with e.g. the flange portion 4A of the spool 4. Then, for engaging the clutch mechanism at the timing of the landing of the lure, this engaging operation of the clutch mechanism C may be effected by operating the engaging portion B disposed at the position of the face S of the frame 1 without detaching the thumbing thumb T away from the flange portion 4A of the spool 4, thereby to allow a hooking operation subsequent thereto.

That is to say, according to this construction, the engaging portion is disposed on the face of the frame adjacent the spool and in the vicinity of the outer periphery of the spool, this engaging portion is necessarily located in the vicinity of the thumb engaged in a thumbing operation. For instance, when the angler wishes to engage the clutch mechanism when feeling a fish bite at the same time as the landing of the lure, the clutch mechanism may be engaged speedily to be ready for a hooking simply by slightly shifting the thumbing finger with continuing the thumbing operation.

According to a still further aspect of the present invention, the engaging portion for engaging the clutch mechanism is provided to a member movable outside the frame as viewed in the direction along the axis of the spool at a position thereof facing the spool.

With this construction, when the lure is cast during use of the reel, the angler will bring his/her thumb into contact with e.g. the flange portion of the spool. Then, for engaging the clutch mechanism at the timing of landing of the lure, the angler may engage the clutch mechanism to effect hooking by operating the engaging portion without having to significantly moving the thumbing thumb away from the flange portion of the spool.

That is to say, according to this construction, the engaging portion for engaging the clutch mechanism is provided to a member movable outside the frame as viewed in the direction along the axis of the spool at a position thereof facing the spool. Accordingly, this engaging portion is necessarily disposed in the vicinity of the thumbing thumb. For instance, when the angler feels a fish bite at the same time as the landing of the lure and wants to engage the clutch mechanism immediately, he/she may engage the clutch mechanism immediately to allow the hooking only by slightly moving the thumbing thumb or finger while continuing the thumbing operation.

Accordingly, the invention has achieved a baitcasting reel which allows a speedy engaging operation of the clutch mechanism only just with a slight movement of the thumb or finger being used for thumbing of the spool in response to a fish bite immediately after landing of the lure.

According to a still further aspect of the invention, the disengaging portion of disengaging the clutch mechanism is disposed rearwardly of the spool.

With this construction, for disengaging the clutch mechanism, this is effected by a natural movement of inserting the thumb between the right and left frames from the rear side of the spool. Then, when a casting is effected immediately after the clutch disengaging operation, the angler may effect a thumbing by slightly moving this thumb or finger in the forward direction.

As a result, the above construction which allows a disengaging operation of the clutch mechanism rearwardly of the spool allows smooth shift from a casting operation to a thumbing operation with a natural movement of the finger.

According to a still further aspect of the invention, the engaging portion is rendered slidable along the face to engage the clutch mechanism.

With this construction, since the engaging portion slides along the face, it is possible to reserve a relatively long operational stroke in the vicinity of the spool, so that a stable operation is possible by contacting the engaging portion to the face.

According to a still further aspect of the present invention, the engaging portion is operable in the direction perpendicular to the face to engage the clutch mechanism.

With this construction, the engaging portion may be provided as e.g. a push button in a narrow face of the frame and also it is not necessary to reserve a long operational stroke for the clutch engaging operation in the direction along the face.

As a result, with the construction in which the clutch mechanism is operated by the operation in the direction perpendicular to the face, it becomes possible to minimize the disposing area of the engaging portion and also to allow the engaging operation of the clutch mechanism without significantly changing the finger position relative to the direction along the spool axis.

According to a still further aspect of the invention, the member forming the engaging portion integrally forms the disengaging portion for disengaging the clutch mechanism and the clutch mechanism is engaged by sliding the member in one direction along the face and disengaged by sliding the member in the opposite direction.

With this construction, the clutch mechanism is disengaged by an operation of the disengaging portion of the member and the clutch mechanism is engaged by an operation of the engaging portion of the same member. That is, by operating the same single member, both the disengaging operation and engaging operation of the clutch mechanism are possible. Further, the engaging portion is disposed adjacent the spool. So that, the angler may speedily shift from a thumbing operation to a clutch engaging operation. Also, the sliding type operation of this member contributes stability of the operation of the member and also allows visual or finger-feeling confirmation of the current condition of the clutch mechanism based on the present position of the member relative to the frame. Moreover, the integrated operation construction may simplify e.g. the construction for directly coupling this member with the clutch mechanism.

As a result, with the above construction using the integral member for engaging and disengaging operations of the clutch mechanism, the control portions may be operated in a stable manner and also the construction facilitates the confirmation of the current condition of the clutch mechanism based on the position of the control portions.

According to a still further aspect of the present invention, the engaging portion is operatively connected with the clutch mechanism so that the clutch mechanism is engaged by a pivotal movement of the engaging portion about the spool axis.

With this construction, for engaging the clutch mechanism, the engaging portion pivots along the outer periphery of the spool. Then, even if this engaging portion has a long operation stroke, the finger will not move significantly away from the spool, whereby the thumbing operation may not be interrupted.

As a result, with the above construction rendering the engaging portion pivotable about the spool axis, it is possible to maintain constant the relative distance from the spool even if the engaging portion is provided with a long operational stroke. Then, the angler may readily effect an engaging operation of the clutch mechanism while continuing a thumbing operation.

According to a still further aspect of the present invention, a baitcasting reel comprises:

a clutch mechanism for allowing free rotation of a spool with a disengaging operation thereof and transmitting a retrieving force from a handle to the spool with an engaging operation thereof;

an operational member for operating the clutch mechanism to an engaging position or to a disengaging position;

a toggle spring having a dead point between said engaging position and said disengaging position so as to maintain said operational member at either the engaging position or the disengaging position;

a switch-over member for switching over said operational member from the disengaging position to the engaging position by shifting said dead point of the toggle spring to cause an urging force of the toggle spring to be effective in a clutch engaging direction when the clutch mechanism is at the disengaging position; and a control member for operating said operational member to engage the clutch mechanism, the control member being disposed between the right and left frames and in the vicinity of the outer periphery of the spool.

With the above-described construction, for engaging the clutch mechanism, the engaging portion disposed in the vicinity of the spool is operated. This actuates the switch-over member to vary the position of the dead point of the toggle spring, so that the operational member is moved to the engaging position by the urging force of the toggle spring thereby to engage the clutch mechanism.

That is, according to the above construction, the engaging portion is disposed adjacent the outer periphery of the spool. Thus, with a slight shifting motion of the finger or thumb from the thumbing position, the clutch mechanism may be engaged. Further, in the case of this construction, the clutch mechanism is maintained at either the engaged position or the disengaged position by the toggle spring. Then, in comparison with the conventional construction where the clutch mechanism is maintained at the disengaged position through engagement of a stopper pin, the above construction has the advantage of eliminating inconvenience of a malfunction due to frictional wear of the engagement portion thus reliably maintaining the clutch mechanism at either the engaged position or the disengaged position. Moreover, since the engaging operation is effected through the urging force of the toggle spring, the operation may be effected in a speedy and reliable manner.

Therefore, the invention has achieved a baitcasting reel which allows an engaging operation of the clutch mechanism only by a slight shifting motion of the thumbing finger or thumb from the spool and which can prevent occurrence of malfunctions due to e.g. frictional wear even after use for an extended period of time.

According to a still further aspect of the present invention, the baitcasting reel further comprises:

a return control mechanism operable, when said operational member is moved from the disengaging position to the engaging position with an operation of said switch-over member and then said handle is operated in a line retrieving direction, to activate said switch-over member to return the dead point of said toggle spring to the intermediate position between the engaging position and the disengaging position thereby to maintain said operational member at either the engaging position or the disengaging position by the urging force of the toggle spring.

With this construction, after the clutch mechanism is engaged with an operation of the operational member, by operating the handle in the line retrieving direction, the switch-over member is activated in association with the handle operation so as to return the dead point of he toggle spring. Thereafter, when the clutch mechanism is disengaged, the clutch mechanism may be maintained at the disengaged position by the urging force of this toggle spring.

As a result, with the above-described construction where the dead point of the toggle spring is returned with each operation of the handle in the line retrieving direction, the clutch mechanism may be maintained at the engaged position by the urging force of the toggle spring in association with the handle operation without necessitating any special operation to be effected after the operation of the engaging portion.

According to a still further aspect of the present invention, said operational member is operable to the engaging position or the disengaging position with a rotational movement thereof about the spool axis.

With this construction, the operational member pivots about the spool axis in the course of a clutch mechanism operation. Then, this construction has the advantage of allowing simplification and size reduction of the rotation system of the reel over a further conceivable construction where the operational member rotates about an axis different from the spool axis.

As a result, this construction using the rotary type operational member achieves the effects of simplifying and reducing the size of the rotation system of the reel and also facilitating manufacture of the reel.

According to a still further aspect of the present invention, the operational member is slidable to the engaging position or the disengaging position in the direction perpendicular to the spool axis.

With this construction, in the course of a clutch mechanism operation, the operational member slides in the direction perpendicular to the spool axis. Then, the operational member may be operated in a stable manner through its contact with the frame.

As a result, with the above construction using the slide operation type operational member, the operational member may be operated in a stable and reliable manner.

According to a still further aspect of the present invention, a baitcasting reel comprises:

a clutch mechanism for allowing free rotation of a spool with a disengaging operation thereof and transmitting a line retrieving force from a handle to the spool with an engaging operation thereof;

an operational member for operating the clutch mechanism to an engaging position or to a disengaging position;

a toggle spring having a dead point between said engaging position and said disengaging position so as to maintain said operational member at either the engaging position or the disengaging position;

a return spring for returning said operational member to the engaging position, said return spring having an urging force weaker than an urging force exerted by said toggle spring when the clutch mechanism is at the disengaging position;

a control member for reducing the urging force of said toggle spring exerted on said operational member when the clutch mechanism is at the disengaging position to be weaker than the urging force of said return spring or for canceling said urging force of the toggle spring; and an engaging portion for engaging the clutch mechanism disposed between right and left frames and in the vicinity of an outer periphery of the spool.

With this construction, for engaging the disengaged clutch mechanism, as the engaging portion disposed in the vicinity of the spool is operated, the urging force of the toggle spring is reduced by the function of the control member, whereby the clutch mechanism reaches its engaged position. Or, the urging force is canceled, so that the operational member is moved to the engaging position by the urging force of the return spring thereby to allow the clutch mechanism to reach the engaged position.

That is to say, according to this construction, since the engaging portion is disposed in the vicinity of the outer periphery of the spool, the clutch mechanism may be engaged by slightly shifting the thumb or finger from its thumbing condition. Further, with this construction, the clutch mechanism is maintained at the engaged position or the disengaged position by the toggle spring. Then, in comparison with the conventional construction where the clutch mechanism is maintained at the disengaged position through engagement of a stopper pin, the above construction has the advantage of eliminating inconvenience of a malfunction due to frictional wear of the engagement portion thus reliably maintaining the clutch mechanism at either the engaged position or the disengaged position through the constant effect of the urging force of the return spring. Hence, the clutch engaging operation may be effected in a reliable manner.

Therefore, the invention has achieved a baitcasting reel which allows an engaging operation of the clutch mechanism only by a slight shifting motion of the thumbing finger or thumb from the spool and which can prevent occurrence of malfunctions due to e.g. frictional wear even after use for an extended period of time.

According to a still further aspect of the invention, the baitcasting reel further comprises:

an operation mode selecting mechanism for selectively retaining said control member either at a state for reducing the urging force of the toggle spring or at a further state for canceling the urging force of the toggle spring, so that the clutch mechanism is returned to the engaged position thereof by the urging force of the return spring in response to release of force for disengaging the clutch mechanism.

With the above-described construction, when the state for reducing the urging force of the toggle spring or the further state for canceling the urging force of the toggle spring is selected by an operation of the operation mode selecting means, with release of the operating force for disengaging the clutch mechanism, the clutch mechanism is returned to its engaged position by the urging force of the return spring. Thus, with this construction, the operation of the disengaging portion functions also as an operation for engaging the clutch mechanism, whereby the so-called flipping action becomes possible.

As a result, with this construction including the mode selecting means, the flipping action is possible by utilizing the construction for engaging the clutch mechanism.

Further and other objects, features and effects of the invention will become more apparent from the following more detailed description of the embodiments of the invention with reference to the accompanying drawings.

BRIEF DESCRIPTION OF THE DRAWINGS

FIG. 30 is a plane view of a reel relating to the embodiment of. FIG. 29, FIG. 31 is a plane view of a reel relating to a still further embodiment.

DESCRIPTION OF THE PREFERRED EMBODIMENTS

Now, preferred embodiments of a baitcasting reel relating to the present invention will be described in particular with reference to the accompanying drawings.

Figure 1:
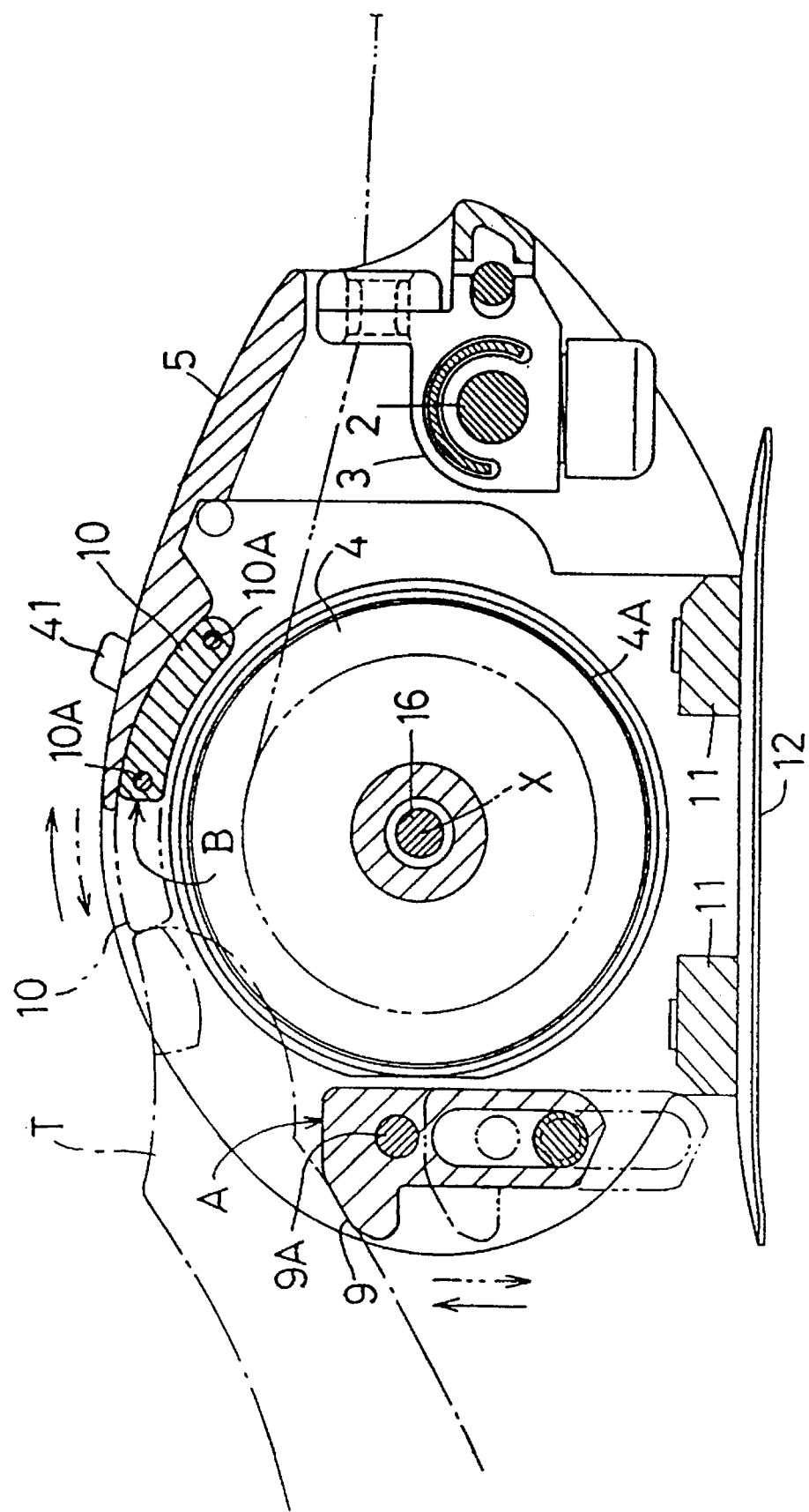
FIG. 1 is a side view in vertical section showing a reel relating to a preferred embodiment of the present invention.
Figure 2:
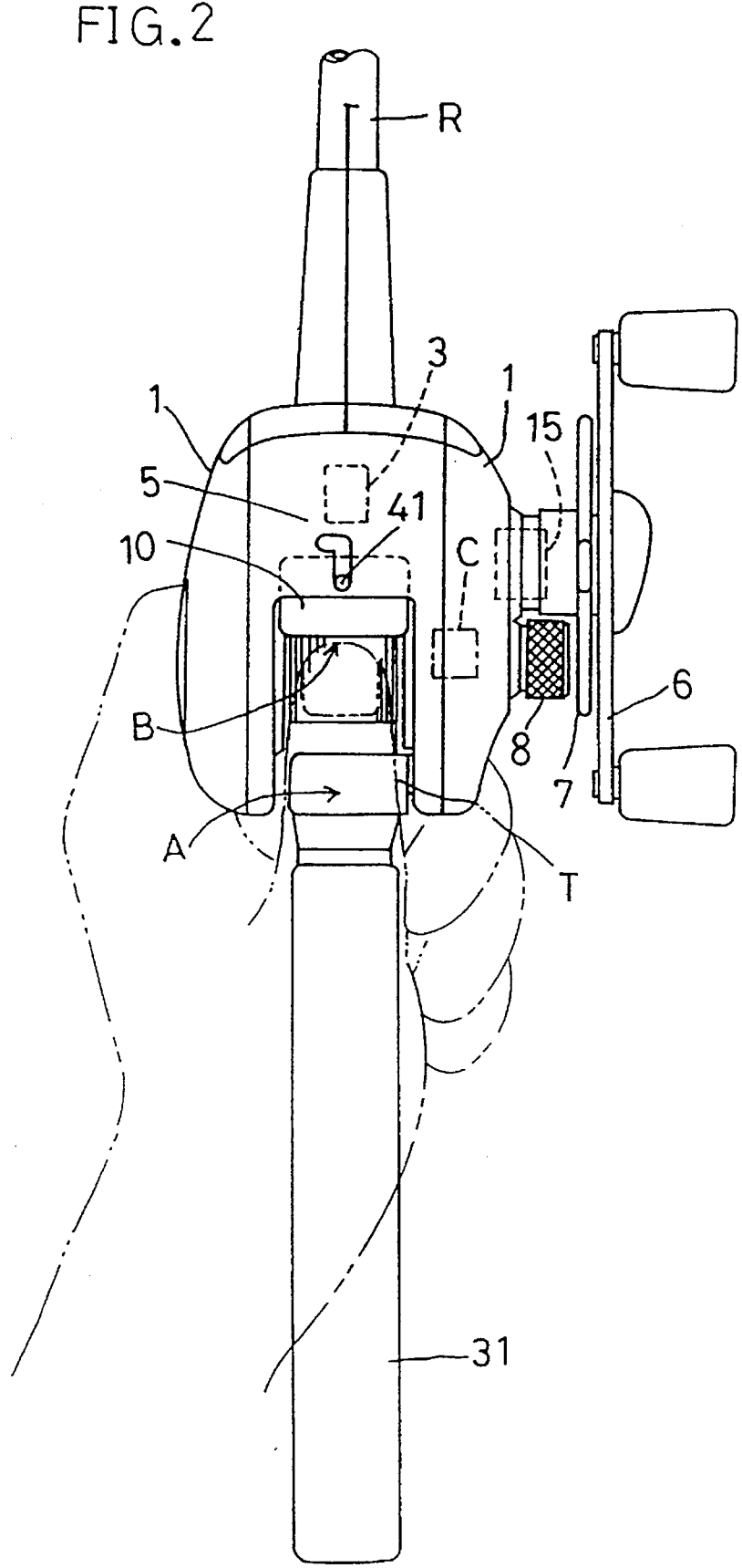
FIG. 2 is a plane view showing the reel of the embodiment of FIG. 1 with the reel being attached to a rod.

As shown in FIGS. 1 and 2, a baitcasting reel includes right and left frames 1, 1, and a level wind mechanism disposed forwardly of and between the frames 1, 1 for reciprocating a line guide 3 to the right and left in association of rotation of a worm shaft 2. The reel further includes a spool 4 disposed at the center of the reel and a thumb rest 5 extending between upper portions of the right and left frames 1, 1. The right frame 1 mounts a handle 6, a drag controller 7 and a cast controller 8.

In this reel, as shown in FIG. 2, the right frame 1 accommodates a clutch mechanism C. A disengaging portion A for disengaging this clutch mechanism C is formed on a disengaging member 9 disposed between the right and left frames 1, 1 rearwardly of the spool 4. Further, an engaging portion B for engaging the clutch mechanism C is formed on an engaging member 10 disposed between the right and left frames 1, 1 above an outer-periphery of the spool 4 with a distance from the disengaging portion A allowing an insertion of a thumb or finger therebetween.

Downwardly of the right and left frames 1, 1, there is provided a leg 12 via a pair of forward and rear lower frames 11, 11.

Figure 5:
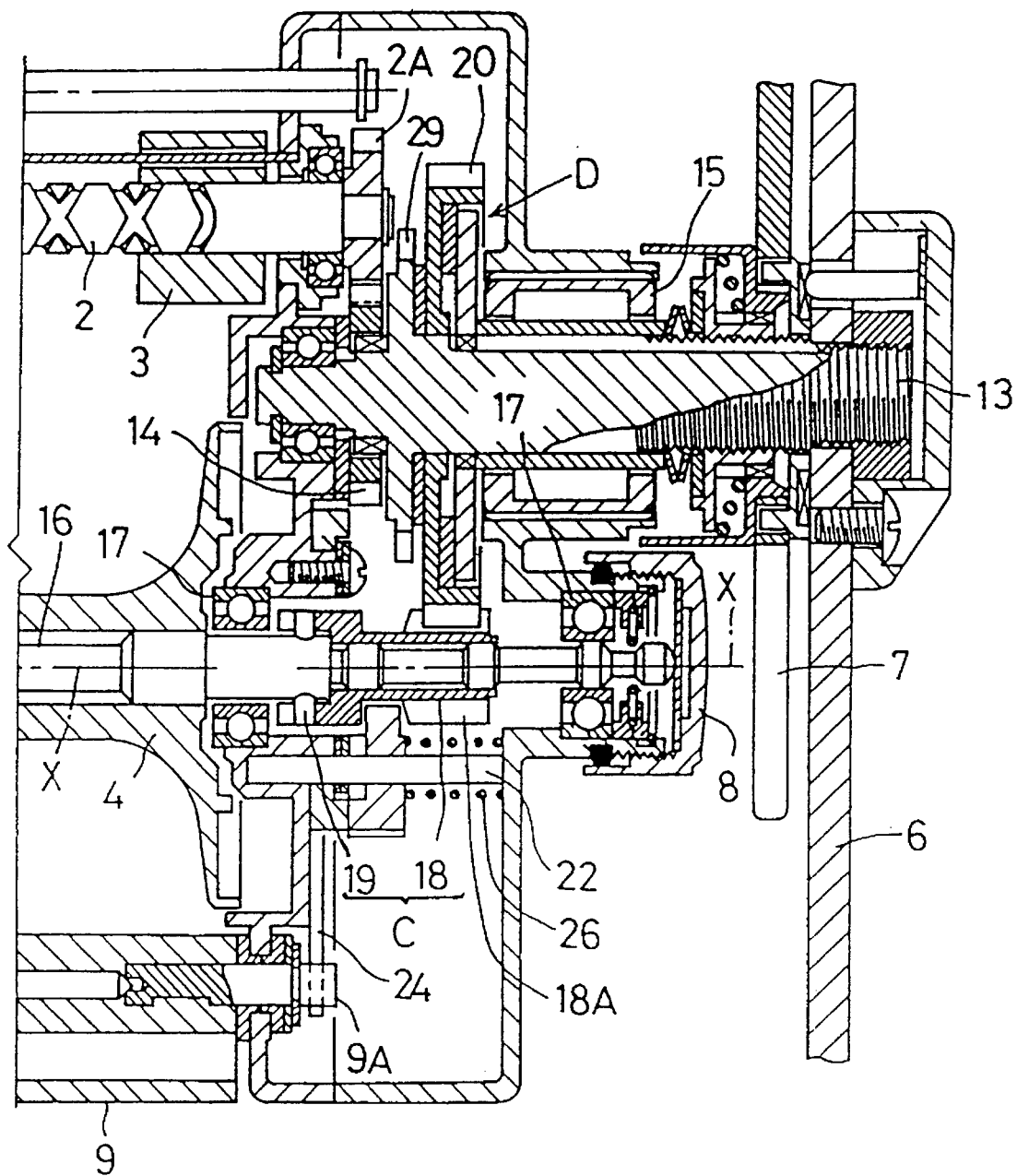
FIG. 5 is a section view showing a right side portion of the reel of the embodiment of FIG. 1.

As shown in FIG. 5, the right frame 1 mounts a handle shaft 13 which mounts in turn the handle 6 and the drag controller 7. The handle shaft 13 mounts, at an inner end portion thereof, a drag mechanism D and an output gear 140 Between the handle shaft 13 and the frame 1, there is interposed an anti-reverse mechanism 15 comprise of a roller type one-way clutch. These components together constitute a transmission system for transmitting a drive force from the handle 6 via the output gear 14 to an input gear 2A of the worm shaft 2.

Between the right and left frames 1, 1, there is supported, via bearings 17, a spool shaft 16 rotatable with the spool 4. The clutch mechanism C comprises an engagement-disengagement construction between a clutch sleeve 18 slidably mounted on the spool shaft 16 and a pin 19 fixedly mounted on the spool shaft 16. By engagement between an input gear 18A of the clutch sleeve 18 and an output gear 20 of the drag mechanism D, there is established a transmission system for transmitting the rotational force from the handle 6 to the spool 4 via the drag mechanism D and the clutch mechanism C.

Figure 3:
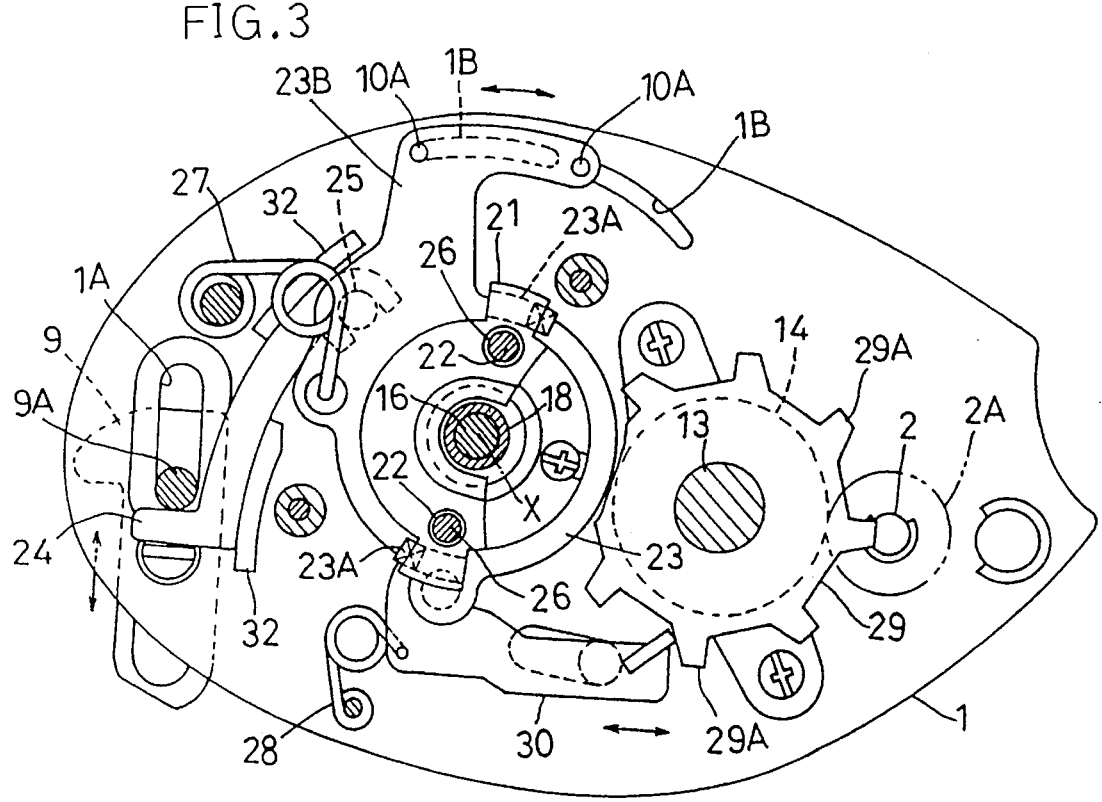
FIG. 3 is a side view showing a clutch control system in a disengaged condition of the reel of the embodiment of FIG. 1.
Figure 4:
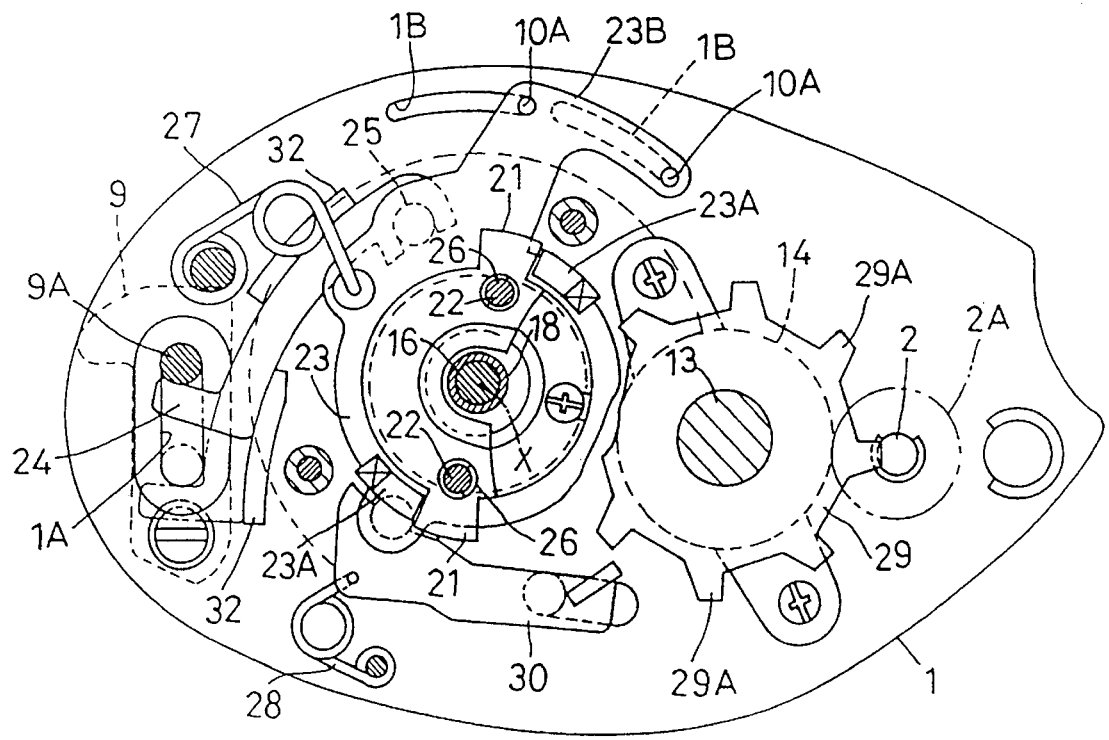
FIG. 4 is a side view showing a clutch control system in an engaged condition of the reel of the embodiment of FIG. 1.

As shown in FIGS. 3 and 4, a yoke 21 engaging and supporting the clutch sleeve 18 is slidably mounted on a pair of support shafts 22, 22. Through abutment between a rotary cam 23 rotatable about an axis X of the spool 4 and a pair of cam faces 23A, 23A, there is provided a construction for operating the clutch sleeve 18 via this yoke 21. Further, a link member 24 operable to be brought into contact with a control pin 9A of the disengaging member 9 is engaged with an engaging pin 25 of the rotary cam 23.

The support shafts 22, 22 respectively mount compression springs 26, 26 for operating the yoke 21 in a direction for engaging the clutch mechanism C. The rotary cam 23 is placed under an effect of a toggle spring 27 for maintaining a rotational posture of this rotary cam 23 to a state for engaging or disengaging the clutch mechanism C. Further, there is provided a return arm 30 which is switched over, by the effect of the toggle spring 28 when the clutch mechanism C is disengaged, to a posture where an end of the arm interferes with a return wheel 29.

The rotary cam 23 integrally forms an upwardly extending extension portion 23B and this extension portion 23B and the engaging member 10 are operatively connected with each other via a pin 10A.

Incidentally, a pin 9A of the disengaging member 9 is rendered vertically movable along a linear slot 1A defined in the frame 1. On the other hand, the pin 10A of the engaging member 10 is rendered movable back and forth along an arcuate slot 1B extending about the axis X of the spool shaft 16.

Figure 6:
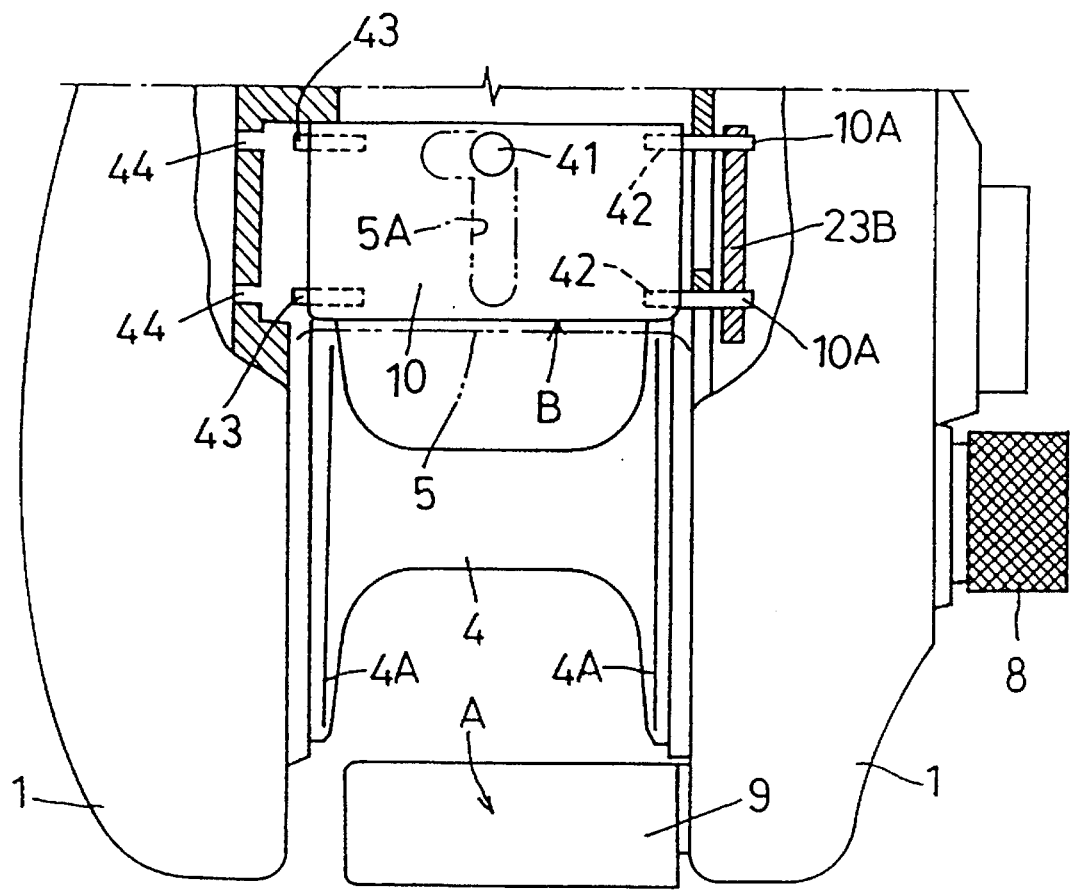
FIG. 6 is a partially cutaway plane view showing an engaging member of the embodiment of FIG. 1.
Figure 7:
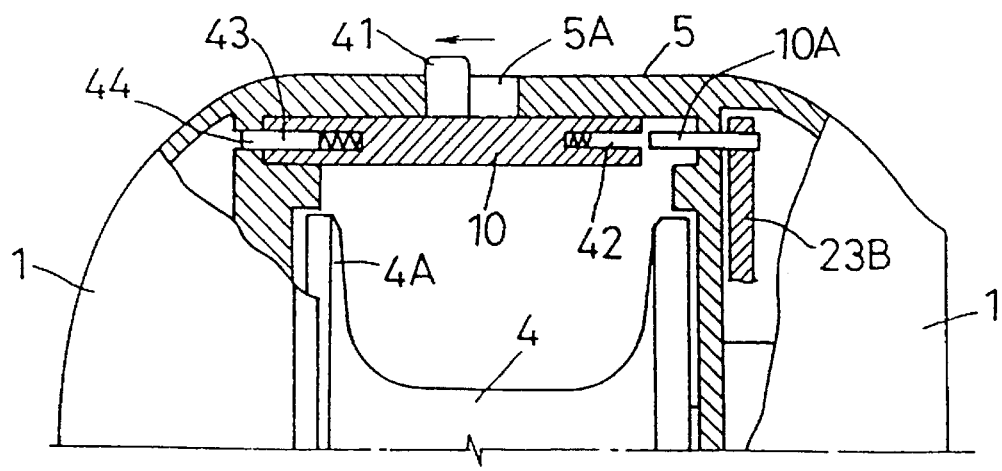
FIG. 7 is a partially cutaway rear view of the engaging member of the embodiment of FIG. 1.

As shown in FIGS. 6 and 7, in the case of this reel, in order to allow selection between use and non-use of the engaging member 10, on the upper face of this engaging member 10, there is provided a control piece 41 extending through the thumb rest 5. On the right side of this engaging member 10, there is formed a slot 42 for allowing insertion and withdrawal of the pin 10A. On the left side of the engaging member 10, there is provided an engaging pin 43. And, at a portion of the reel body 1 facing the engaging pin 43, there is formed an engaging slot 44 for allowing engagement with the engaging pin 43.

The thumb rest 5 defines a through hole 5A for allowing the passage of the control piece 41. Then, this through hole 5A has a hooked shape to allow a forward-rearward movement and a sideways movement of the engaging member 10.

Accordingly when the engaging member 10 is to be used, this engaging member 10 is set to a position shown in FIG. 6. On the other hand when the engaging member 10 is not to be used as shown in FIG. 7, with an operation of the control piece 41 the pin 10A is withdrawn from the slot 42 of the engaging member 10 and then the engaging pin 43 is brought into engagement with the engaging hole 44. With this, the engaging member 10 becomes immovable regardless of the condition of the clutch mechanism C.

Then, when this reel is used as illustrated in FIG. 2, an angler grips a grip 31 of a rod R with inserting the thumb T of one hand between the disengaging portion A and the engaging portion B. For disengaging the clutch mechanism C in the course of e.g. a casting operation the disengaging portion A is depressed downwards. With this, as shown in FIG. 3, a control force from the pin 9A of the disengaging member 9 causes the link member 24 to move along an arcuate path through its contact with a guide member 32 thereby to rotate the rotary cam 23. As a result, by the pressure of the cam faces 23A, 23A, the clutch sleeve 18 is operated in the clutch disengaging direction and simultaneously therewith the engaging portion B formed at the rear end of the engaging member 10 is moved from the rear end of the thumb rest 5 to a rearwardly projecting position.

Immediately after the disengaging operation of the clutch mechanism C, the thumb T is located in the vicinity of the spool 4. Therefore, the angler may readily effect a thumbing operation by placing the thumb T into contact with a flange portion 4A of the spool 4. Further, when the clutch mechanism C is to be engaged at the timing of landing of a lure or the like, by slightly moving the thumbing thumb T forward from its position, the angler may forwardly press the engaging portion B with continuing the thumbing operation. With this operation, as shown in FIG. 4, the rotary cam 23 is rotated in the clutch engaging direction, the yoke 21 is activated by the urging forces of the compression springs 26, 26, so that the clutch mechanism C reaches its engaged condition thereby to restrict occurrence of a backlash and to enable a quick hooking.

Incidentally, when the clutch mechanism reaches the engaged condition, the engaging portion B becomes completely covered by the thumb rest in the plane view. So that, when the angler's finger comes into contact with the thumb rest in the course of e.g. reeling, this finger does not touch the engaging portion B.

Further, with this reel, the clutch mechanism C may be engaged by a line retrieving operation of the handle 60 In this operation, as the handle 6 is operated in the line retrieving direction, a pressing force from a threaded portion 29A of the wheel 29 moves, through the return arm 30, the rotary cam 23 in the clutch engaging direction, and the yoke 21 is activated by the urging forces of the compression springs 26, 26 thereby to engage the clutch mechanism C.

Next, other embodiments of the invention will be described.

(a) This further embodiment differs only slightly from the foregoing embodiment (common components and mechanisms are denoted with the same reference numerals and marks as the foregoing embodiment). In this embodiment, the disposing positions of the disengaging portion A and the engaging portion B are reversed and the operation directions of the clutch mechanism are also reversed accordingly.

More specifically, as shown in FIGS. 8 through 11, in the case of a reel of this embodiment, a disengaging portion A for disengaging a clutch mechanism C is formed on a disengaging member 9 disposed between right and left frames about an outer periphery of the spool. And, an engaging portion A for engaging the clutch mechanism C is formed on an engaging member 10 disposed between the right and left frames 1, 1 rearwardly of the spool 4 with a distance from the disengaging portion A allowing insertion of a thumb or finger therebetween.

Figure 9:
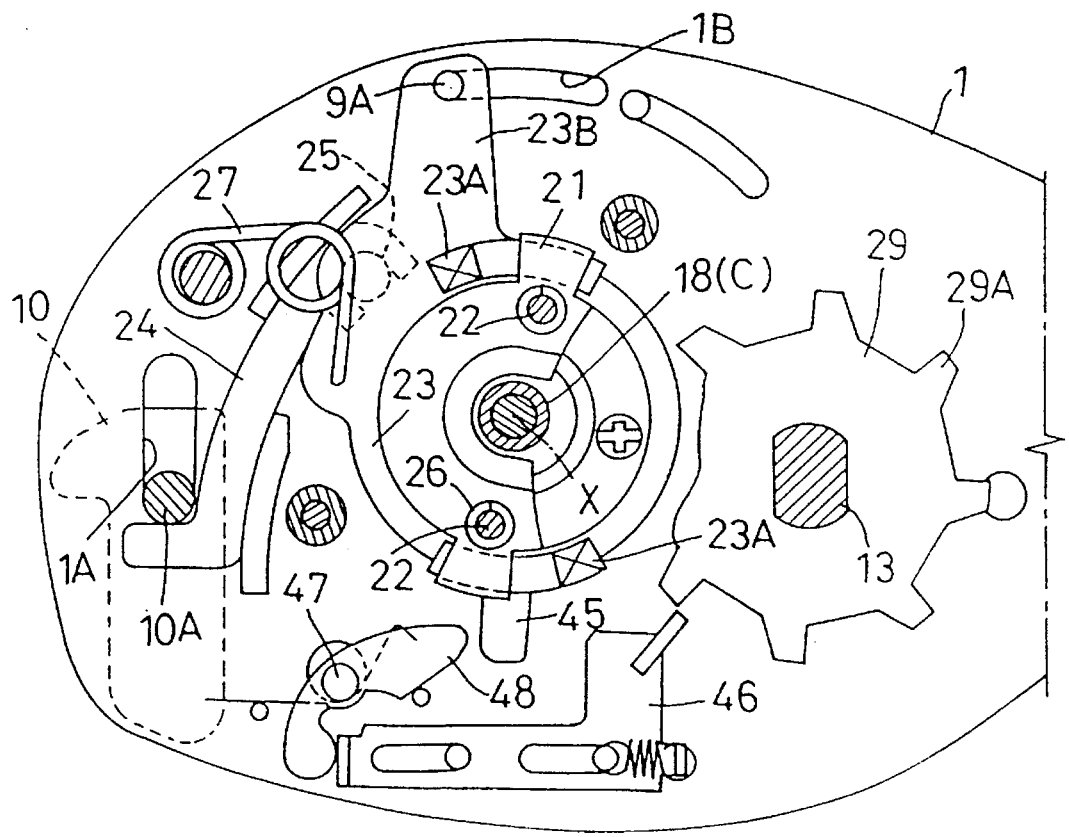
FIG. 9 is a side view of a clutch control system in an engaged condition relating to a further embodiment.

As shown in FIG. 9, a yoke 21 for engaging and supporting a clutch sleeve 18 is slidably supported on a pair of support shafts 22, 22. Abutment of a pair of cam faces 23A, 23A of a rotary cam 23 rotatable about an axis X of the spool 4 provides a construction for operating the clutch sleeve 18 via the yoke 21. Further, a control pin 9A of the disengaging member 9 is operatively connected with an extension portion 23B of the rotary cam 23. Further, a link member 24 operable by contact with a pin 10A of the engaging member 10 is engaged with an engaging pin 25 of the rotary cam 23.

The support shafts 22, 22 mount compression springs 26, 26 for operating the yoke 21 in a direction for engaging the clutch mechanism C. The rotary cam 23 is placed under an effect of a toggle spring 27 which serves to maintain a rotational posture of this rotary cam 23 for keeping the engagement or disengagement of the clutch mechanism C. Further, the rotary cam integrally forms a return arm portion 45.

Incidentally, the pin 9A of the disengaging member 9 is rendered movable back and forth along an arcuate slot 1B extending about the axis X of the spool shaft 16. On the other hand, the pin 10A of the engaging member 10 is rendered vertically movable along a linear slot 1A defined in the frame 1.

According to a clutch return mechanism of this reel, when the handle is rotatably operated in the line retrieving direction with the clutch disengaged, a control force from a slide member 46 slidable rearward through contact thereof with a threaded portion 29A of a wheel 29 rotatable with a handle shaft 13 is transmitted to the arm portion 45 via a pivot member 48 pivotable about a shaft 47, thereby to rotate the rotary cam 23 to the clutch engaging position.

Figure 8:
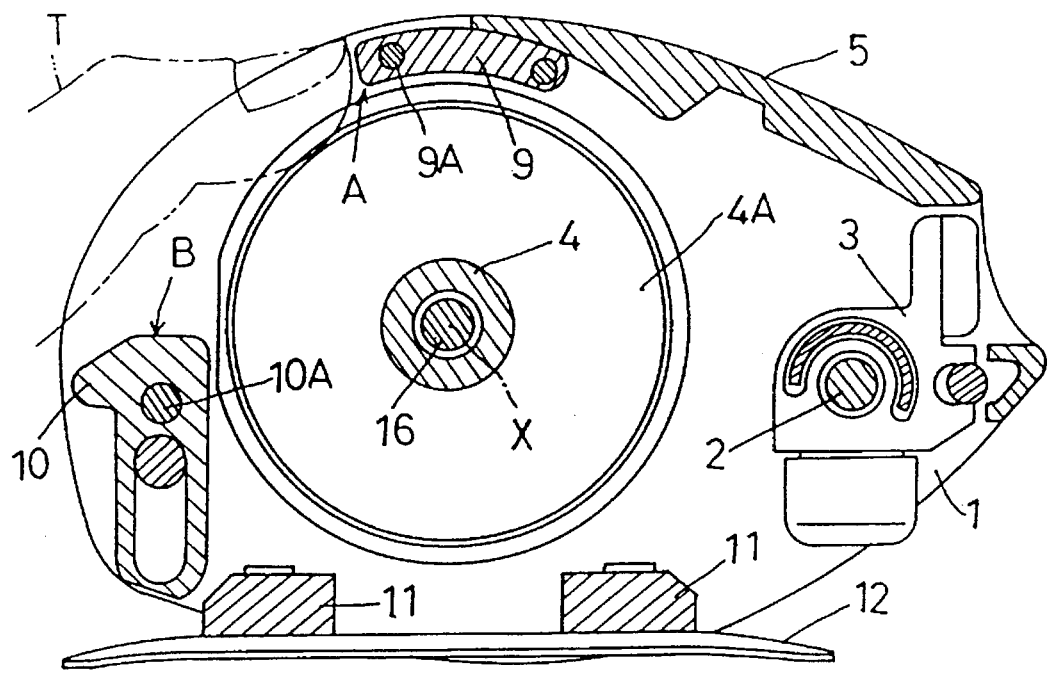
FIG. 8 is a side view in vertical section of the reel in a clutch engaged condition relating to a further embodiment.
Figure 10:
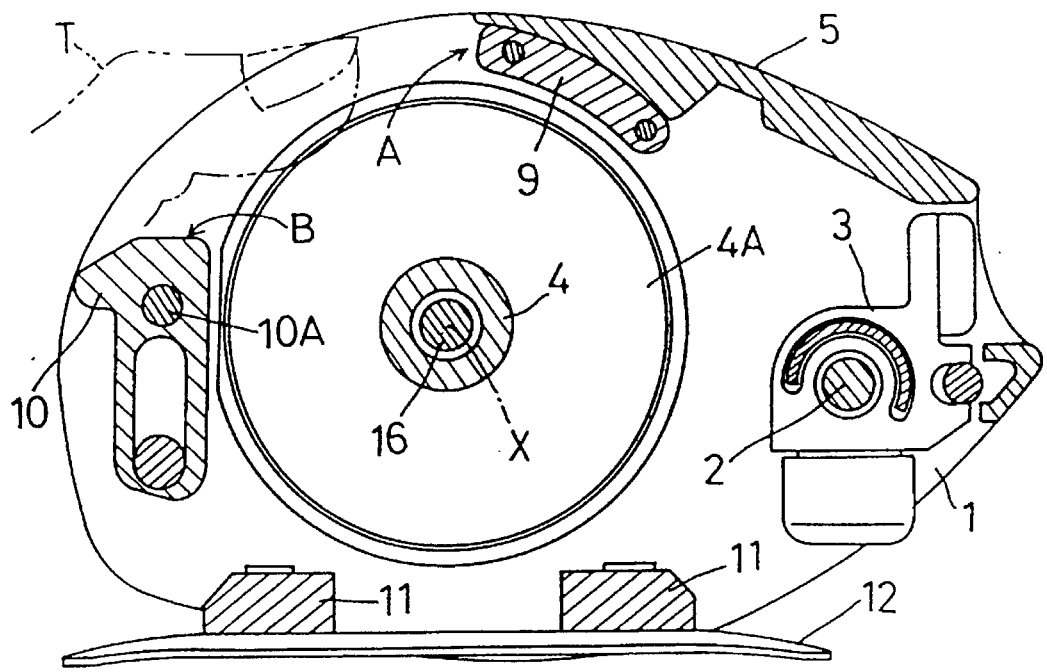
FIG. 10 is a side view in vertical section of the reel in a clutch disengaged condition relating to the further embodiment of FIG. 8.
Figure 11:
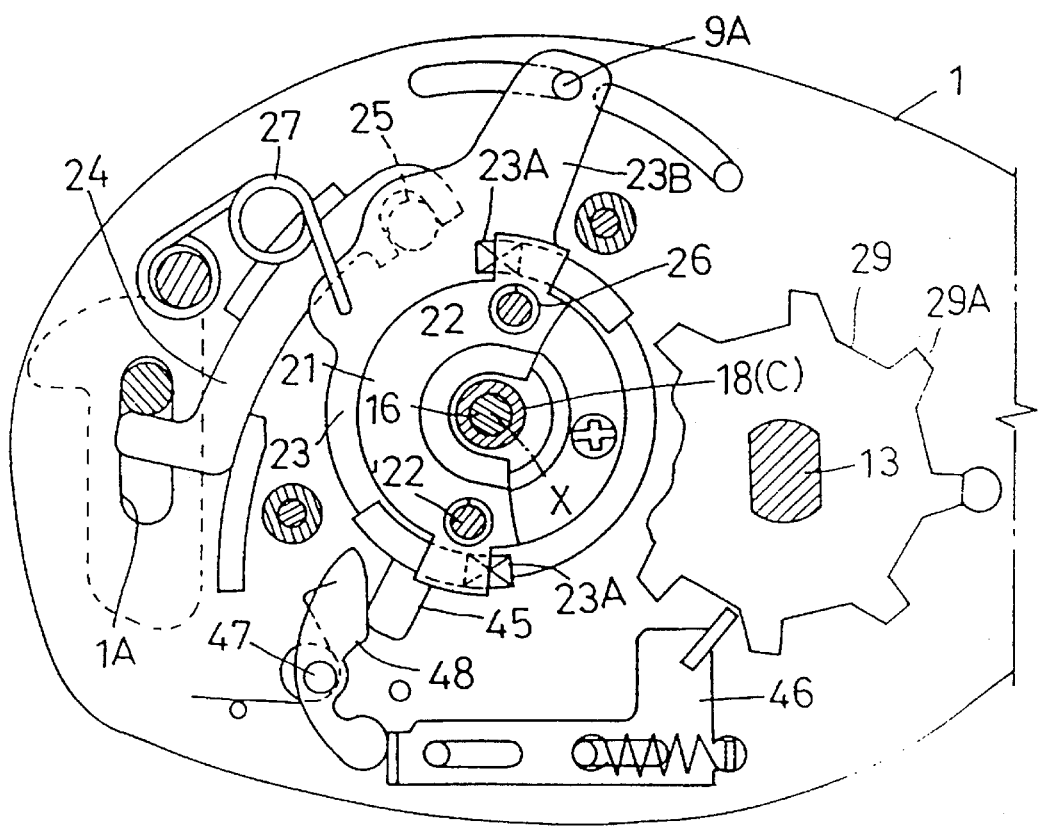
FIG. 11 is a side view showing the clutch control system in a disengaged condition of the reel of the embodiment of FIG. 8.

Then, when this reel is used, as illustrated in FIG. 8, an angler grips e.g. a grip of a rod R with inserting the thumb T of one hand between the disengaging portion A and the engaging portion B. For disengaging the clutch mechanism C in the course of e.g. a casting operation, the disengaging portion A is pressed forwardly. With this, a control force from the pin 9A of the disengaging member 9 causes the rotary cam 23 to rotate in the clutch disengaging direction thereby to disengage the clutch mechanism C as illustrated in FIGS. 10 and 11 and also the disengaging member 9 reaches a position to be covered by the thumb rest 5 in the plane view.

Immediately after the disengaging operation of the clutch mechanism C, the thumb T is located in the vicinity of the spool 4. Therefore, the angler may readily effect a thumbing operation by placing the thumb T into contact with a flange portion 4A of the spool 4. Further, when the clutch mechanism C is to be engaged at the timing of landing of a lure or the like, by slightly moving the thumbing thumb T downward from its position, the angler may downwardly press the engaging portion B with continuing the thumbing operation. With this operation, the rotary cam 23 is rotated in the clutch engaging direction, the yoke 21 is activated by the urging forces of the compression springs 26, 26, so that the clutch mechanism C reaches its engaged condition thereby to restrict occurrence of a backlash and to enable a quick hooking.

Further, with this reel too, the clutch mechanism C may be engaged by a line retrieving operation of the handle 6. In this operation, as the handle 6 is operated in the line retrieving direction, a pressing force from the threaded portion 29A of the wheel 29 moves the rotary cam 23 in the clutch engaging direction through the slide member 46, the pivot member 48 and the arm portion 45, and the yoke 21 is activated by the urging forces of the compression springs 26, 26 thereby to engage the clutch mechanism C.

A still further embodiment of the present invention will be described next.

Figure 12:
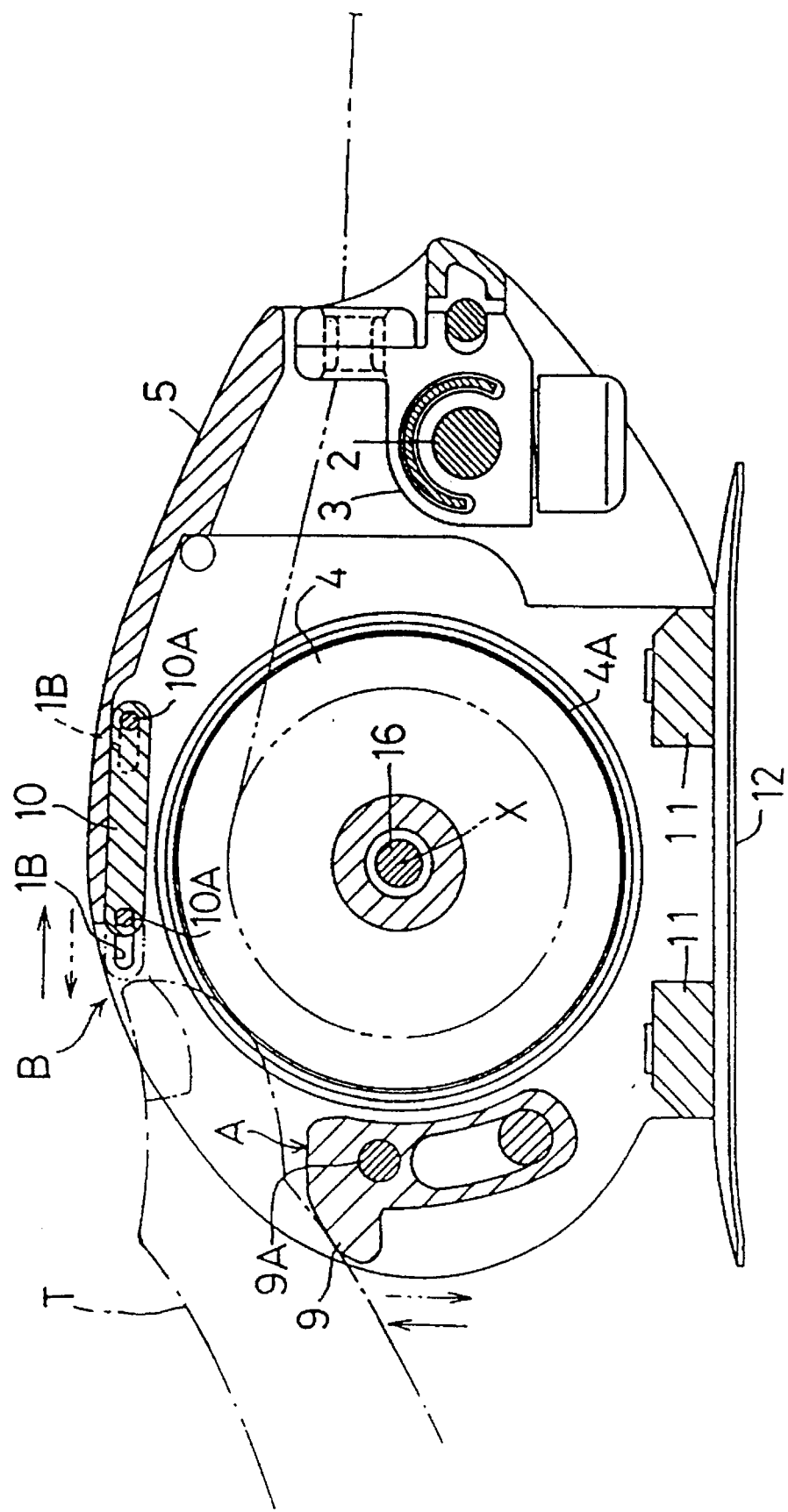
FIG. 12 is a side view in vertical section of a reel relating to a still further embodiment of the invention.
Figure 13:
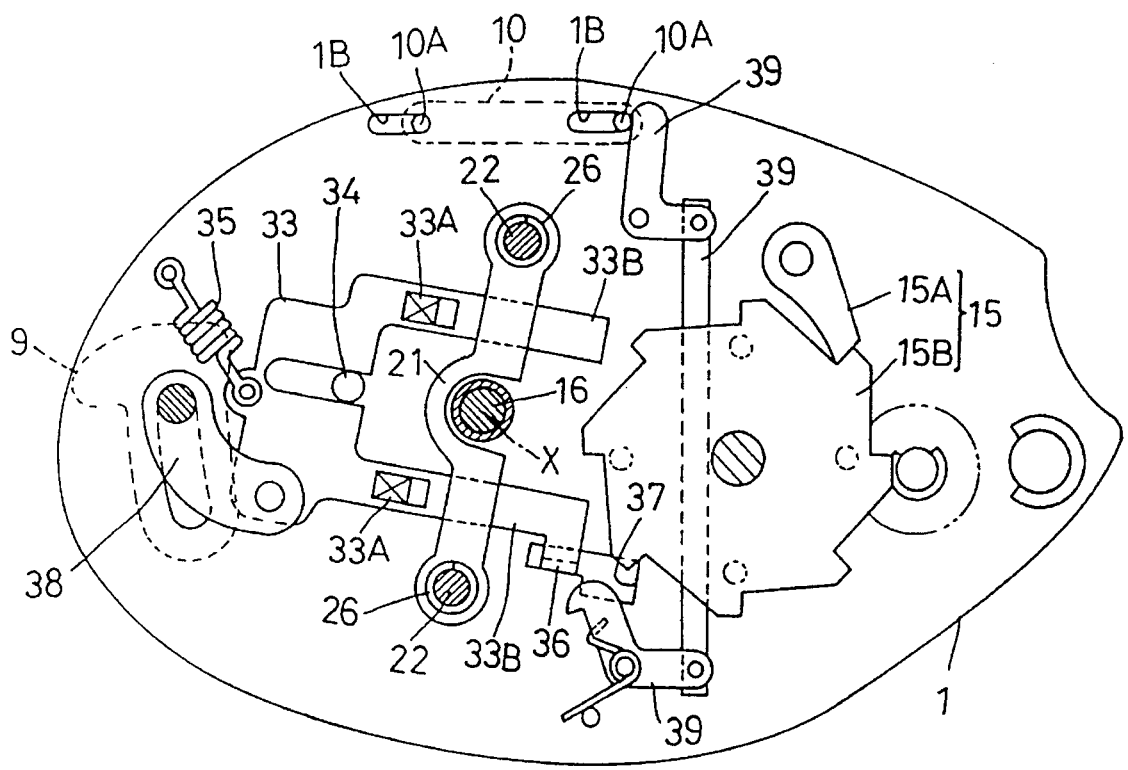
FIG. 13 is a side view showing a clutch control system in an engaged condition of the reel of the embodiment of FIG. 12.
Figure 14:
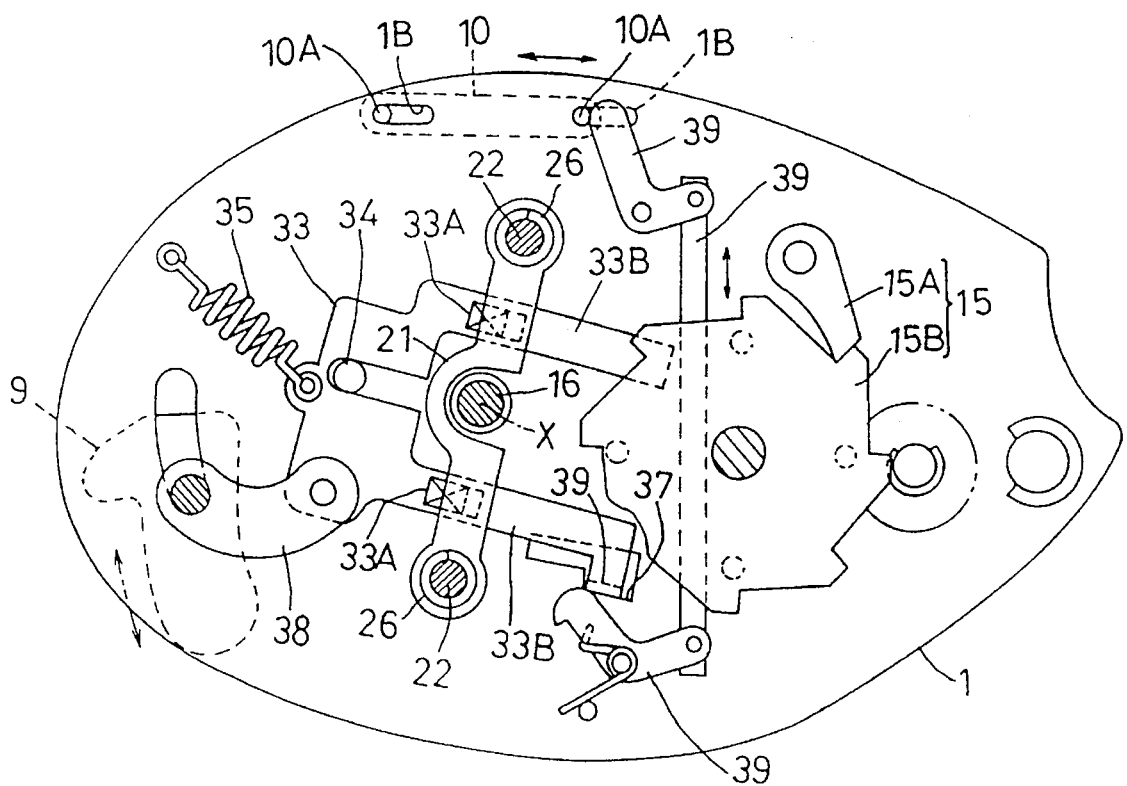
FIG. 14 is a side view showing the clutch control system in a disengaged condition of the reel of the embodiment of FIG. 12.

(b) In a reel according to this embodiment, as shown in FIGS. 12 through 14, a disengaging portion A together with a disengaging member 9 is operable along an arcuate path substantially centering about an axis X of a spool 4. Whereas, an engaging portion B together with an engaging member 10 is operable along a straight path. And, a clutch mechanism C is constructed to be described next.

That is, a yoke 212 slidably supported along a pair of support shafts 22, 22 is urged in a clutch engaging direction by compression springs 26. A clutch plate 33 includes cam faces 33A contactable with the yoke 21 to operate this yoke 21 in the clutch disengaging direction. Further, the mechanism includes a spring 35 for urging this clutch plate 33 in the clutch engaging direction and also for causing the clutch plate to pivot about a shaft 34. Further, one of a pair of extending end portions 33B, 33B of the clutch plate 33 is bent to form an engaging piece 36. Also, there is formed a concave engaging retaining portion 37. In a disengaging operation of the clutch mechanism C, the engaging piece 36 comes into engagement with the retaining portion 37 thereby to prevent the clutch plate 33 from returning to the clutch engaging direction. Further, the clutch plate 33 and the disengaging member 9 are operatively connected with each other via a link piece 38. These components and constructions together constitute the control system for the clutch mechanism C.

Incidentally, the engaging piece 36 is bent so as to extend normal to the plane of the view of FIG. 13. The engaging retainer portion 37 is formed concave relative to a portion of the frame 1 extending in parallel with the clutch plate 33.

Between the engaging piece 38 and the engaging member 10, there are provided a plurality of link members 39 for coming into contact with the engaging piece 38 as engaged with the engaging retainer portion 37 thereby to release this engagement. The handle shaft 13 mounts an anti-reverse mechanism 15 comprised of a stopper 15A and a ratchet wheel 15B.

Then, for disengaging the clutch mechanism C of this reel, as shown in FIG. 14, with a downward depressing operation of the disengaging portion A, the clutch plate 33 is moved to disengage the clutch mechanism C. Conversely, for engaging the clutch mechanism C, by forwardly operating the engaging portion B, as illustrated in FIG. 13, a pivotal movement of the link member 39 serves to release the engagement between the engaging piece 38 and the engaging retainer portion 37, so that the clutch plate is returned to the engaging condition by the urging force of the spring 35, whereby the clutch mechanism C too reaches its engaged condition, and also a reverse rotation of the spool 4 is prevented by the anti-reverse mechanism 15.

Figure 15:
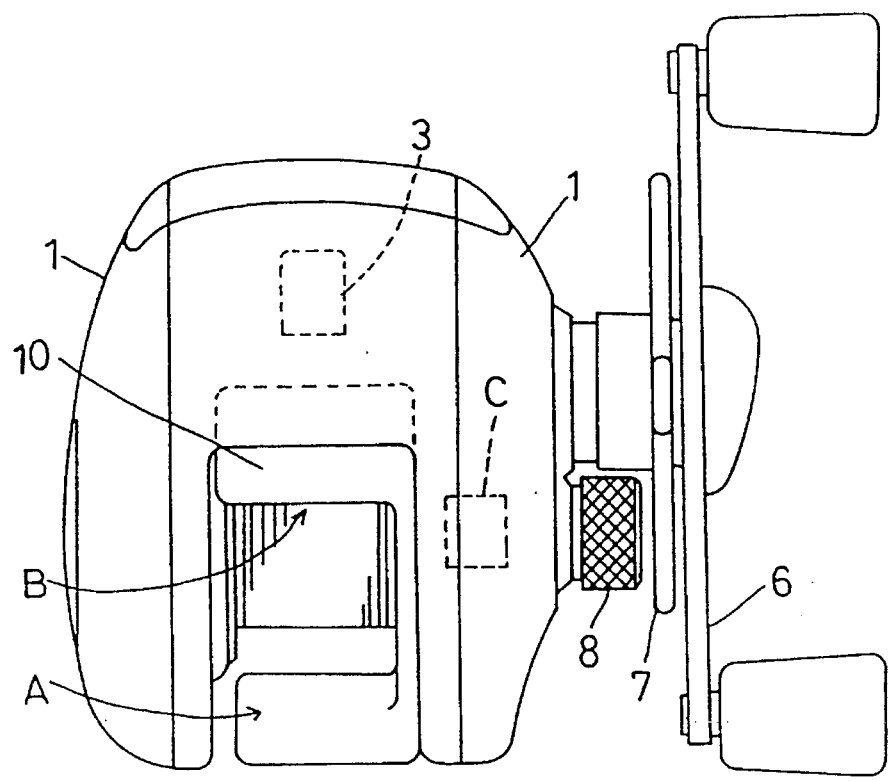
FIG. 15 is a plane view showing a reel relating to a still further embodiment of the invention.
Figure 16:
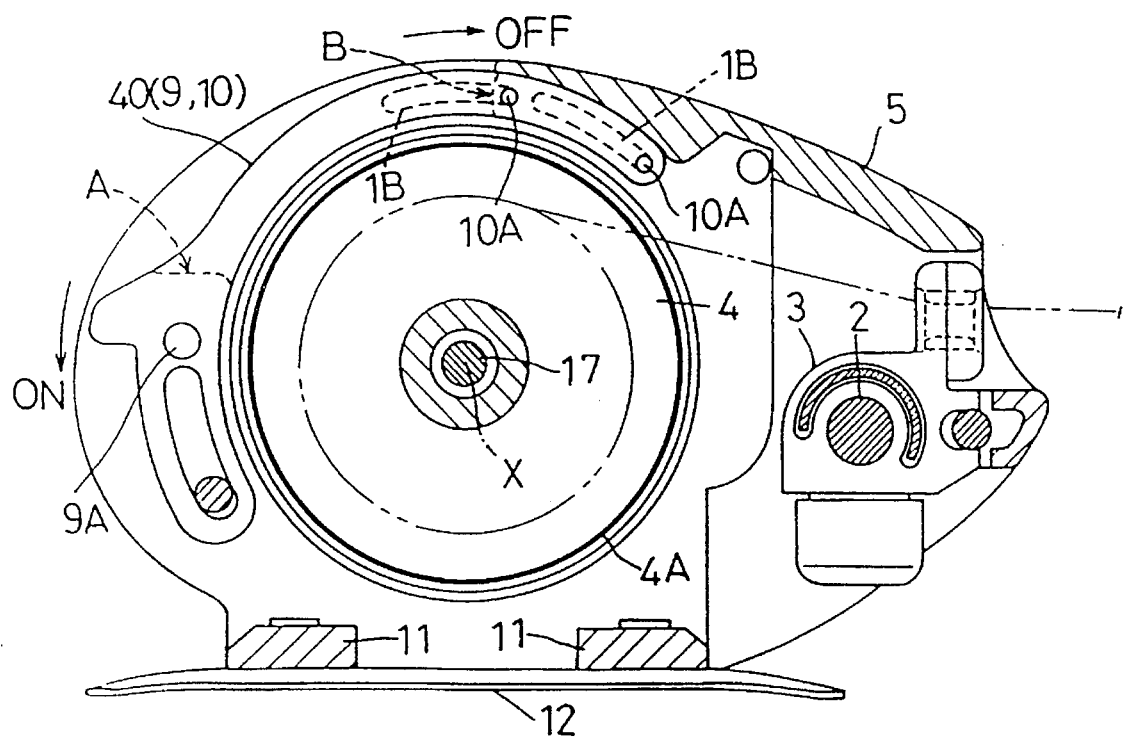
FIG. 16 is a side view in vertical section of the reel of the embodiment of FIG. 15.

(c) FIGS. 15 and 16 show a still further embodiment of the invention. In this, a disengaging portion A and an engaging portion B are formed laterally on positions of a 'C'-shaped operational member 40. And, this operational member 40 is pivotable about the axis X of the spool 4 when the clutch mechanism C is disengaged or engaged.

Incidentally, in addition to the reel including the clutch mechanism using a rotary type cam relating to the foregoing embodiment, this further embodiment may be employed in also the further type of reel in which its clutch mechanism is operated by a sliding operation of the cam plate as described in the above embodiment (b).

(d) In integrally forming the disengaging portion A and the engaging portion B on a single member. This member may be provided with an angular shape with a central opening allowing insertion of an angler's finger. Also, the right and left side faces of this member may be disposed in contact with opposing faces of the right and left frames of the reel body.

(e) A still further embodiment of the present invention will be described next.

Figure 17:
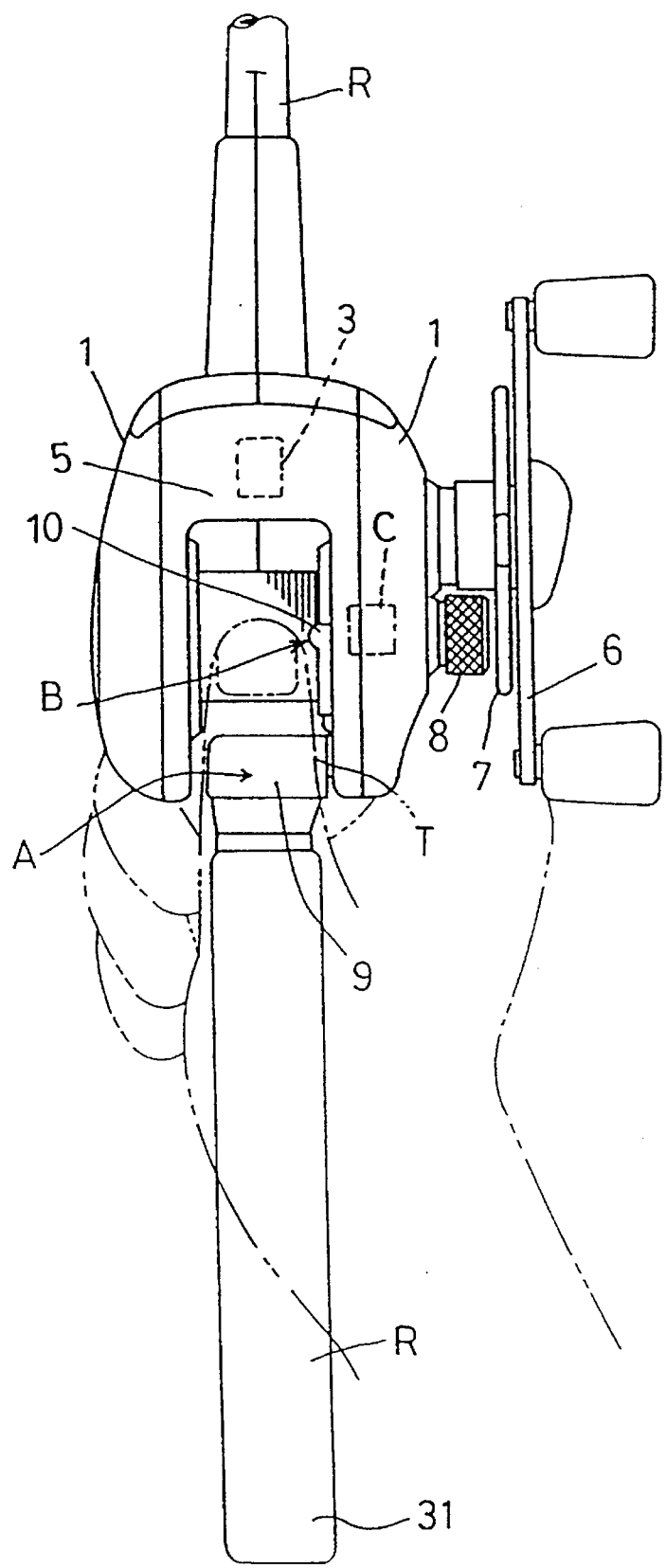
FIG. 17 is a plane view of a reel relating to a still further embodiment of the invention, with the reel being attached to a rod.
Figure 18:
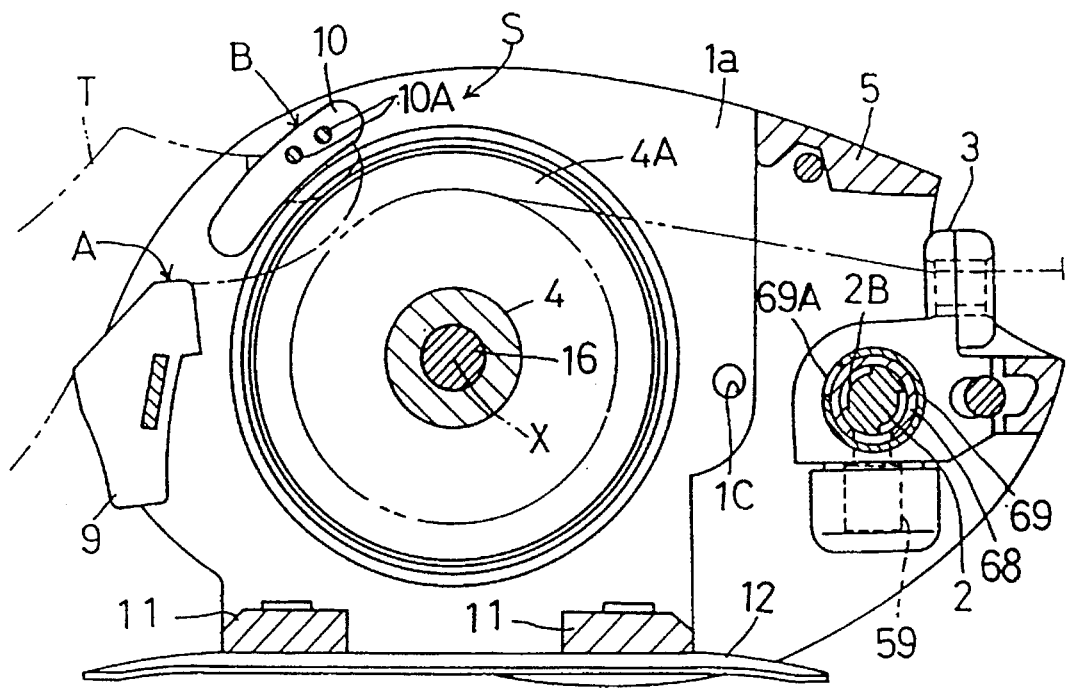
FIG. 18 is a side view in vertical section of the reel of the embodiment of FIG. 17 in a clutch disengaged condition.
Figure 25:
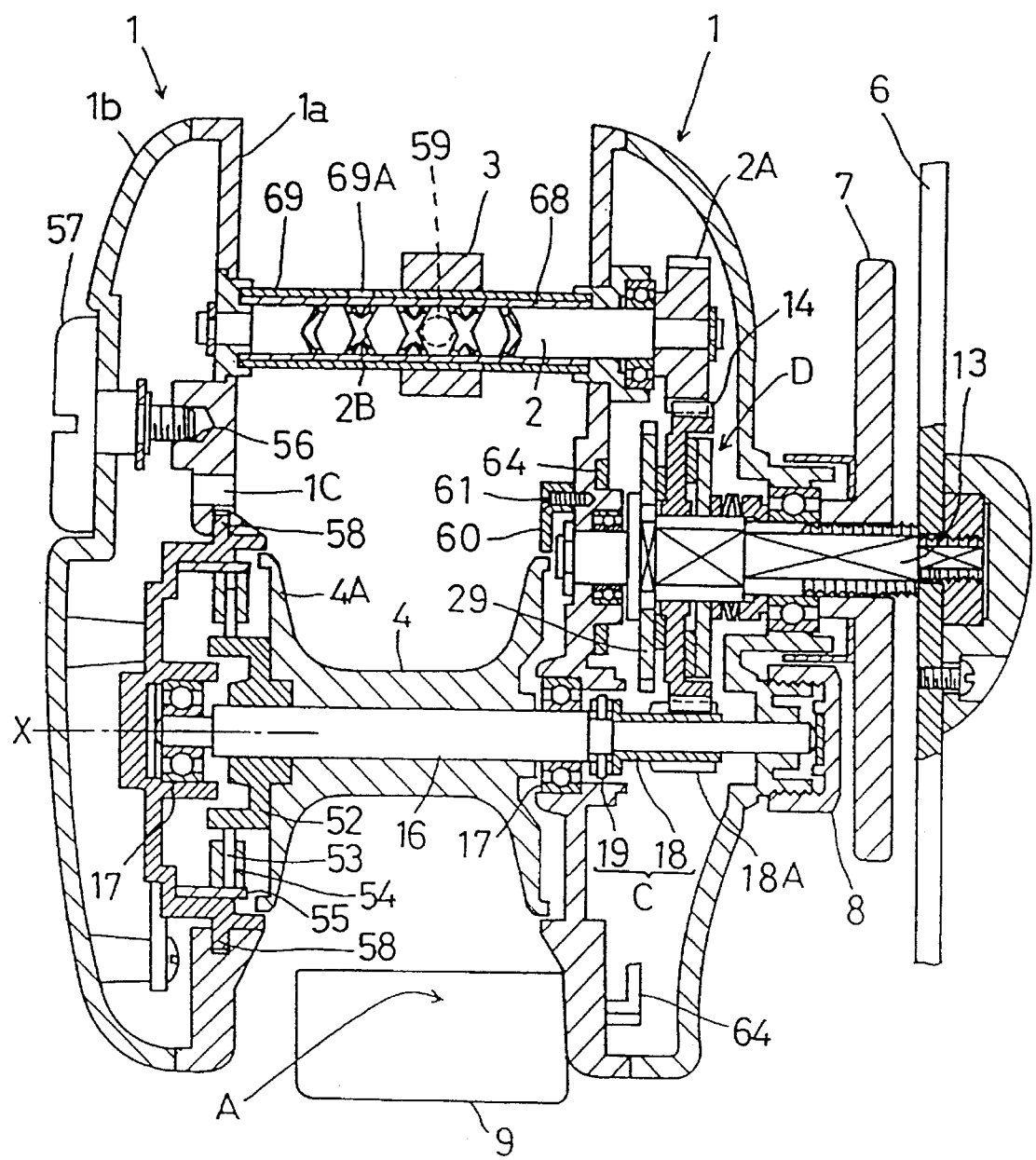
FIG. 25 is a plane view in section of the reel of the embodiment of FIG. 17.

As shown in FIGS. 17, 18 and 25, a baitcasting reel of this embodiment includes right and left frames 1, 1, a level wind mechanism disposed forwardly between the frames 1, 1 for reciprocating a line guide 3 to the right and left in association with rotation of a worm shaft 2, a spool 4 disposed centrally of the reel, and a handle 6, a drag controller 7 and a cast controller 8 mounted to the right frame 1.

In this reel, the right frame 1 accommodates a clutch mechanism C. A disengaging portion A for disengaging this clutch mechanism C is formed on a disengaging member 9 disposed between the right and left frames 1, 1 rearwardly of the spool 4. An engaging portion B for engaging the clutch mechanism C is formed on an engaging member 10 slidable to a face S of the frame 1 housing the clutch mechanism of opposing faces of the right and left frames 1, 1. This engaging member 10 is operable along an arcuate path extending about an axis X of the spool 4 and is operable to engage the clutch mechanism C with a forward operation of this member 10.

As shown in FIG. 25, in this reel, the left frame 1 accommodates a centrifugal force brake. This centrifugal force brake includes a collar 54 slidably mounted on a shaft 5S supported via a holder 52 to a spool shaft 6 rotatable with the spool 4 and an annular brake member 55 disposed outside a rotational moving path of this collar 54. This left frame 1 includes a body member 1a and a case 1b separable from each other. This case 1b includes a screw member 57 threadable with a female threaded portion 56 defined in the body member 1a. For detaching this case 1b from the body member 1b, the screw member 57 is loosened and then the case 1b is pivoted about the axis X of the spool 4. With this, the case 1b may be detached from the body member 1a.

Figure 22:
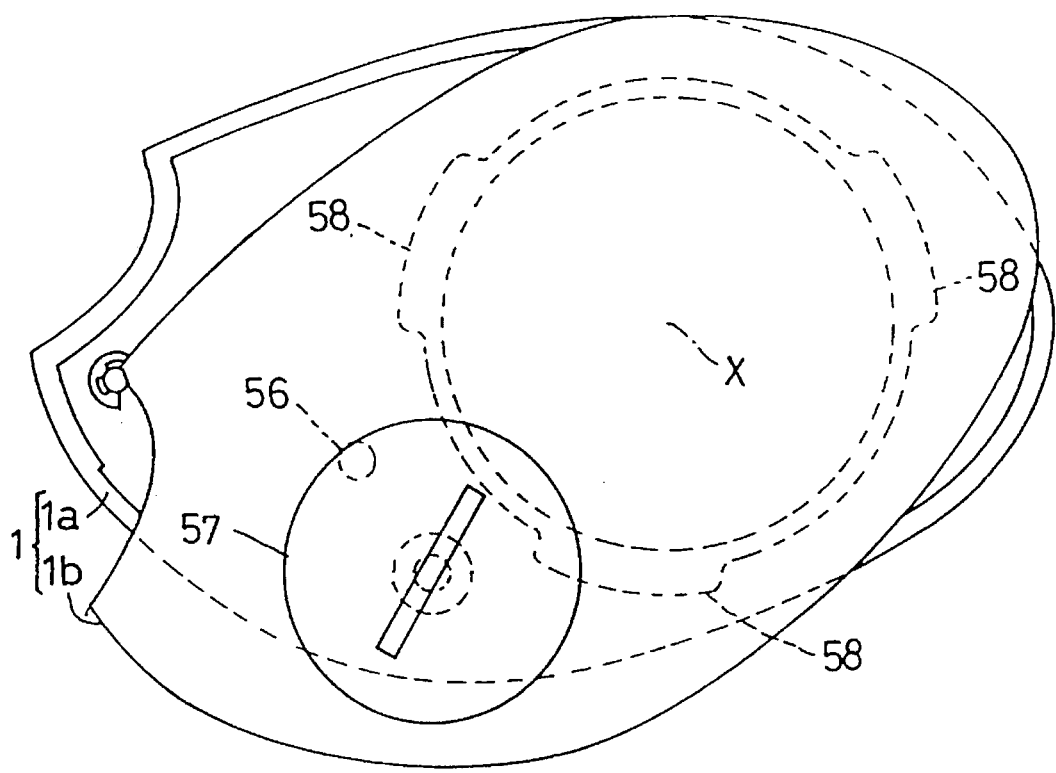

More particularly, the left body member 1a defines an inserting hole for the spool 4. And, in an inner face of the hole, there are formed three engaged portion (not shown) disposed equidistantly with respect to the axis X of the spool 4. On the other hand, the case 1b includes, in its inner face, pawls 58 engageable with and disengageable from the engaged portions through the pivotal operation about the axis X (in the manner similar to the bayonet construction commonly used for attachment and detachment of a lens assembly to and from a photographic camera body). Then, for detaching the case 1b, the screw member 57 is loosened to allow relative movement between the case 1b and the body member 1a. Then, with the pivotal operation, as shown in FIG. 22, these parts are detached from each other to allow insertion or withdrawal of the spool 4. The attachment and connection of these parts are effected by operations in the reverse direction.

Incidentally, the body member 1a (the inner side) of the left frame 1 defines a through hole 1C for allowing insertion of a screw driver for driving a screw 21 for fixing a cover member 60. This cover member 60 serves to cover an opening of the frame 1 defined adjacent an end portion of a handle shaft 13 to be described later. Downwardly of the right and left frames 1, 1, there is provided a leg 12 through a pair of forward and rear lower frames 11, 11.

Figure 20:
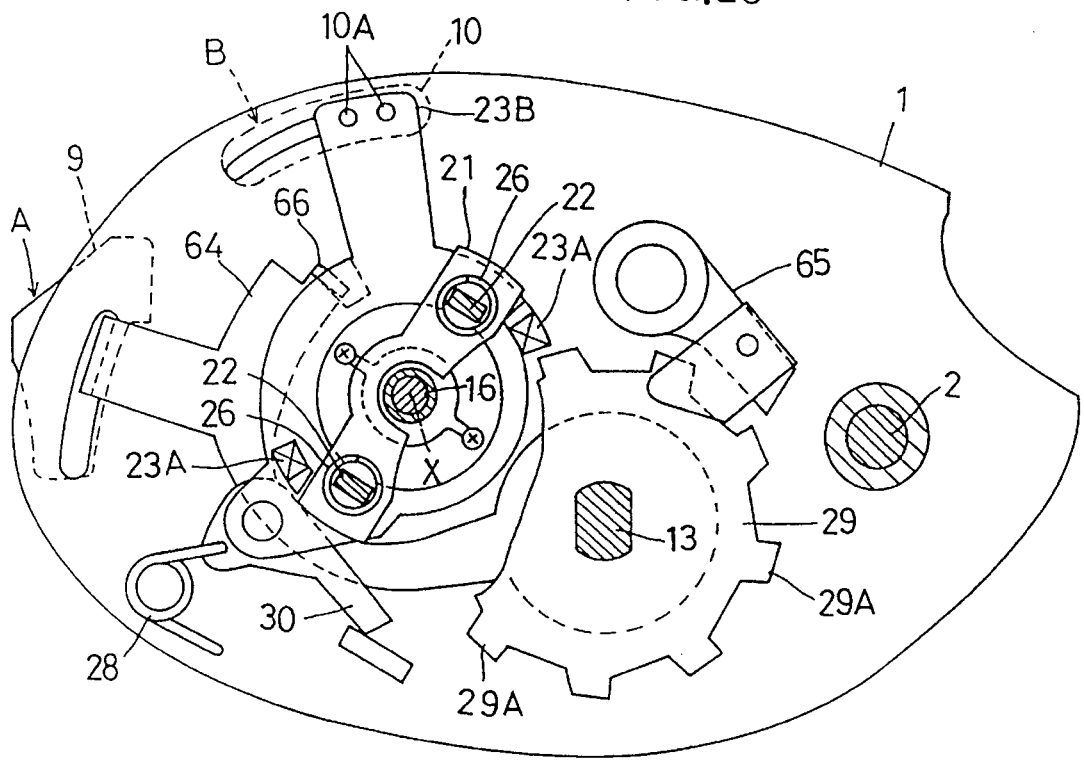
FIG. 20 is a side view of a clutch control system in a disengaged condition of the embodiment of FIG. 17.
Figure 21:
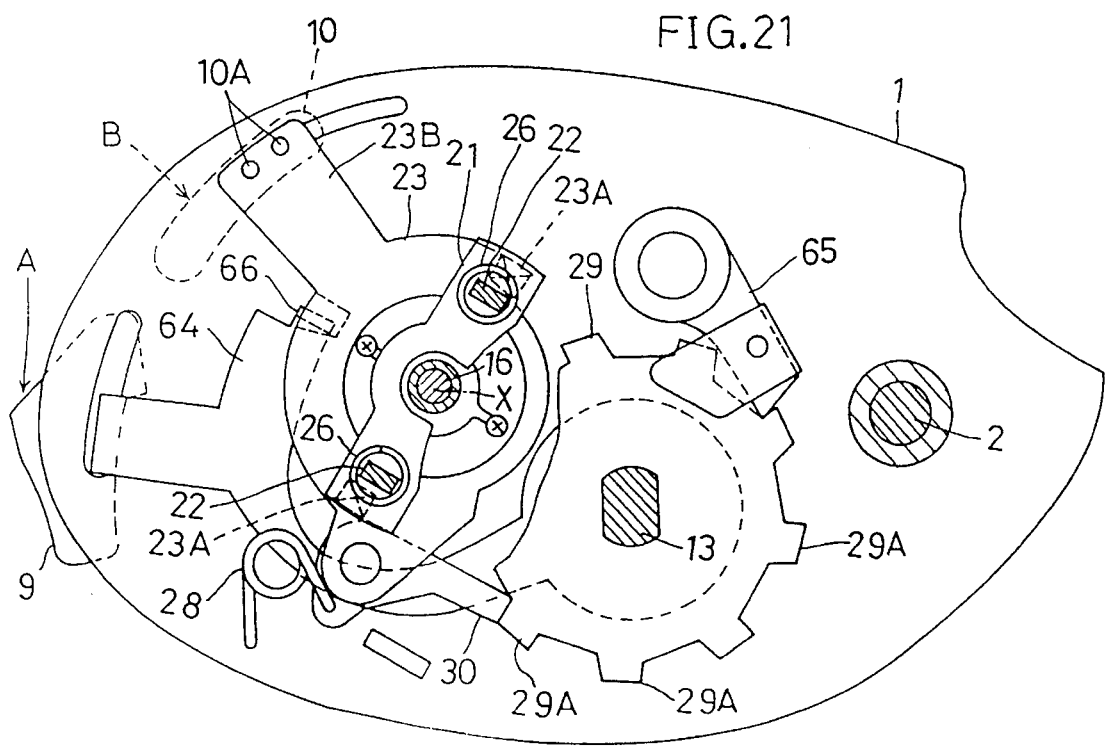
FIG. 21 is a side view of a clutch control system in an engaged condition of the embodiment of FIG. 17, FIG. 22 a side view relating to the embodiment of FIG. 17 showing a condition where a case is attached to or detached from a reel body.

As shown in FIGS. 20, 21 and 25, the handle shaft 13 supported to the right frame 1 mounts the handle 6 and a drag controller 7. The handle shaft 13 mounts, at inner end portion thereof, a drag mechanism D and a ratchet wheel 29. The ratchet wheel 29, through its engagement with a stopper 65, functions to prevent reverse (i.e. the line feeding direction) rotations of the spool 4 and the handle shaft 13. An output gear 14 of the drag mechanism D is meshed with an input gear 2A of the worm shaft 2.

Figure 19:
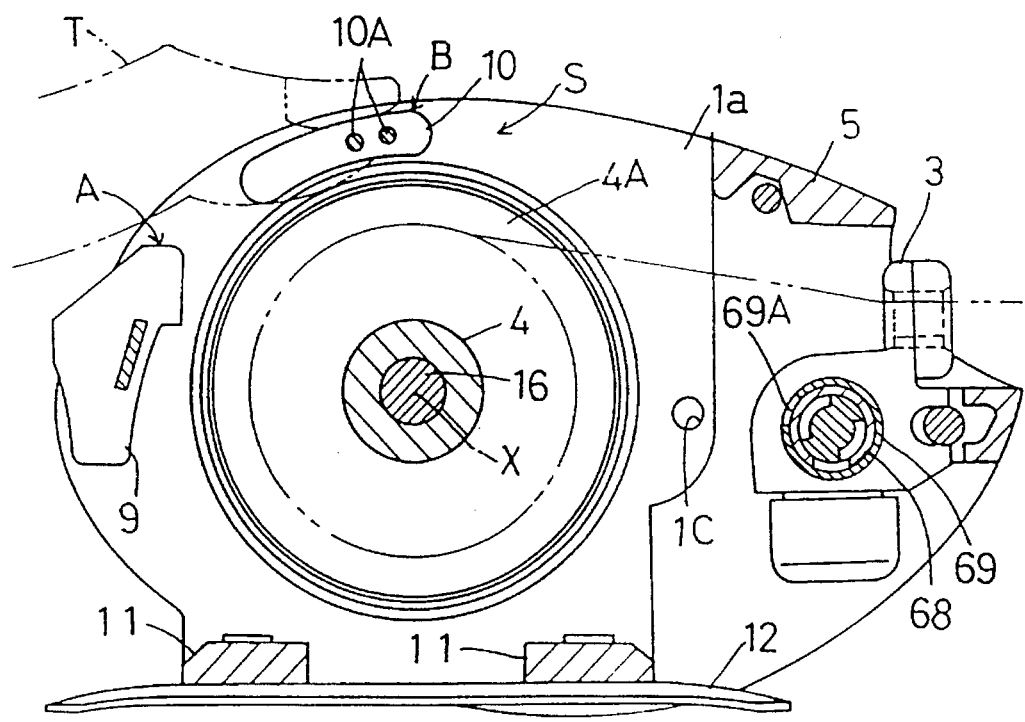
FIG. 19 is a side view in vertical section of the reel of the embodiment of FIG. 17 in a clutch engaged condition.
Figure 23:
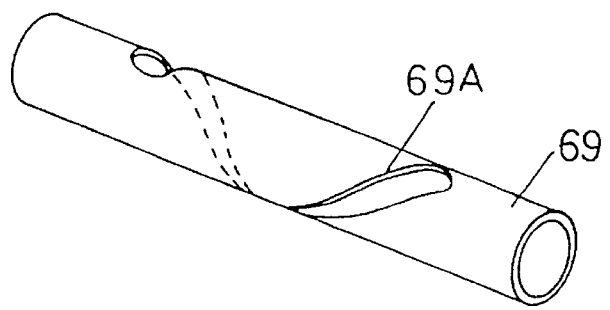
FIG. 23 is a perspective view showing a dust proof member relating to the embodiment of FIG. 17, FIG. 24 a side view of a clutch sleeve relating to the embodiment of FIG. 17.

As shown in FIGS. 18, 19 and 25, the worm shaft 2 defines a spiral groove 2B into which an engaging piece 59 supported by the line guide 3 may come into engagement. A cover 68 is provided for an area above this worm shaft 2. Further, on an outer face of this cover 68, as shown in FIG. 23, there is mounted a dust proof member 69 forming a spiral slit 69A for allowing insertion of the engaging piece 59. Incidentally, in association with a movement of this engaging piece 59, the dust proof member 69 is reciprocated about the axis of the worm shaft 2.

Figure 24:
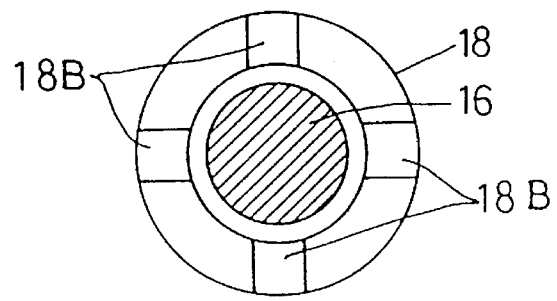

The spool shaft 16 rotatable in unison with the spool 4 is supported through bearings 17. The above-described clutch mechanism C comprises an engagement/disengagement arrangement between a clutch sleeve 18 slidably mounted on the spool shaft 16 and a pin 19 fixedly mounted on the spool shaft 16. A meshing arrangement between an input gear 18A of the clutch sleeve 18 and the output gear 14 of the drag mechanism D provides a transmission system for transmitting a rotational force from the handle 6 through the drag mechanism D and the clutch mechanism C to the spool 4. Incidentally, the clutch sleeve 18, as shown in FIG. 24, defines a cross-shaped (as viewed along the axis X of the spool 4) groove 18B engageable with the pin 19.

As shown in FIGS. 20 and 21, a yoke 21 for engaging and supporting the clutch sleeve 18 is slidably supported to a pair of support shafts 22, The clutch sleeve 18 is operated via this yoke 21 through contact of a pair of cam faces 23A, 23A of a rotary cam 23 rotatable about the axis X of the spool 4. The support shafts 22, 22 respectively mount compression springs 26, 26 for operating the yoke 21 in the direction for engaging the clutch mechanism C. Further, there is provided a return arm 30 which is switched over, by the effect of the toggle spring 28 when the clutch mechanism C is disengaged, to a posture where an end of the arm interferes with a ratchet wheel 29.

Incidentally, the rotary cam 23 is maintained at either the engaged or disengaged condition of the clutch mechanism C by the urging force of the toggle spring 28.

In the clutch disengaged condition, as shown in FIG. 20, the stopper 65 is placed in contact with the threaded portion 29A of the ratchet wheel 29 and the return arm 30 is placed in contact with the threaded portion 29A of the ratchet wheel 29, thereby to absorb a mechanical looseness of the handle shaft 13 in the rotational direction.

The disengaging member 9 is operatively connected with an end of a pivot frame 64 which is pivotable about the axis of the handle shaft 13. Then, as this pivot frame 64 is operatively connected with the rotary cam 23 via a contact piece 66, the clutch mechanism C is disengaged with a downward operation of the disengaging member 9. The rotary cam 23 integrally forms an extension portion 23B and this extension portion 23B and the engaging member 10 are connected with each other via a pin 10A.

Then, when this reel is used, as illustrated in FIG. 17, an angler grips a grip 31 of a rod R with rearwardly inserting the thumb T of one hand to a position in the vicinity of the spool 4. Then, a disengaging operation of the clutch mechanism C is possible by a natural downward pressing operation of the disengaging portion A by the thumb T. In the course of this disengaging operation, the disengaging member 9 moves along an arcuate path centering about the axis of the handle shaft 13 and also the rotary cam 23 rotates about the axis X of the spool 4. Then, through the pressing force of the cam faces 23A, 23A, the clutch sleeve 18 is operated in the clutch disengaging direction and simultaneously therewith the engaging portion B is pivoted downwards about the axis X.

As described above, when the clutch mechanism C is to be disengaged, the thumb T is already located in the vicinity of the spool 40 Therefore, the angler may readily effect a thumbing operation by placing the thumb T into contact with a flange portion 4A of the spool 4. Further, when the clutch mechanism C is to be engaged at the timing of landing of a lure or the like, by placing the tip of the finger into contact with the engaging portion B to forwardly press the same without interrupting the thumbing operation, the clutch mechanism C may be engaged immediately. In this engaging operation, as shown in FIG. 21, with the operating force on the disengaging member 9, the disengaging member 9 is moved along the arcuate path centering about the axis X of the spool 4 to rotate the rotary cam 23. As a result, the pressing force of the cam faces 23A, 23A is released and the clutch sleeve 18 is moved to the clutch disengaging position by the urging forces of the compression springs 26 of the yoke 21. Then, the spool shaft 16 and the ratchet wheel 29 become operatively connected to each other to restrict occurrence of a backlash and to enable a quick hooking operation.

Further, with this reel, the clutch mechanism C may be engaged by a line retrieving operation of the handle 6. In this operation, as the handle 6 is operated in the line retrieving direction, a pressing force from the threaded portion 29A of the wheel 29 moves, through the return arm 30, the rotary cam 23 in the clutch engaging direction, and the yoke 21 is activated by the urging forces of the compression springs 26, 26 thereby to engage the clutch mechanism C.

(f) A still further embodiment of the invention will be described next with reference to FIGS. 26 through 28.

This embodiment only slightly differs from the foregoing embodiment (the common constructions and components are denoted with the same reference marks and numerals). In this embodiment, a single operational member 74 forms a disengaging portion A and an engaging portion B.

Figure 26:
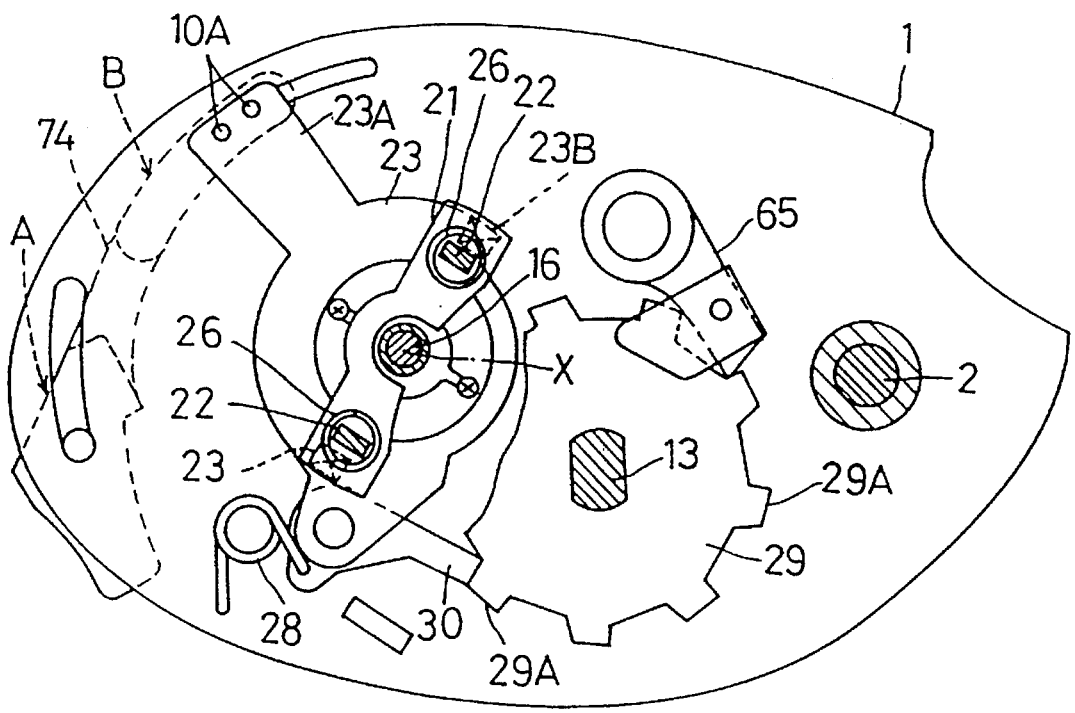
FIG. 26 is a side view of a clutch control system in a disengaged condition relating to a still further embodiment.
Figure 27:
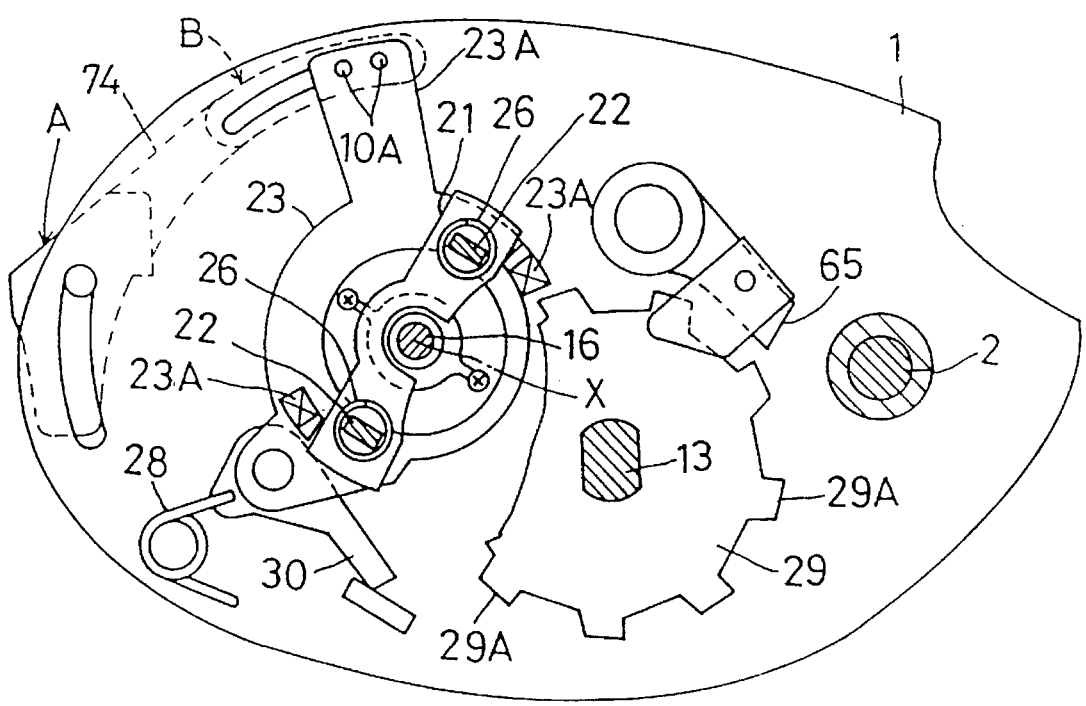
FIG. 27 is a side view of the clutch control system in an engaged condition relating to the embodiment of FIG. 26.
Figure 28:
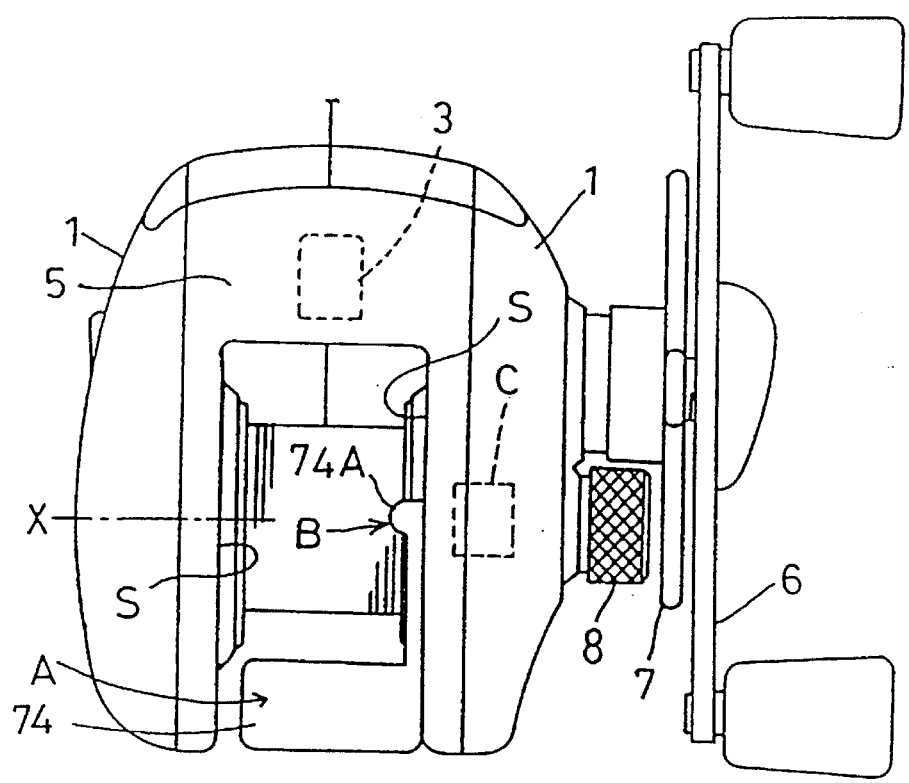
FIG. 28 is a plane view of the reel relating to the embodiment of FIG. 26.

As shown in FIGS. 26 through 28, the operational member 71 forms the disengaging portion A extending in parallel with the axis X of the spool 4 and the engaging portion A extending normal to the disengaging portion A in an 'L'-shaped configuration. This engaging portion B is disposed in contact with one of opposed faces S, S of the right and left frames 1, 1 which accommodates the clutch mechanism C. This operational member 74 is directly connected with the rotary cam 23 via the pin 10A.

Incidentally, the engaging portion B integrally forms a projecting portion 74A projecting centrally with respect to the width direction of the reel thereby to restrict slippage of the finger operating the same.

During use, like the above-described embodiment, an angler grips the grip 31 of the rod R with rearwardly inserting the thumb T of one hand to a position in the vicinity of the spool 4. Then, a disengaging operation of the clutch mechanism C is possible by a natural downward pressing operation of the disengaging portion A by the thumb T. In the course of this disengaging operation, as shown in FIG. 26, the disengaging portion A and the engaging portion B together with the operational member 74 move along the arcuate path centering about the axis of the handle shaft 13 and also the rotary cam 23 rotates about the axis X of the spool 4, thereby to allow easy visual of finger-feel confirmation of the condition of the clutch mechanism C. In the course of this operation, the rotary cam 23 is rotated about the axis X of the spool and through the pressing force of the cam faces 23A, 23A, the clutch sleeve 18 is operated to the clutch disengaging position.

As described above, when the clutch mechanism C is to be disengaged, the thumb T is already located in the vicinity of the spool 4. Therefore, in a casting operation, the angler may readily effect a thumbing operation by placing the thumb T into contact with the flange portion 4A of the spool 4. Further, when the clutch mechanism C is to be engaged at the timing of landing of a lure or the like, by placing the tip of the finger into contact with the engaging portion B to forwardly press the same without interrupting the thumbing operation, the clutch mechanism C may be engaged immediately. In this engaging operation, with the operating force on the operational member 74, the operational member 74 is moved along the arcuate path centering about the axis X of the spool 4 to rotate the rotary cam 23. As a result, the pressing force of the cam faces 23A, 23A is released and the clutch sleeve 18 is moved to the clutch disengaging position by the urging forces of the compression springs 28 of the yoke 21. Then, the spool shaft 16 and the ratchet wheel 29 become operatively connected to each other to restrict occurrence of a backlash and to enable a quick hooking operation.

(g) A still further embodiment will be described next with reference FIGS. 29 and 30. In this embodiment, the clutch mechanism C is disengaged by a downward depressing operation of a disengaging member 9 forming a disengaging portion A. An engaging portion B is formed on a knob of a push operation type switch 76 provided on one of opposing faces S, S of right and left frames 1, 1 which accommodates the clutch mechanism C. And, a control system for controlling the clutch mechanism C is constructed to be described next. Incidentally, with the downward depressing operation of the disengaging member 9, this disengaging member 9 is moved along an arcuate path.

A yoke 21 slidably supported along a pair of support shafts 22, 22 is urged in a clutch engaging direction by compression springs 26, 26. A clutch plate 77 includes cam faces 77A for operating the yoke 21 in a clutch disengaging direction through contact thereof with the yoke 21. A spring 79 is provided for urging the clutch plate 77 in the clutch engaging direction and also for causing the clutch plate 77 to pivot about a shaft member 78. One of a pair of extension end portions 77B, 77B of the clutch plate 77 is bent to form an engaging piece 80. Further, a retainer portion 81 is provided for coming into contact with the engaging piece 80 in the course of a disengaging operation of the clutch mechanism C thereby to prevent returning of the clutch plate 77 in the clutch engaging direction.

This retainer portion 81 is displaceable into a non-engaging posture by means of an electromagnetic solenoid 83 via a link 82. The electromagnetic solenoid 83 is supplied with power from an unillustrated battery with an operation of the switch 76 so as to be moved to the non-engaging posture thereby to release the engagement.

Figure 29:
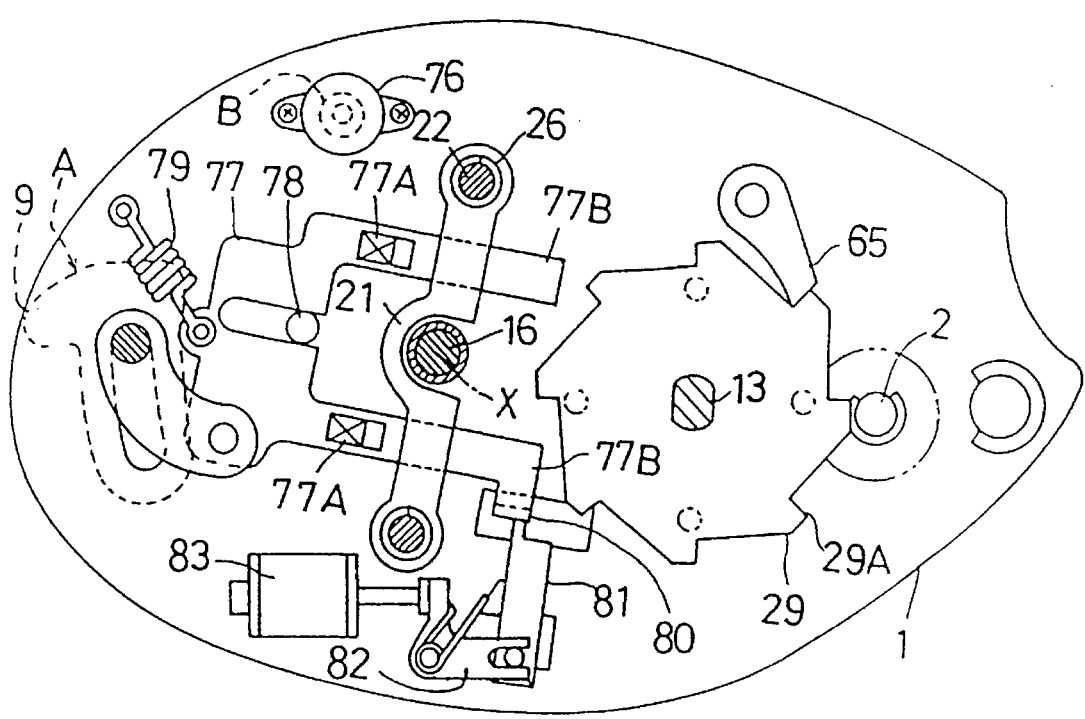
FIG. 29 is a side view of a clutch control system relating to a still further embodiment.
Figure 30:
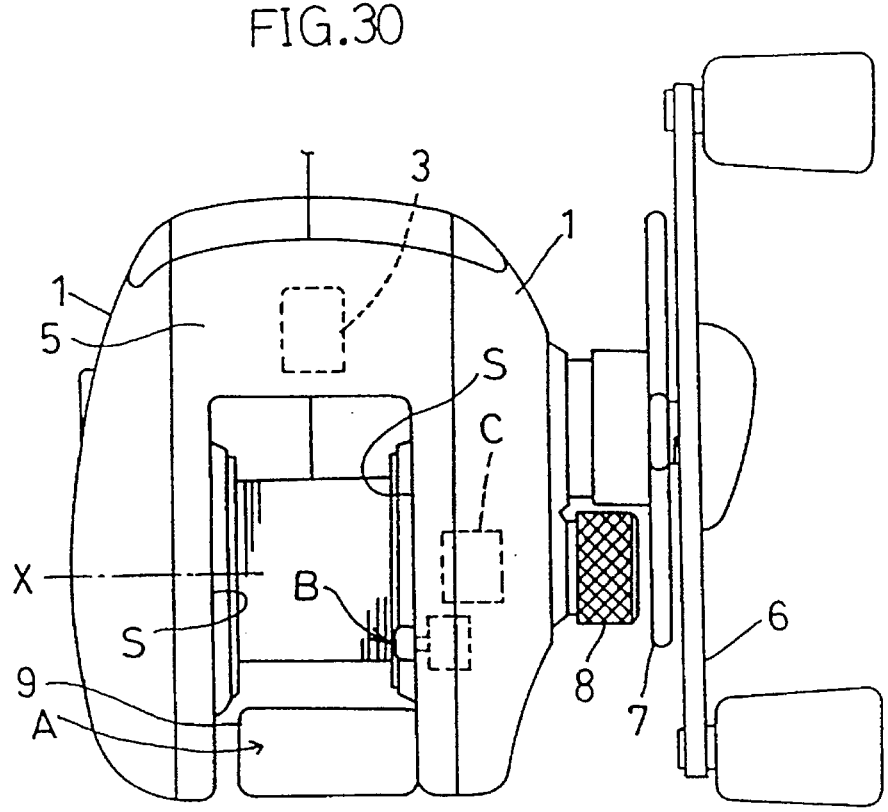

Incidentally, the engaging piece 80 is bent so as to extend normal to the plane of the view of FIG. 29.

For disengaging the clutch mechanism C of this reel, by downwardly depressing the disengaging portion A, the clutch plate 77 is moved to allow the clutch mechanism to reach its disengaged condition. Conversely, for engaging the clutch mechanism C, by operating the engaging portion B in a direction perpendicular to the face S of the frame 1, power is supplied from the battery to the electromagnetic solenoid 83 to energize the same, whereby the engagement between the engaging piece 80 and the retainer portion 81 is released and the clutch plate 77 is returned to the engaged condition by the urging force of the spring 79 thereby to engage the clutch mechanism C.

Figure 31:
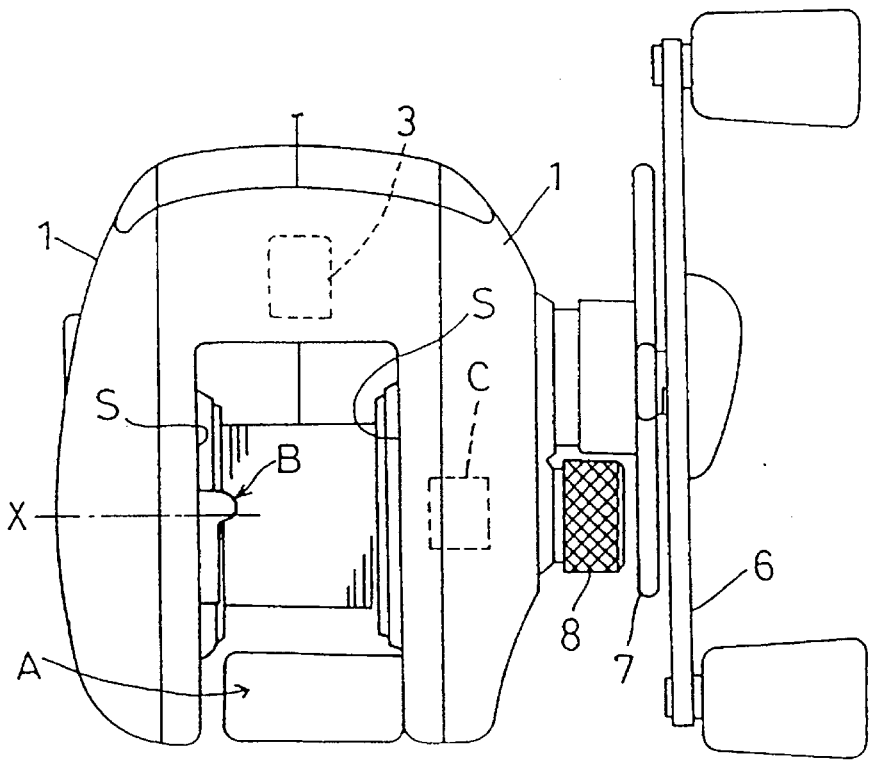

(h) As shown in FIG. 31, the engaging portion B may be formed on the other of the opposing faces S, S of the right and left frames 1, 1 which does not accommodate the clutch mechanism C.

Figure 32:
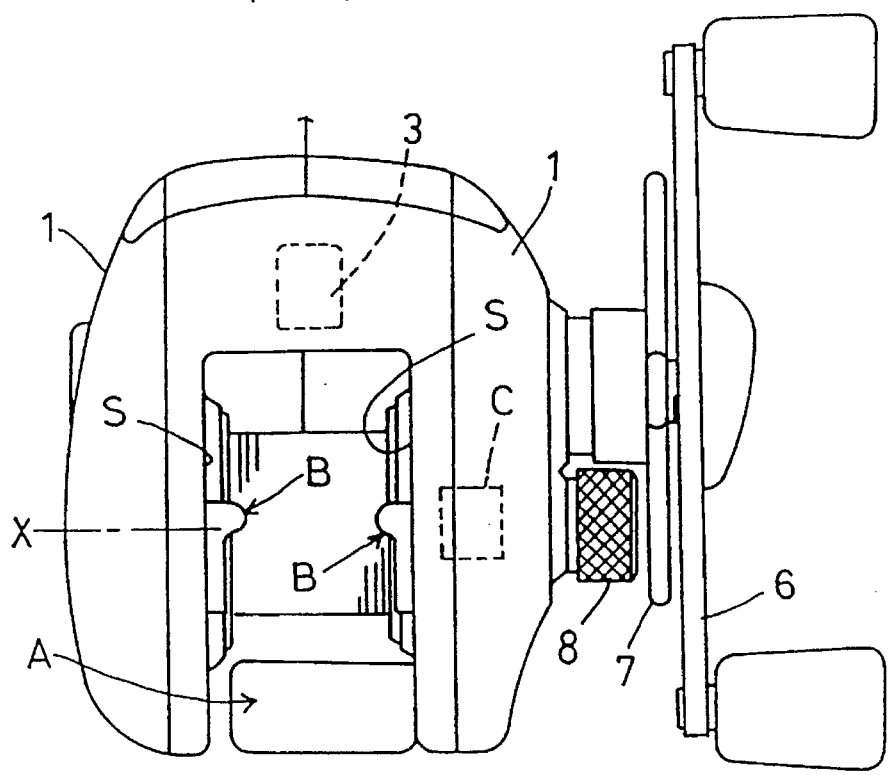
FIG. 32 is a plane view of a reel relating to a still further embodiment.

(i) As shown in FIG. 32, a pair of engaging portions B, B may be formed on the respective opposing faces S, S of the right and left frames 1, 1.

Figure 33:
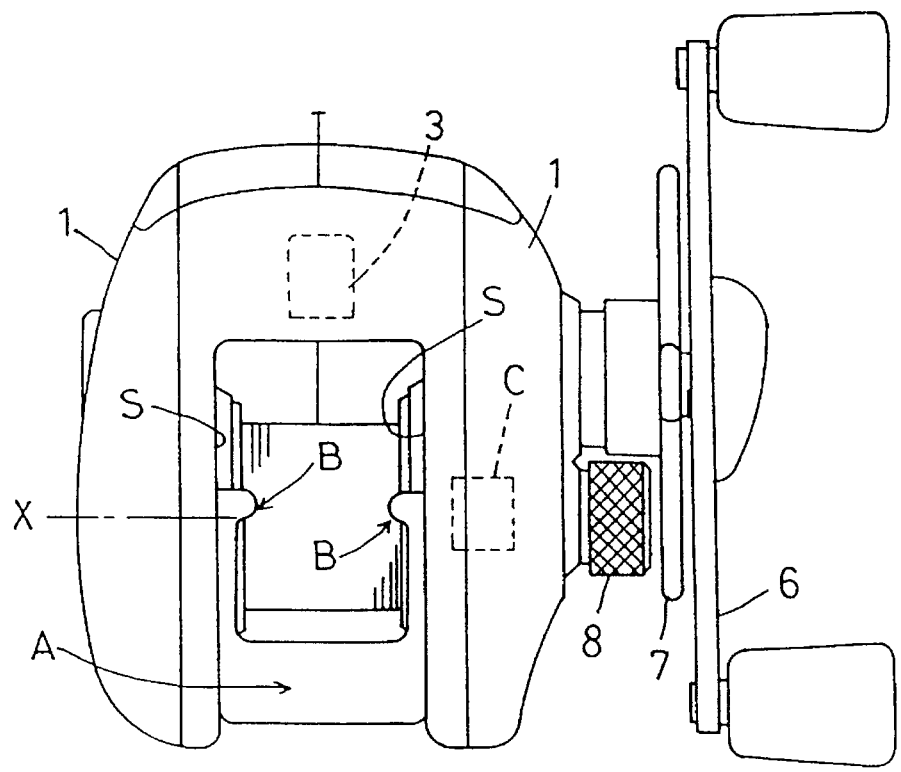
FIG. 33 is a plane view of a reel relating to a still further embodiment.

(j) As shown in FIG. 33, a pair of engaging portions B, B may be formed on the respective opposing faces S, S of the right and left frames 1, 1 and further these engaging portions B, B and the disengaging portion A may be formed on a single integrally operable member.

Figure 34:
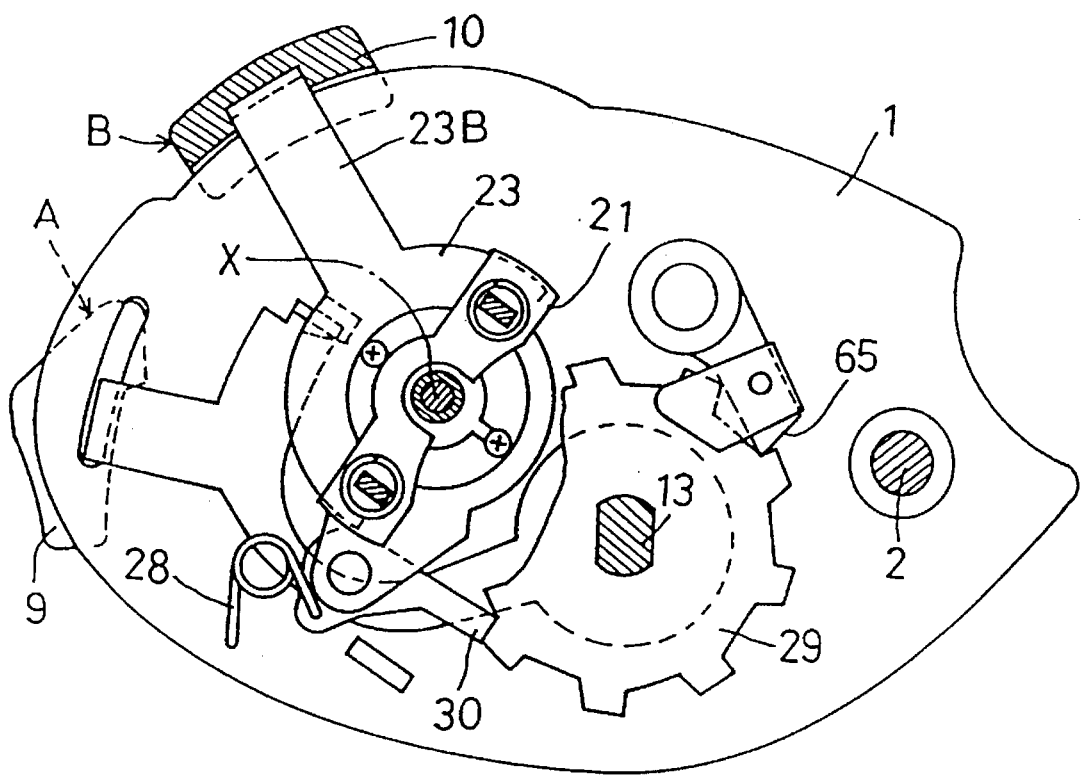
FIG. 34 is a side view showing a clutch control system relating to a still further embodiment.
Figure 35:
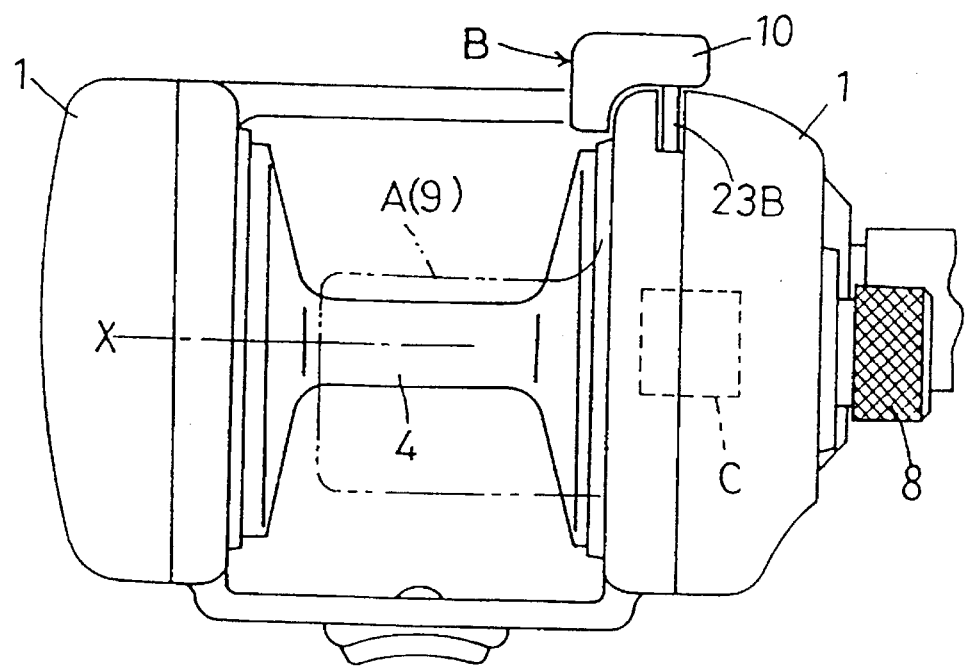
FIG. 35 is a rear view of the reel relating to the embodiment of FIG. 34.

(k) FIGS. 34 and 35 show a still further embodiment of the invention. In the clutch disengaging construction of this embodiment, like the foregoing embodiment, the disengaging portion A is formed on the disengaging member 9 for rotatably operating the rotary cam 23 of the clutch mechanism C (FIG. 34 shows the disengaged condition of the clutch mechanism C). An end of an extension portion 23B formed integrally with the rotary cam 23 of the clutch mechanism C is formed to extend to a position exposed above the upper surface of the frame 1. Then, on this end portion, the engaging member 10 is fixedly provided. Further, the engaging portion B is formed by a face of this engaging member 10 on the side of the spool 4.

Incidentally, with the construction of this embodiment, the engaging portion B is operable also at a position upwardly projecting beyond the upper surface of the frame 1.

As a modified construction of this embodiment, the engaging portion B may be disposed at a position upwardly distant from the frame relative to the direction along the axis X of the spool.

(l) The engaging portion may be constructed to be slidable along a face of the frame to and away from the spool axis.

(m) A still further embodiment of the invention will be described next.

Figure 36:
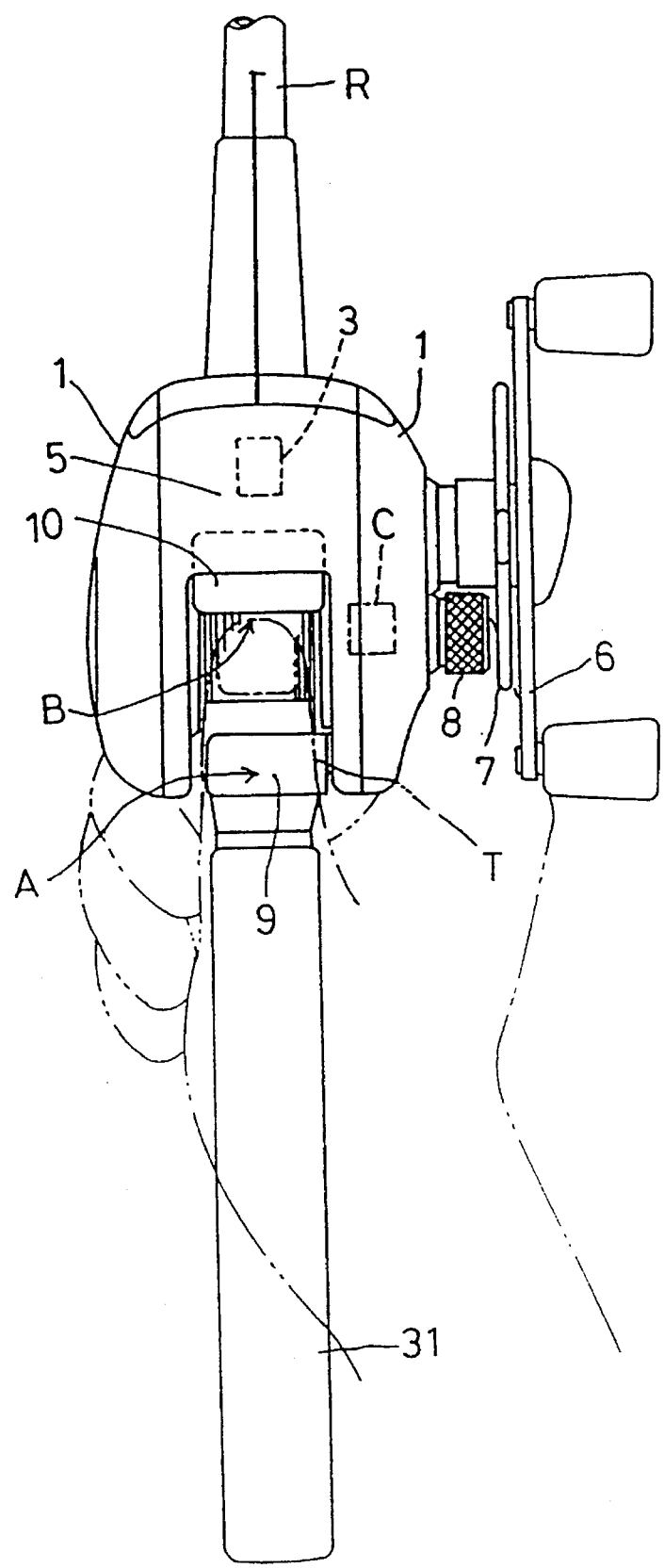
FIG. 36 is a plane view of a reel relating to a still further embodiment of the invention showing the reel attached to a rod.
Figure 37:
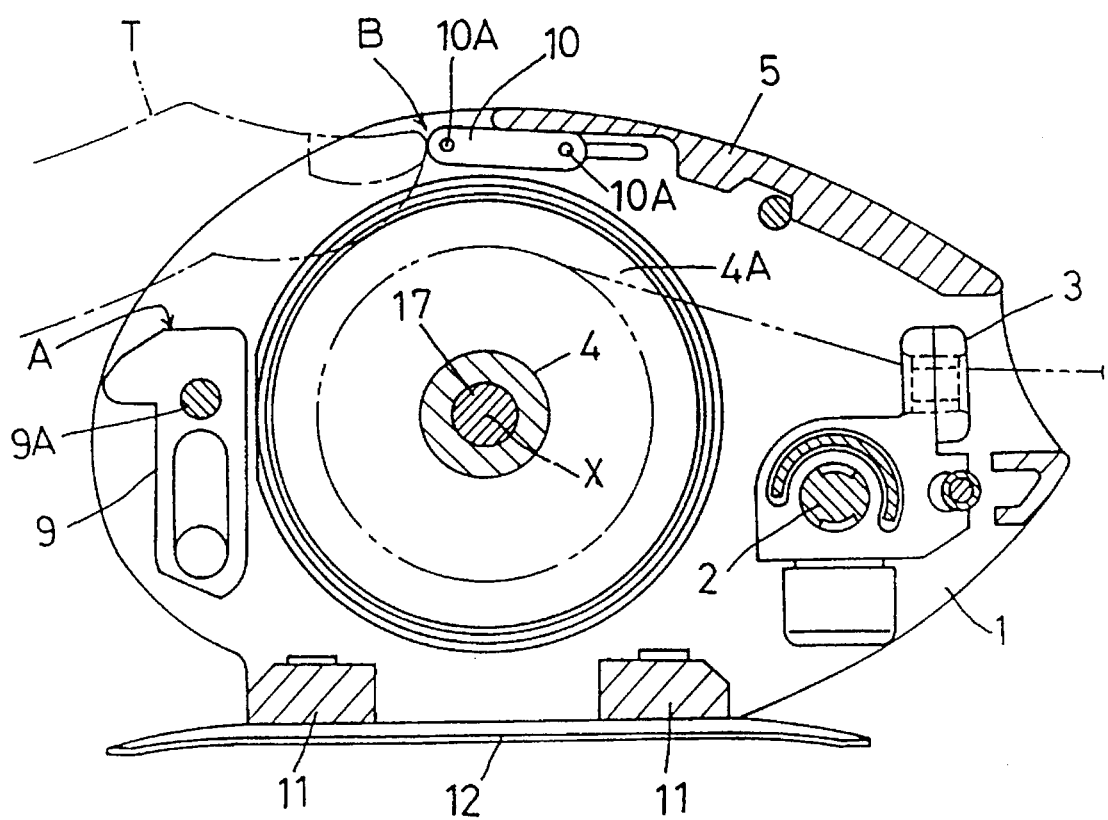
FIG. 37 is a side view in vertical section of the reel of the embodiment of FIG. 36.

This embodiment, as shown in FIGS. 36 and 37, relates to a baitcasting reel. More particularly, this baitcasting reel includes right and left frames 1, 1, and a level wind mechanism disposed forwardly of and between the frames 1, 1 for reciprocating a line guide 3 to the right and left in association of rotation of a worm shaft 2. The reel further includes a spool 4 disposed at the center of the reel and a thumb rest 5 extending between upper portions of the right and left frames 1, 1. The right frame 1 mounts a handle 6, a drag controller 7 and a cast controller 8.

In this reel, the right frame 1 accommodates a clutch mechanism C. A disengaging portion A for disengaging this clutch mechanism C is formed on a disengaging member 9 disposed between the right and left frames 1, 1 rearwardly of the spool 4. Further, an engaging portion B for engaging the clutch mechanism C is formed on an engaging member 10 disposed between the right and left frames 1, 1 adjacently above an outer periphery of the spool 4 with a distance from the disengaging portion A allowing an insertion of a thumb or finger therebetween.

Downwardly of the right and left frames 1, 1, there is provided a leg 12 via a pair of forward and rear lower frames 11, 11.

Figure 38:
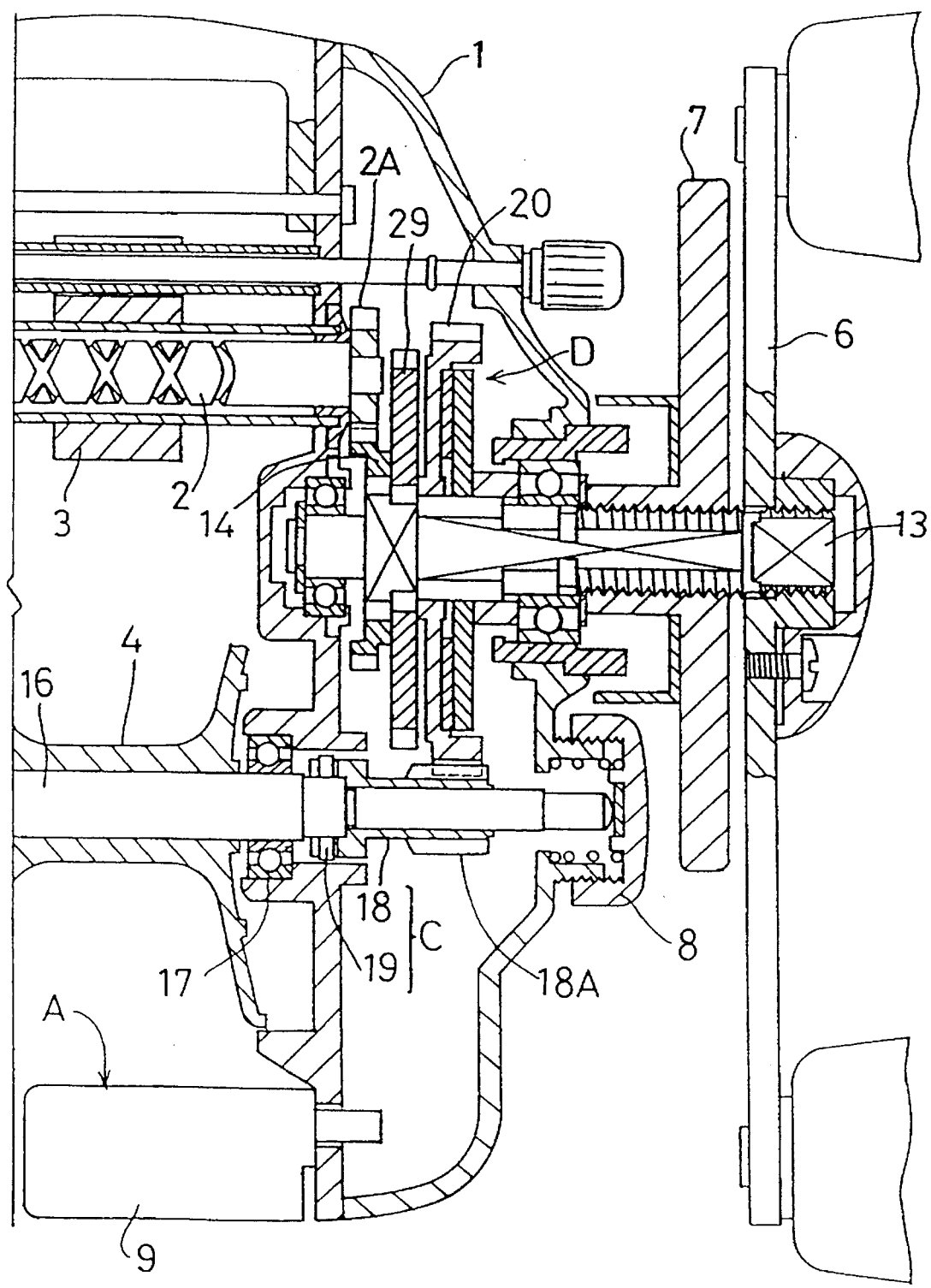
FIG. 38 is a section of a right portion of the reel of the embodiment of FIG. 36.

As shown in FIG. 38, the right frame 1 mounts a handle shaft 13 which mounts in turn the handle 6 and the drag controller 7. The handle shaft 13 mounts, at an inner end portion thereof, a drag mechanism D and an output gear 14. A stopper 65 (see FIG. 39) is provided to be operable, through contact with a threaded portion 29A of a ratchet wheel 29, to prevent a reverse rotation (rotation in a line feeding direction) of the spool 4 and the handle shaft 13. Then, a drive force from the handle 6 is transmitted via the output gear 14 to an input gear 2A of the worm shaft 2.

Between the right and left frames 1, 1, there is supported, via bearings 17, a spool shaft 16 rotatable with the spool 4. The clutch mechanism C comprises an engagement-disengagement construction between a clutch sleeve 18 slidably mounted on the spool shaft 16 and a pin 19 fixedly mounted on the spool shaft 16. By engagement between an input gear 18A of the clutch sleeve 18 and an output gear 20 of the drag mechanism D, there is established a transmission system for transmitting the rotational force from the handle 6 to the spool 4 via the drag mechanism D and the clutch mechanism C.

Figure 39:
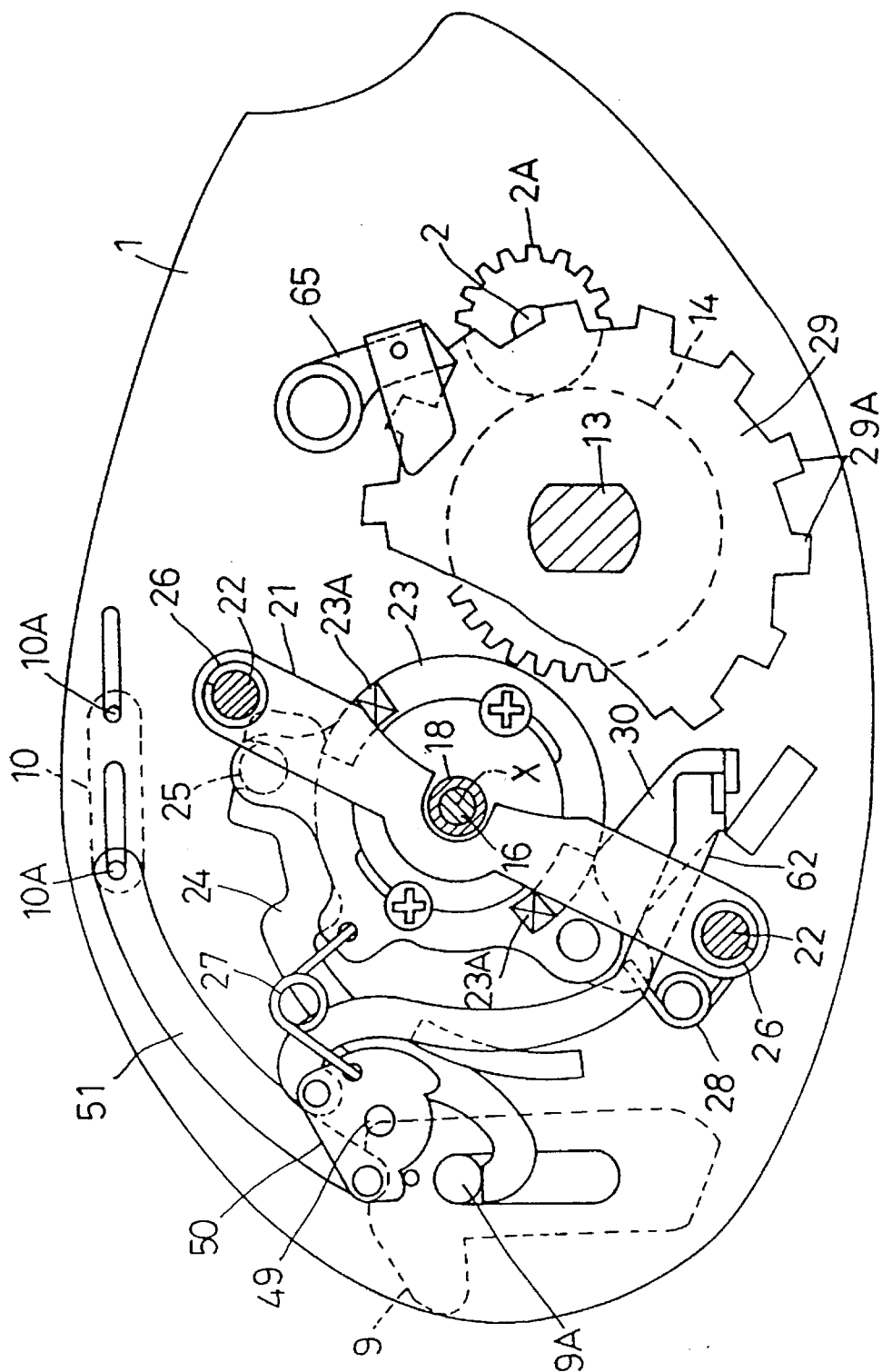
FIG. 39 is a side view of a clutch control system in an engaged condition relating to the embodiment of FIG. 36, FIG. 40 (a) is a side view of the clutch control system in a disengaged condition relating to the embodiment of FIG. 36.

As shown in FIGS. 39 and 40, a yoke 21 engaging and supporting the clutch sleeve 18 is slidably mounted on a pair of support shafts 22, 22. Through abutment between a rotary cam 23 rotatable about an axis X of the spool 4 and a pair of cam faces 23A, 23A, there is provided a construction for operating the clutch sleeve 18 via this yoke 21. Further, a link member 24 operable to be brought into contact with a control pin 9A of the disengaging member 9 is engaged with an engaging pin 25 of the rotary cam 23 (operational member).

The support shafts 22, 22 respectively mount compression springs 26, 26 for operating the yoke 21 in a direction for engaging the clutch mechanism C. The rotary cam 23 is placed under an effect of a toggle spring 27 for maintaining a rotational posture of this rotary cam 23 to a state for engaging or disengaging the clutch mechanism C. Further, there is provided a return arm 20 which is switched over, by the effect of the toggle spring 28 when the clutch mechanism C is disengaged, to a posture where an end of the arm interferes with the ratchet wheel 29.

Figure 40A:
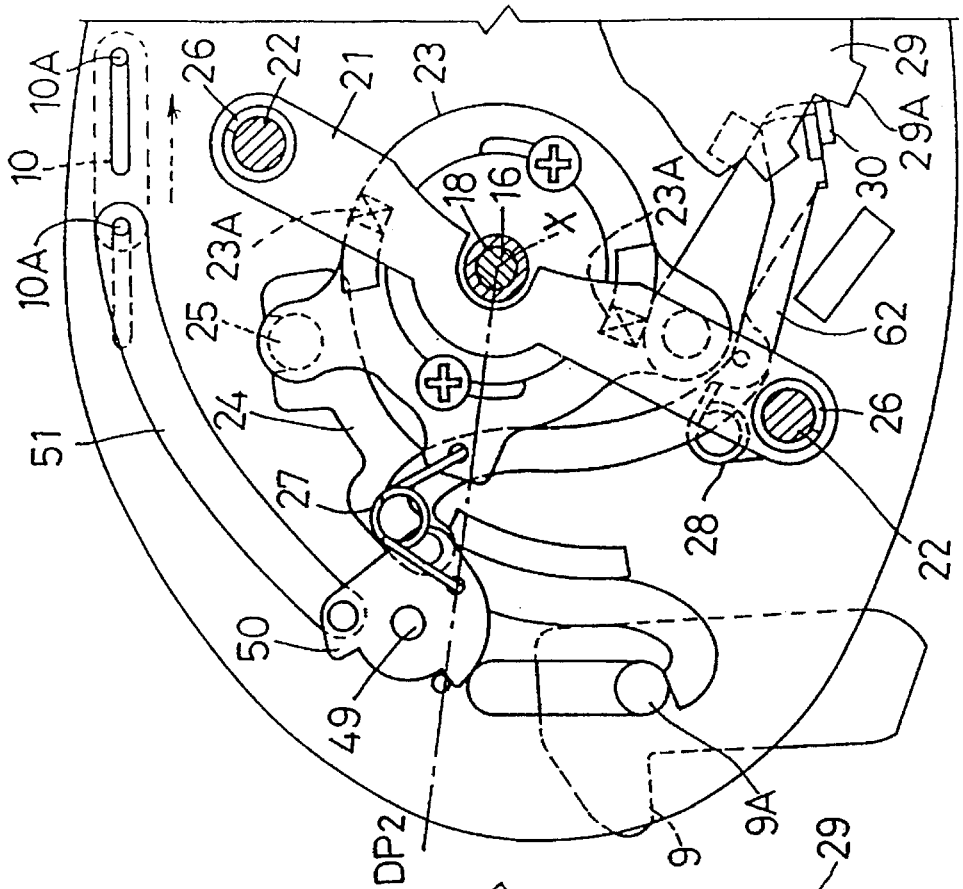
FIG. 40(b) is a side view of the clutch control system relating to the embodiment of FIG. 36 showing a condition of the system immediately after an engaging operation.

Incidentally, as the rotary cam 23 (operational member) is set to a rotational position (engaging position) shown in FIG. 40(a), this rotational position is maintained by the urging force of a toggle spring 27. Further, the yoke 21 is retained at the engaging position by the urging forces of the compression springs 26, 26. With these, the engaged condition of the clutch mechanism C is maintained. On the other hand, when the rotary cam is set to a further rotational position (disengaging position) shown in FIG. 39, this rotational position is maintained by the urging force of the toggle spring 27 and also with abutment of the cam faces 23A, 23A, the yoke 21 is pressed in the direction of the axis X of the spool 4 thereby to disengage the clutch mechanism C.

An end of the toggle spring 27 is supported to a pivot type switch-over member 50 pivotably supported to the frame 1 via a shaft 49. When this switch-over member 50 is set to a retaining posture shown in FIG. 40(a), a dead point of the toggle spring 27 is set at an intermediate position between the engaging position and the disengaging position of the rotary cam, thereby to retain the rotary cam at either the engaging position or the disengaging position (this dead point will be referred to as the dead point DP1 hereinafter). On the other hand, when the switch-over member 50 is set to a return posture shown in FIG. 40(b), the dead point of the toggle spring 27 is displaced downwardly, thereby to cause the rotary cam 23 to move to the engaging position even if this rotary cam is presently at the disengaging position (this further dead point will be referred to as the dead point DP2 hereinafter). The distance between the two dead points comprises the operational stroke of the switch-over member A pin 10A formed on the engaging member 10 is inserted through a guide slot defied in the frame 1 and is supported to be switched over between a position to be covered under the thumb rest 5 in the plane view and a further position to be rearwardly exposed from the rear end of the thumb rest 5. Further, in order to allow the switch-over member 50 to return to the return position with a forward pressing operation of the engaging member 10, the pin 10A and the switch-over member 50 are operatively connected with each other via a link piece 51. Further, the switch-over member 50 is also operatively connected with a return member 62 acting as a return control mechanism to be displaced to a position contacting the threaded portion 29A of the ratchet wheel 29 when the switch-over member 50 reaches the return posture.

When this reel is used, as shown in FIG. 36, with keeping the thumb T of one hand inserted between the disengaging portion A and the engaging portion B, the grip 31 of the rod R is gripped by said hand. Then, for disengaging the clutch mechanism C for e.g. a casting operation, the disengaging portion A is depressed downward. With this, as illustrated in FIG. 40(a), by the control force from the pin 9A formed on the disengaging member 9, the rotary cam 23 reaches the disengaging position and the pivot of the toggle spring 27 on the side of the rotary cam 23 is moved downward beyond the dead point DP1. As a result, the rotary cam 23 is maintained at said position by the urging force of the toggle spring 27 and the clutch mechanism C is maintained at the disengaged position.

Figure 40B:
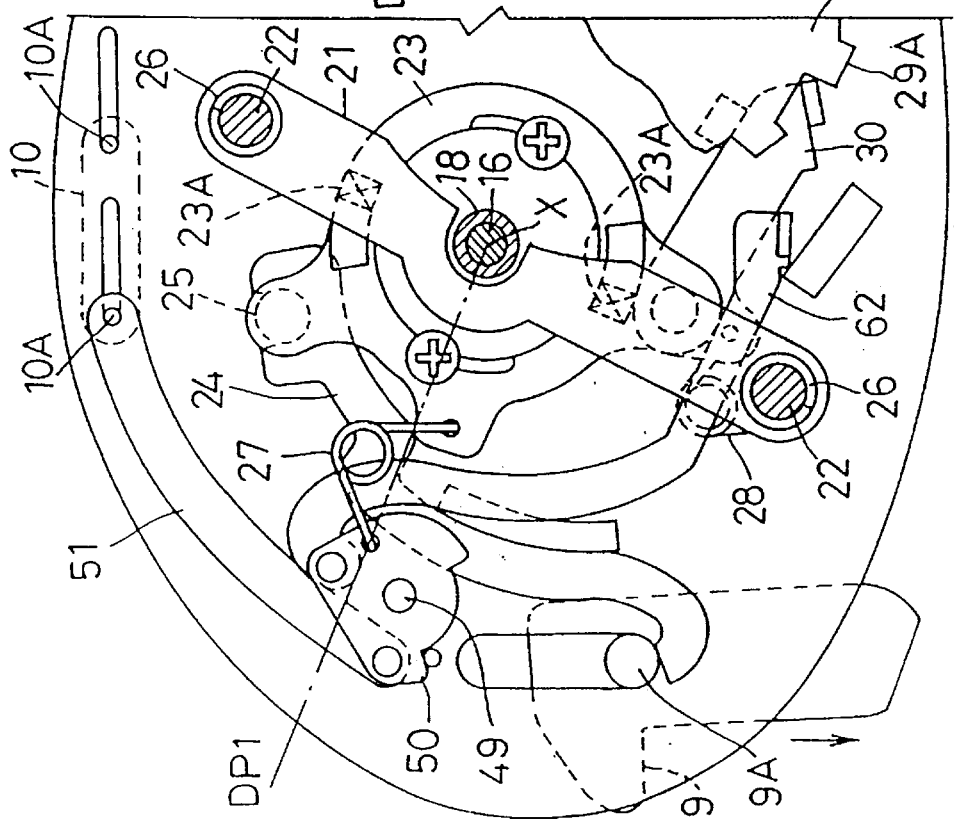

Then, as a lure is cast while thumbing the flange portion 4A of the spool 4, and if the angler feels a fish bite immediately after landing of the lure, the angler shifts the thumbing thumb T slightly forwardly. With this, as shown in FIG. 40(b), by the control force from the pin 10A of the engaging member 10, the switch-over member 50 is moved from the retaining posture to the return posture. Then, as the pivot of the toggle spring 27 on the side of the rotary cam 23 is displaced downwardly beyond the dead point DP2 of the toggle spring 27, the rotary cam 23 reaches the engaging position by the urging force of the toggle spring 27. Further, the switch-over member 50 is maintained at the return posture by the urging force of the toggle spring 27.

Incidentally, FIG. 39 shows a condition immediately after the switch-over of the dead point with the operation of the engaging member 10 and before the clutch mechanism C returns to its engaged position.

When the clutch mechanism C reaches the engaged position, reverse rotation of the spool 4 is prevented by engagement between the ratchet wheel 29 and the stopper 65, thereby to enable a quick hooking operation. In this condition, even if the clutch mechanism C is disengaged, with release of the force of this disengaging operation, the clutch mechanism C returns to the engaged position. Accordingly, a flipping mode fishing is possible. Incidentally, in this flipping mode, since this mode is released in association with a line retrieving operation of the handle 6 to be described later, for this mode of fishing, it is necessary to operate, in advance, the engaging portion B in the engaging direction with completion of each line-retrieving operation by the handle 6.

Next, when the handle 6 is operated in the line retrieving direction, the pressing force from the threaded portion 29A of the ratchet wheel 29 is applied to the return member 62. Then, the switch-over member 50 returns to the retaining position, and the disengaged condition may be maintained by the urging force of the toggle spring 27 when the clutch mechanism C is disengaged thereafter.

Incidentally, in this reel, when the handle 6 is rotatably operated in the line retrieving direction with the clutch mechanism C being maintained at the disengaged position, the pressing force from the threaded portion 29A of the ratchet wheel 29 serves to operates via the return arm 30, the rotary cam 23 to the clutch engaging position and the yoke 21 is activated by the urging forces of the compression springs 26 thereby to cause the clutch mechanism C to reach its engaged position.

(n) A still further embodiment of the invention will be described next.

This embodiment differs only in the control system of the clutch mechanism. Accordingly, the same constructions and components as those of the foregoing embodiment are denoted with the same reference marks and numerals.

A reel of this embodiment, as shown in FIGS. 41 through 44, includes, like the foregoing embodiment, a toggle spring 27 for retaining the rotary cam 23 at either the clutch engaging position or the clutch disengaging position and further includes a return spring 70 for providing the rotary cam 23 at the disengaged position with an urging force weaker than the urging force from the toggle spring 27.

Figure 43:
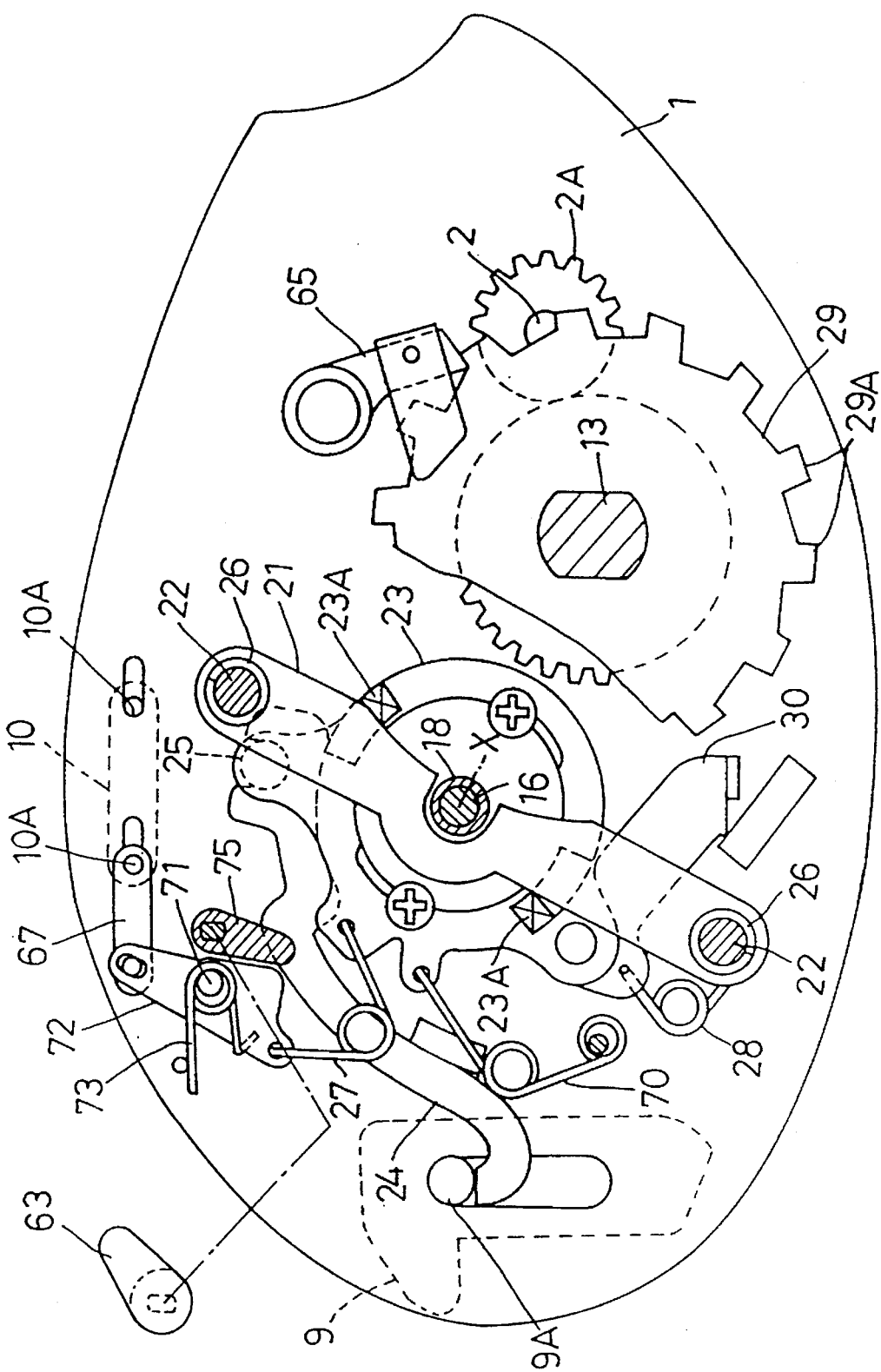
FIG. 43 is a side view of the clutch control system in a disengaged condition relating to the embodiment of FIG. 41.

As shown in FIG. 43, one end of the toggle spring 27 is supported to a pivot type control member 72 pivotably supported to the frame via a shaft 71. Further, there is provided a setting spring 73 for setting this control member 72 to an operative posture shown in this FIG. 43. A pivotal stroke of this control member 72 is set so that the urging force exerted from the toggle spring 27 to the rotary cam 23 is released when the control member 72 is set to an inoperative posture against the urging force of the setting spring 73.

The pin 10A formed on the engaging member 10 extends through a guide slot defined in the frame 1 and is supported there to be switchable between a position to be covered under the thumb rest 5 in the plane view and a further position to be rearwardly exposed from the rear end of the thumb rest 5. In order for the control member 72 to be operated to the inoperative posture with a forward pressing operation of the engaging member 10, the pin 10A and the control member 72 are operatively connected with each other via a link piece 67.

There are provided a restricting piece 75 (an example of a mode selecting mechanism) operable to come into contact with the control member 72 thereby to retain this control member 72 at its inoperative posture and a mode lever 63 provided on the outer face of the frame 1 for operating the restricting piece 75.

Figure 41:
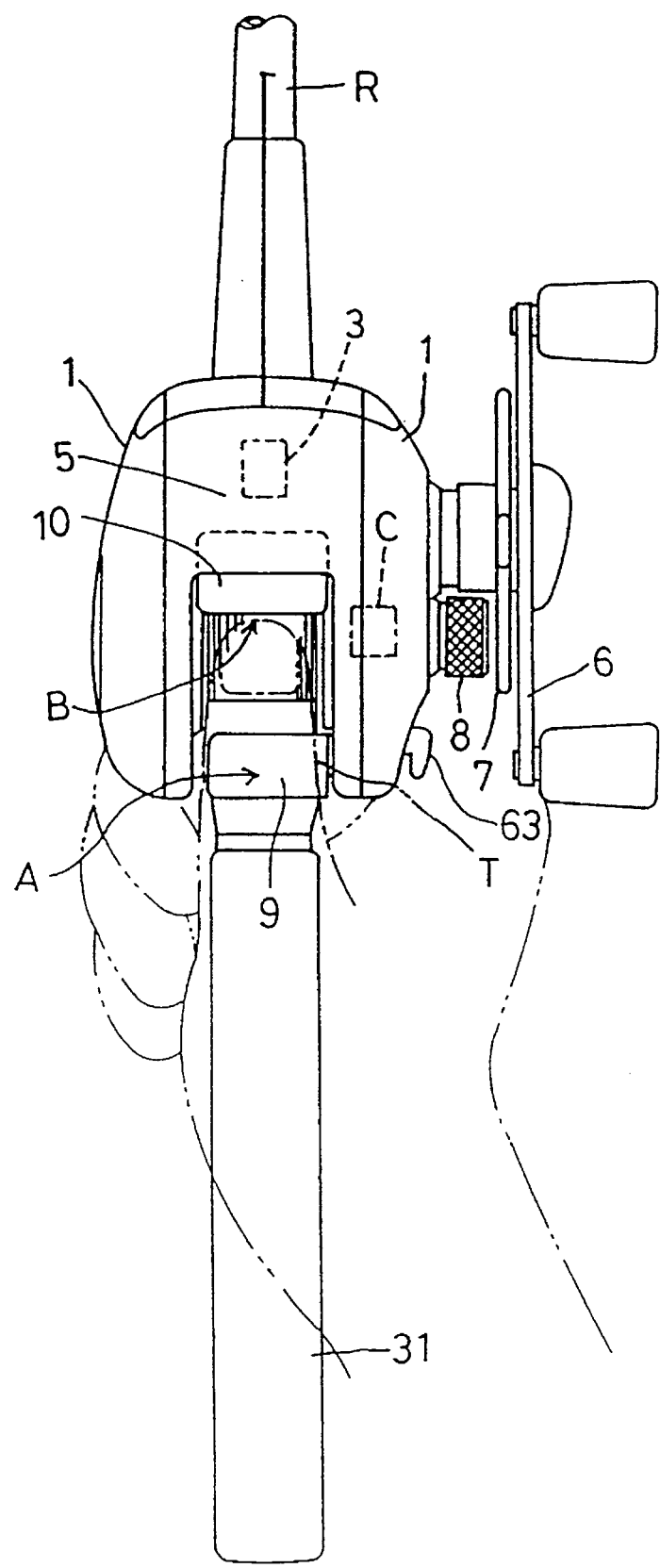
FIG. 41 is a plane view of a reel relating to a still further embodiment showing the reel attached to a rod.
Figure 42:
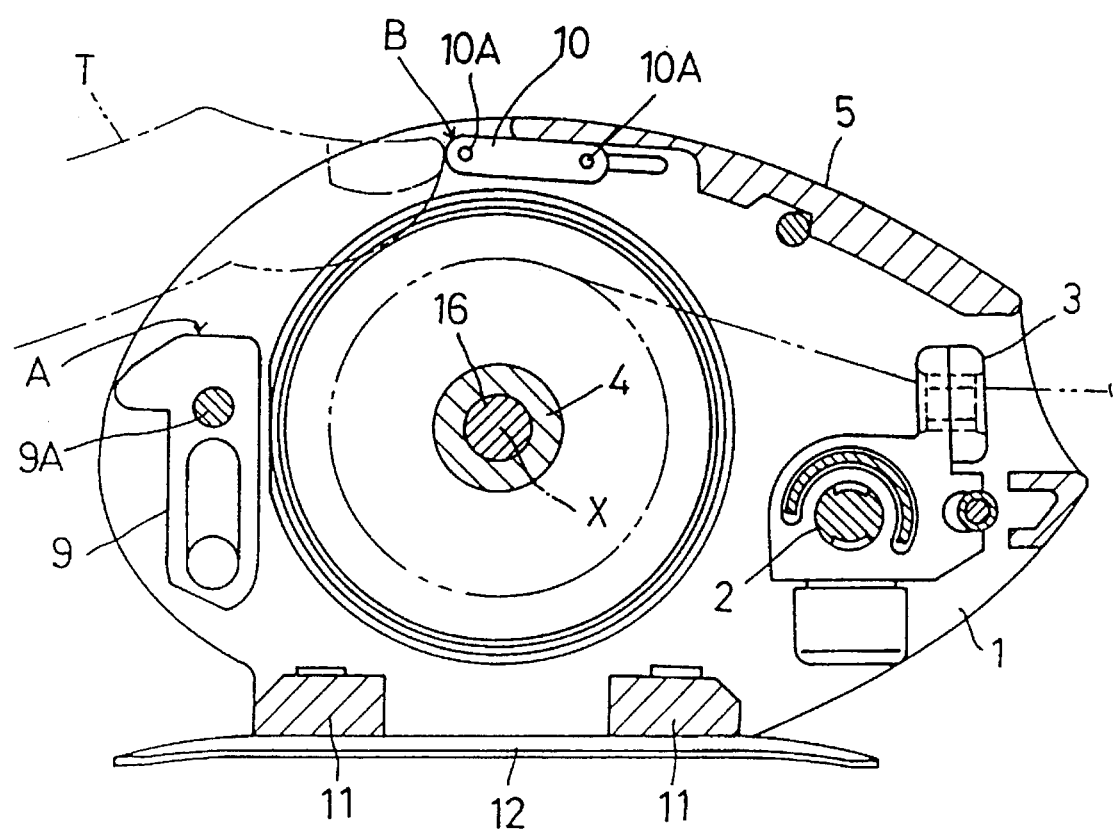
FIG. 42 is a side view in vertical section of the reel of the embodiment of FIG. 41.
Figure 44A:
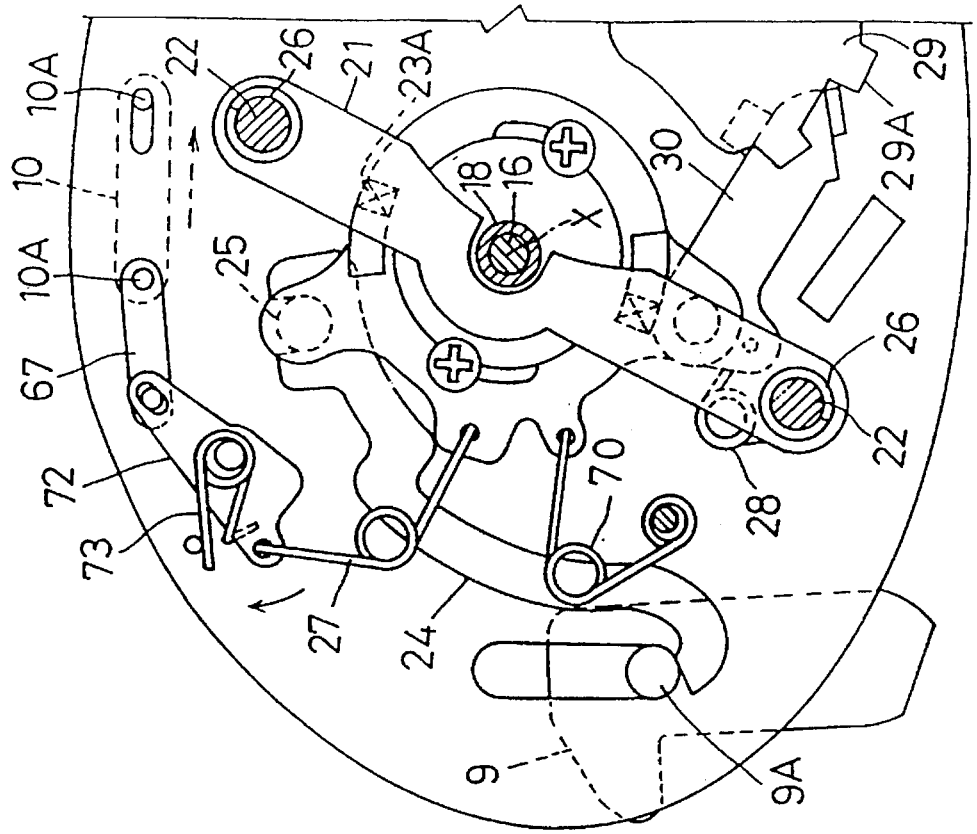
FIG. 44(a) is a side view of the clutch control system in an engaged condition relating to the embodiment of FIG. 41.
Figure 44B:
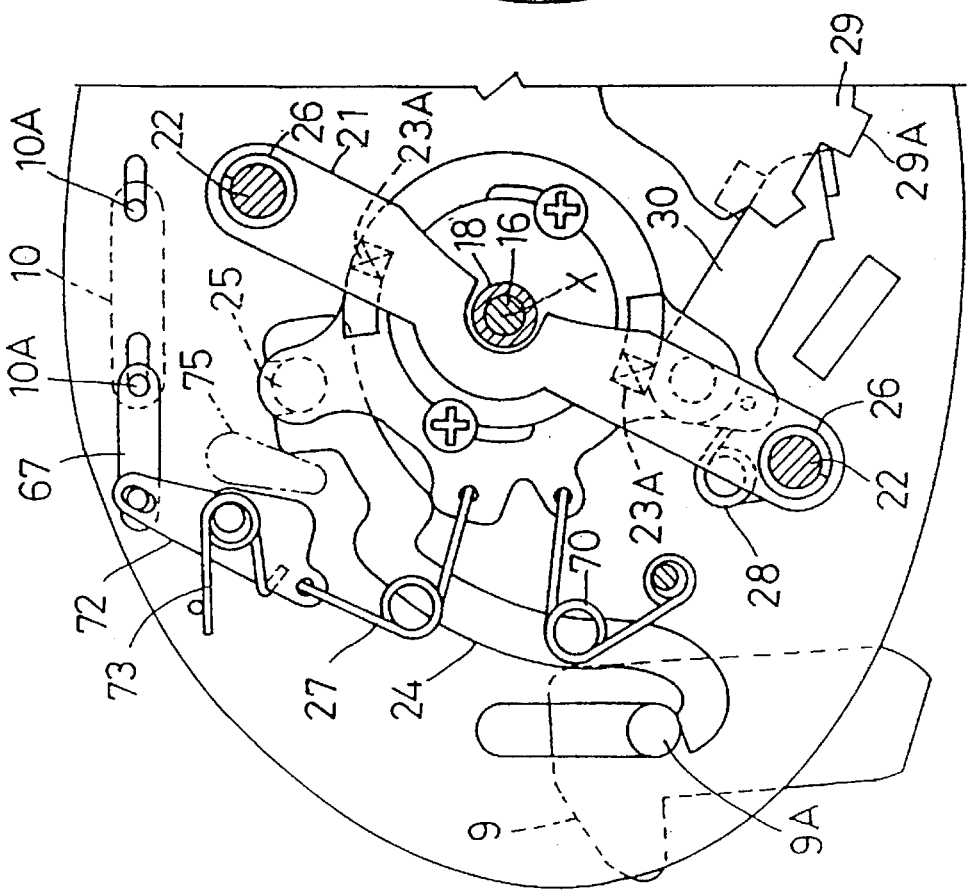
FIG. 44(b) is a side view of the clutch control system relating to the embodiment of FIG. 41 showing a condition of the system immediately after an operation of a control portion.
Figure 45:
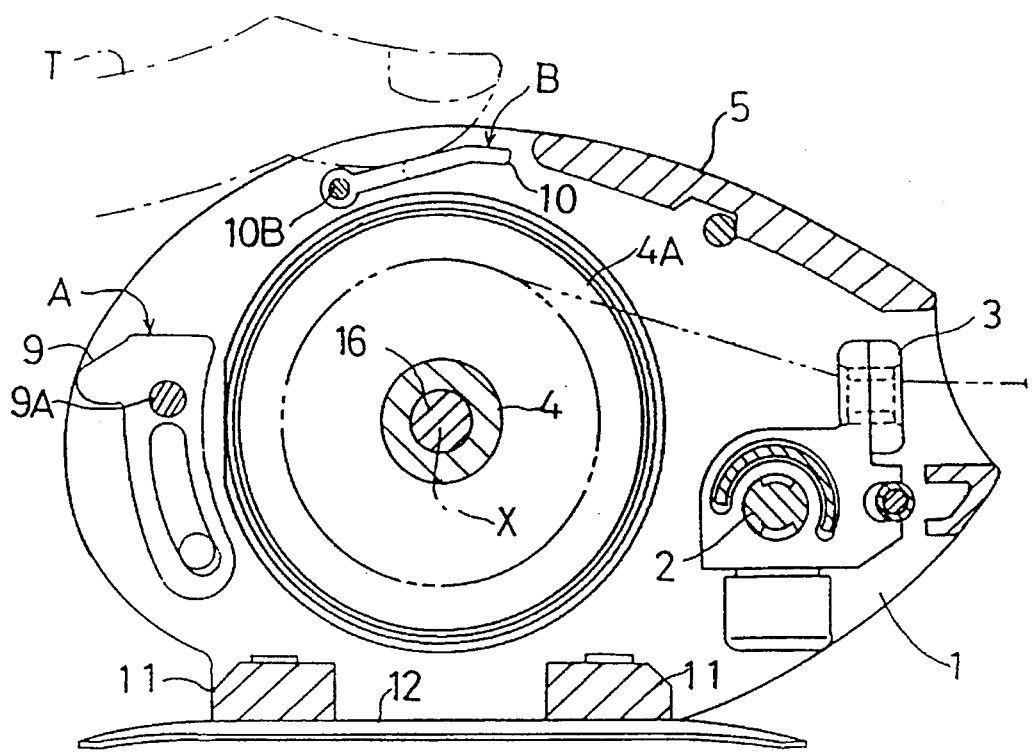
FIG. 45 is a side view in vertical section showing a reel relating to a still further embodiment of the invention.
Figure 46:
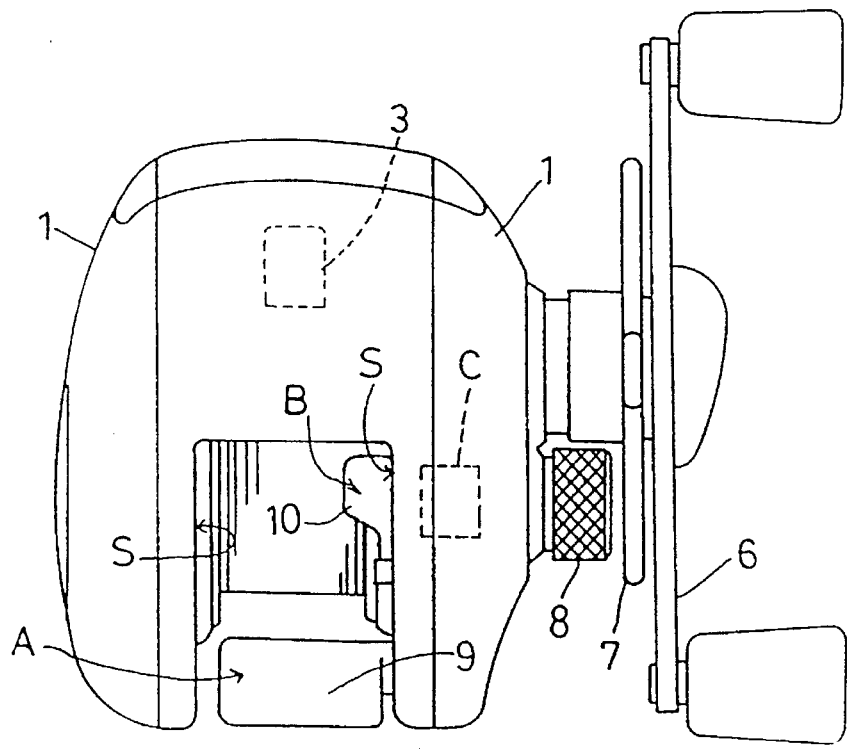
FIG. 46 is a plane view of the reel of the embodiment of FIG. 45.

Then, in use of this reel, as shown in FIG. 41, while keeping the thumb T of one hand inserted between the disengaging portion A and the engaging portion B, the angler grips a grip 31 of the rod. For disengaging the clutch mechanism C for e.g. a casting operation, by downwardly pressing the disengaging portion A, as shown in FIG. 44(b), the control force from the pin 9A formed on the disengaging member 9 causes the rotary cam 23 to reach its disengaging position, and the rotary cam 23 is maintained at this position by the urging force of the toggle spring 27 and also the clutch mechanism C is maintained at the disengaged position.

Next, the angler casts the lure and effects a thumbing with the thumb T on the flange portion 4A of the spool 4 and if the angler feels a fish bite immediately after landing of the lure, he/she shifts the thumbing thumb T slightly forwardly, whereby the control member 72 reaches the inoperative posture. This releases the urging force of the toggle spring 27, whereby the rotary cam 23 reaches the engaging position by the urging force of the return spring 70. With release of the operating force on the engaging portion B, the control member 72 is returned to the operative posture by the urging force of the setting spring 73 and the rotary cam 23 is maintained at the engaging position by the urging force of the toggle spring 27.

With this reel, when the control member 72 is maintained at the inoperative posture by an operation of the mode lever 63, the clutch mechanism C remains disengaged only while the disengaging portion A is kept depressed. Then, with release of this depressing force, the clutch mechanism C is returned to the engaged position, whereby a flipping mode fishing is possible. Further, if this flipping mode is selected, the engaging portion B reaches the position to be covered by the thumb rest 5 in the plane view, thereby to allow visual confirmation of the mode.

Incidentally, in this embodiment, in place of the toggle spring 27 and the return spring 70 of the spiral type, compression type coil springs may be used without modifying the rest of the construction. Further, with a slight modification of the construction, pull type coil springs may be employed also.

(o) FIGS. 45 through 48 show a still further embodiment of the present invention, a disengaging portion A is formed on a disengaging member 7 disposed rearwardly of the spool 4 to be vertically operable. An engaging portion B is formed on an engaging member 10 pivotably supported to a face S of opposed faces S, S of right and left frames 1 which side frame accommodates a clutch mechanism C therein.

A yoke 21 slidably supported along a pair of support shafts is urged by compression springs 26 in a clutch engaging direction. Further, there is provided a clutching plate 90 acting as an operational member having cam faces 90A, 90A contactable with the yoke 21 to operate this yoke 21 in a clutch disengaging direction. Further, a toggle spring 27 is provided for retaining the clutch plate 90 (i.e. the operational member) at either a clutch engaging position or a clutch disengaging position.

Figure 47:
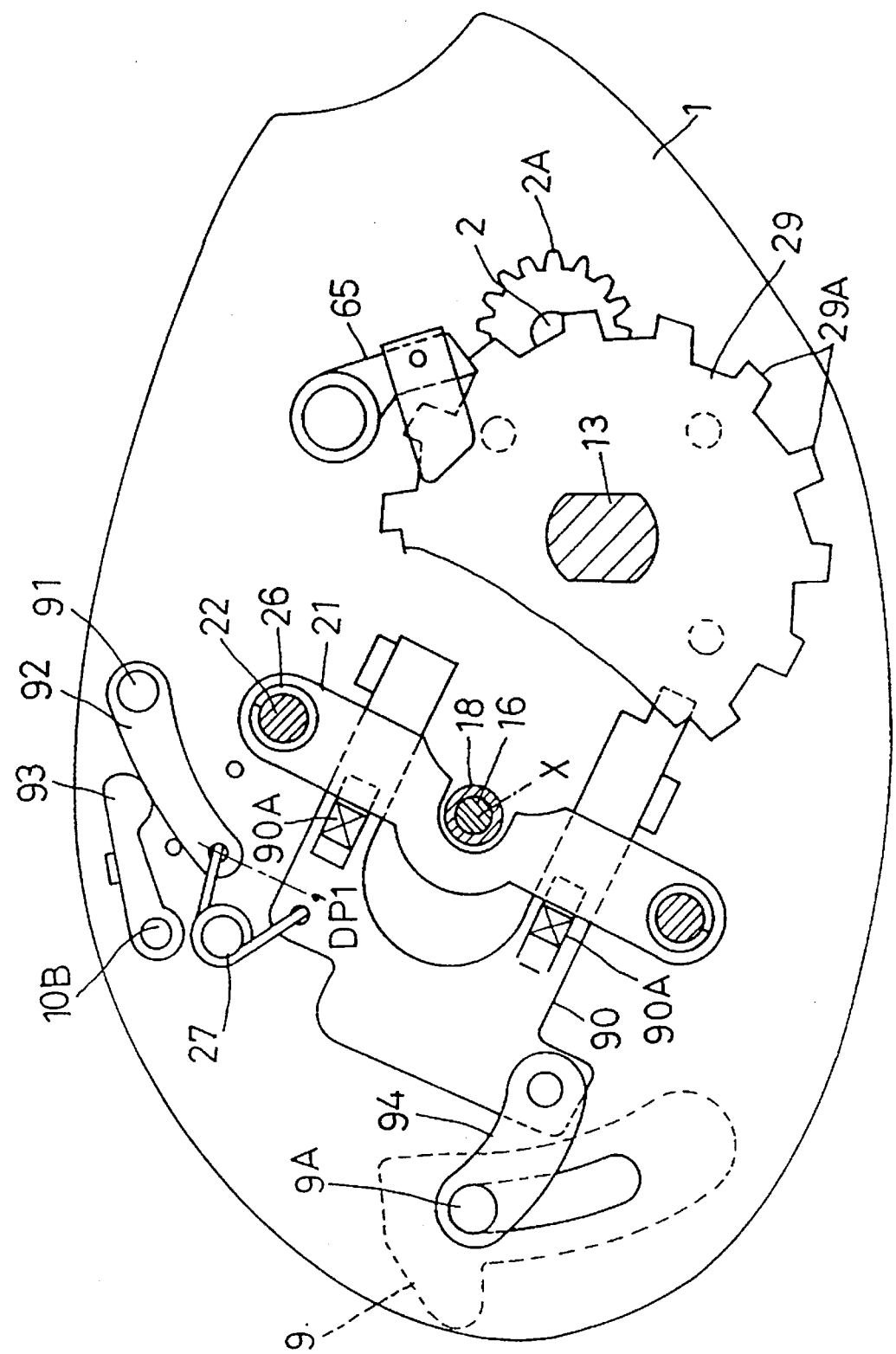
FIG. 47 is a side view of a clutch control system relating to the embodiment of FIG. 45.
Figure 48A:
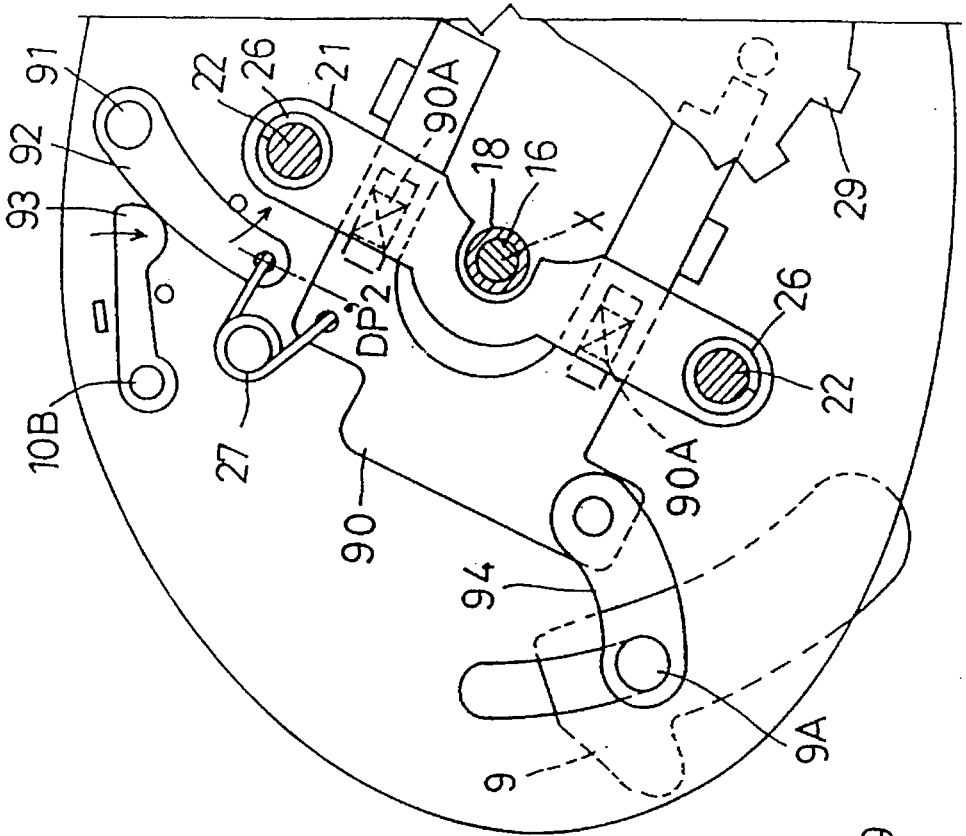
FIG. 48(a) is a side view of the clutch control system in a disengaged condition relating to the embodiment of FIG. 45.
Figure 48B:
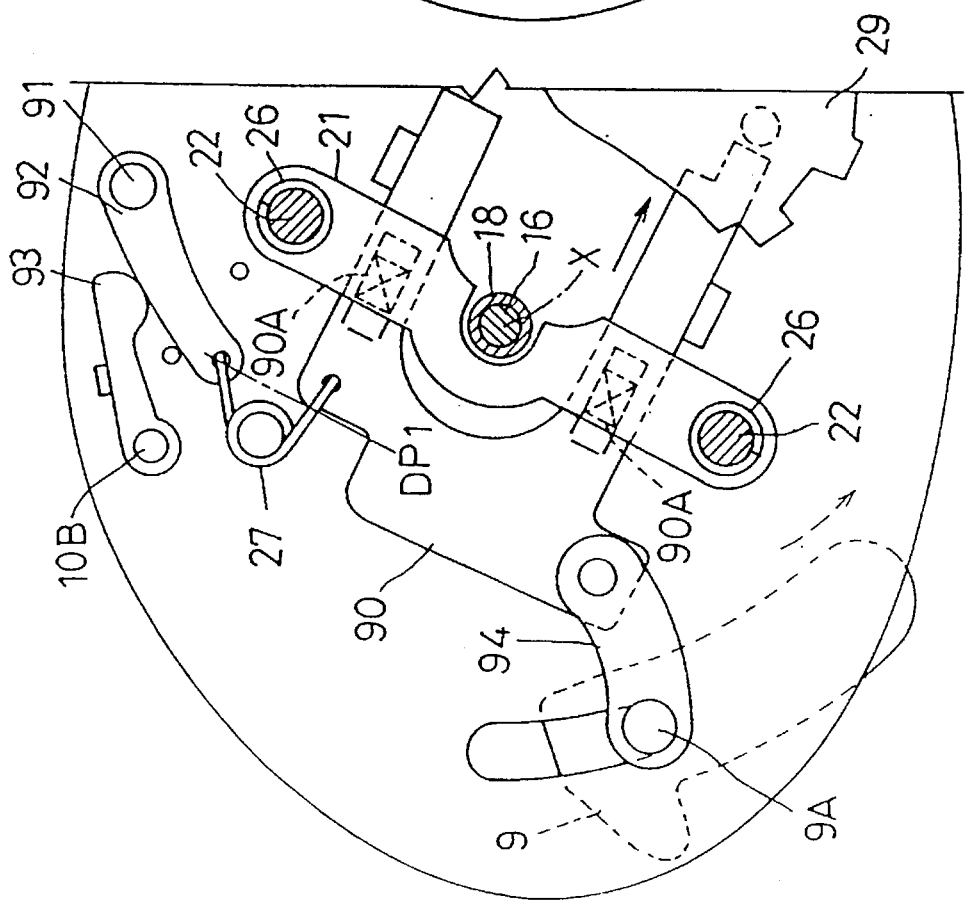
FIG. 48(b) is a side view of the clutch control system relating to the embodiment of FIG. 45 showing a condition of the system immediately after an operation of an engaging portion.

As shown in FIG. 47 and 48(a), one end of the toggle spring 27 is supported to a pivot arm 92 pivotably supported to the frame 1 via a shaft 91. Then, when this pivot arm 92 is set to a retaining position as shown, a dead point of the toggle spring 27 is set to an intermediate position between an engaging position and a disengaging position of the toggle spring 27 on the side of the clutching plate 90, thereby to retain this clutching plate at either the engaged position or the disengaged position (this dead point will be referred to as a dead point DP1' hereinafter). Further, when the pivot arm 92 is set to the return posture, as shown in FIG. 48(b), the dead point of the toggle spring 27 is displaced to a position for returning the clutching plate 90 to its engaged position, whereby this clutching plate 90 is operated to the engaged position (this dead point will be referred to as a dead point DP2' hereinafter).

As shown in FIG. 48(a), when the engaging member 10 is downwardly operated, a contact member 93 pivotable with this engaging member 10 about its axis 10B is brought into contact with the pivot arm 92, whereby the pivot arm 92 may be operated from the retaining posture to the return posture.

Then, for disengaging the clutch mechanism C, by downwardly depressing the disengaging portion A, the force transmitted to the link 94 from the pin 9A formed on the disengaging member 9 causes the clutching plate 90 to reach the disengaged position. With this, as the pivot of the toggle spring 27 on the side of the clutching plate is moved beyond the dead point DP1' to the clutch disengaging side, this disengaged position is maintained by the urging force of the toggle spring 27 and the clutch mechanism C too is retained at its disengaged position.

Next, when the angler casts the lure, thumbs the flange portion 4A of the spool 4 with the thumb T and then feels a fish bite immediately after landing of the lure, the angler moves the thumb T contacting the engaging member 10 slightly downwardly, whereby the pivot arm 92 is rendered into the return posture. Then, as the dead point DP2' of the toggle spring 27 is displaced to a position beyond the pivot of this toggle spring 27 on the side of the clutching plate; then, the clutching plate 90 reaches its engaged position by the urging force of this toggle spring 27. With release of the force on the engaging portion B, the pivot arm 92 is returned to the operative posture by the urging force of the toggle spring 27. Then, with the urging force of the toggle spring 27, the clutching plate 90 is maintained at the engaged position and further the dead point of the toggle spring 27 too is returned to the dead point DP1'.

Incidentally, the disposing position of the pivot shaft 91 and the arm length of the pivot arm 92 is set so that the pivot arm 92 may be returned to the retaining posture by the urging force of the toggle spring 27 when the operating force on the engaging member 10 is released.

(p) The disengaging portion A may be disposed at any other position than the position rearwardly of the spool 4. For instances the portion A may be formed on the upper face of the frame 1 which accommodates the clutch mechanism C.

(q) As to the construction for operating the operational member to the clutch engaging position by the urging force of the return spring 70, in addition to the described construction in which the urging force of the toggle spring 27 is canceled, a further construction is conceivable in which the urging force of the toggle spring is reduced by the urging force of the return spring.

(r) The toggle spring 27 may be replaced by e.g. a compression type coil spring.

Figure 49:
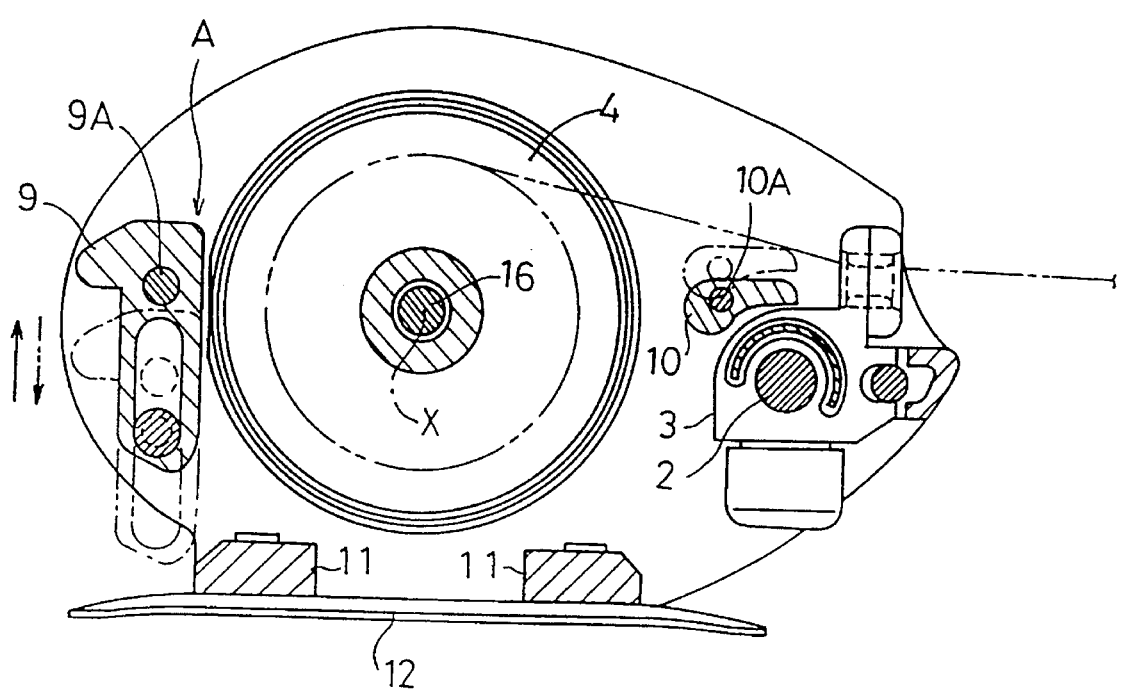
FIG. 49 is a side view in vertical section showing a reel relating to a still further embodiment of the invention.
Figure 50:
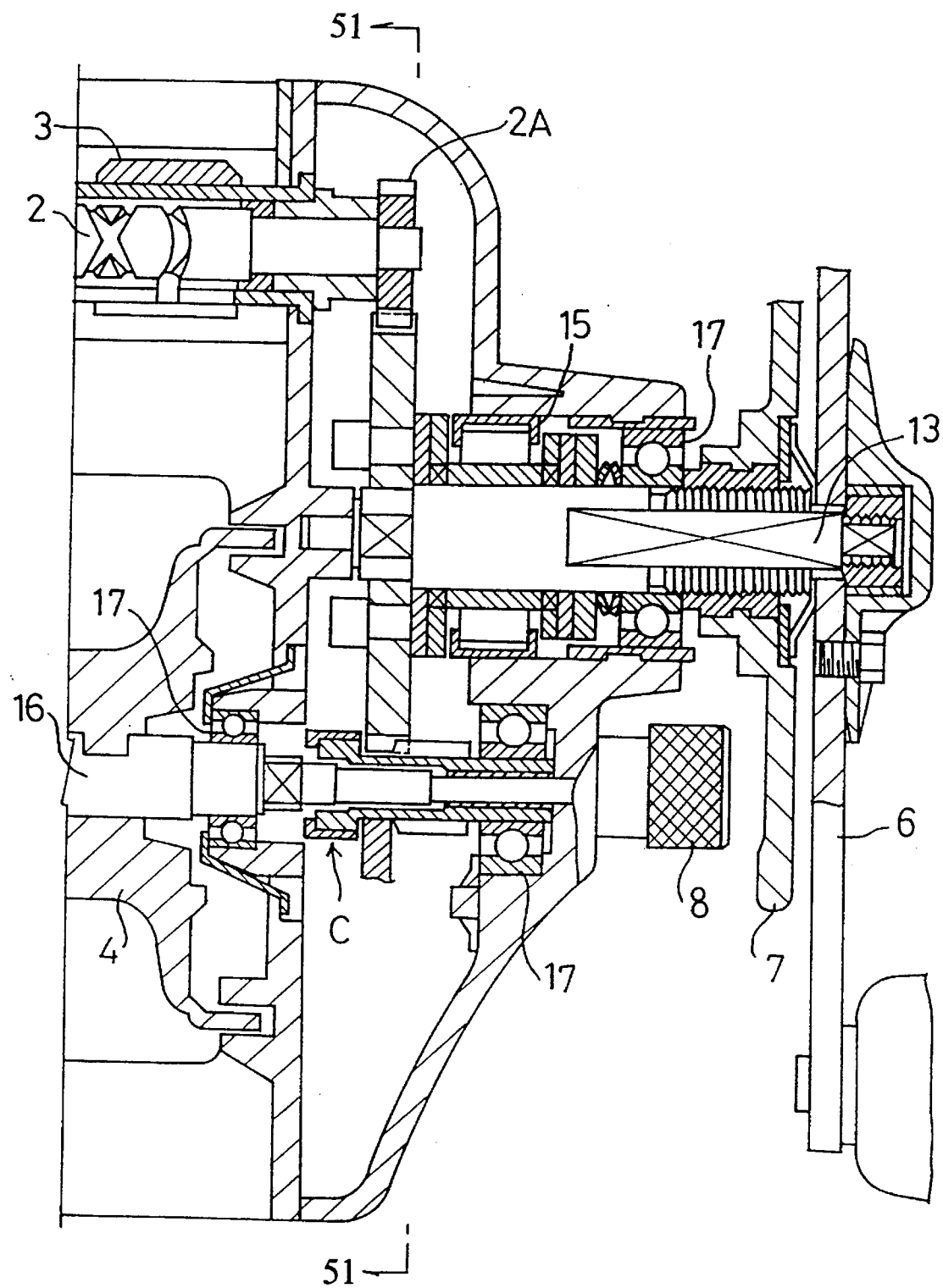
FIG. 50 is a section showing a right side portion of the reel relating to the embodiment of FIG. 49.
Figure 51:
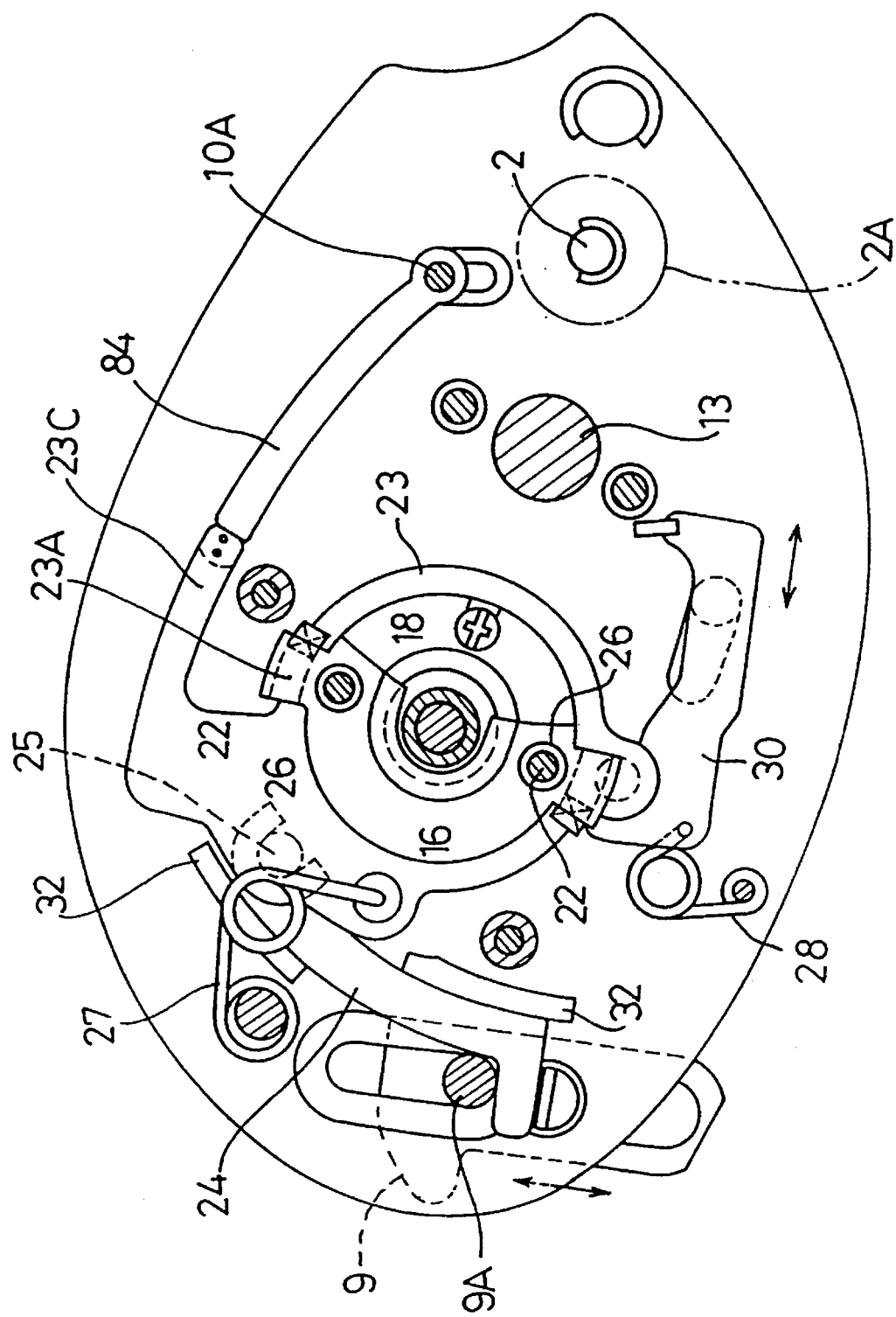
FIG. 51 is a section taken along a line 51—51 in FIG. 50.

(s) In the case of a reel equipped with a reel having a relatively small diameter, as shown in FIGS. 49 through 51 (the same components and constructions are denoted with the same reference marks and numerals), the disengaging member 9 and the engaging member 10 may be disposed forwardly and rearwardly of the spool respectively with a distance therebetween.

These disengaging member 9 and the engaging member 10 are supported via respective pins 9A, 10A to the frames 1, 1 to be vertically movable relative to the frames. The engaging member 10 is disposed between the spool 4 and the worm shaft 2 upwardly of the worm shaft 2 and downwardly of the fishing line. Further, the upper surface of this engaging member 10 is formed flat so as to facilitate placing of a thumb thereon.

The control of the clutch mechanism C is effected by a rotary cam 23 and a return arm 30 disposed outwardly of the cam. The rotary cam 23 projects radially outward about a spool shaft 16 and includes an arm portion 23C extending toward a handle shaft 13. On a leading end of this arm portion 23C, there is fixedly mounted a link member 84. This link member 84 extends in the form of an arc from an upper position of the handle shaft 13 toward a level wind mechanism. A leading end of the link member 84 is engaged with the pin 10A of the engaging member 10. Further, to the rotary cam 23, one end of the toggle spring 27 is retained and the other end of the spring 27 is retained to the frame 1. Then, by this toggle spring 27, the disengaging member 9 and the engaging member 10 may be retained at the respective upper and lower positions thereof (i.e. the clutch disengaged and disengaged positions).

With this construction too, the engaging operation and the disengaging operation of the clutch mechanism may be effected in a comfortable manner and the engaging operation of the clutch mechanism is possible without detaching the thumb or finger used for a thumbing operation.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which become within the meaning and range of equivalency of the claims are therefore intended to be embraced therein.

What is claimed is:

1. A baitcasting reel comprising:

a spool;

right and left frames rotatably supporting said spool therebetween; and a clutch mechanism for selectively allowing, when disengaged, free rotation of said spool and transmitting, when engaged, a drive force from a handle to the spool, said clutch mechanism being disengaged and engaged respectively by a disengaging portion and an engaging portion disposed distantly from each other;

wherein said engaging portion is disposed above said spool and said disengaging portion is disposed rearwardly of said spool with a distance between said engaging portion and said disengaging portion allowing insertion of a thumb or finger therebetween, both of said engaging and disengaging portions being disposed between said right and left frames at an outer periphery of said spool to face said spool, said engaging and disengaging portions and said clutch mechanism being interconnected so that said clutch mechanism is disengaged by a downward operation of said disengaging portion while said clutch mechanism is engaged by a forward operation of said engaging portion; and wherein said engaging portion is disposed between said spool and a thumb rest extending between upper faces of said right and left frames, said engaging portion projecting rearwardly from a rear end of said thumb rest when said clutch mechanism is disengaged and being covered by said thumb rest when said clutch is engaged.

2. A baitcasting reel as defined in claim 1, wherein said engaging portion is formed on an engaging member, said engaging member including a control piece of an upper surface thereof, said thumb rest defining a through hole through which said control piece extends, said through hole having a hooked shape which defines a use position and a non-use position of the engaging member, said non-use position being spaced transversely from said use position:

wherein, when said engaging member is in said use position, the shape of said through hole allows forward and backward movement of said engaging member, and when said engaging member is in said non-use position, the shape of said through hole prevents forward and backward movement of said engaging member.

3. A baitcasting reel comprising:

a spool;

right and left frames rotatably supporting said spool therebetween; and a clutch mechanism for selectively allowing, when disengaged, free rotation of said spool and transmitting, when engaged, a drive force from a handle to the spool, said clutch mechanism being disengaged and engaged respectively by a disengaging portion and an engaging portion disposed distantly from each other;

wherein said engaging portion is disposed above said spool and said disengaging portion is disposed rearwardly of said spool with a distance between said engaging portion and said disengaging portion allowing insertion of a thumb or finger therebetween, both of said engaging and disengaging portions being disposed between said right and left frames at an outer periphery of said spool to face said spool; and wherein said clutch mechanism is engaged with a forward operation of said engaging portion, and said engaging portion is disposed between said spool and a thumb rest extending between upper faces of said right and left frames, said engaging portion projecting rearwardly from a rear end of said thumb rest when said clutch mechanism is disengaged.

4. A baitcasting reel comprising:

a spool;

right and left frames rotatably supporting said spool therebetween; and a clutch mechanism for selectively allowing, when disengaged, free rotation of said spool and transmitting, when engaged, a drive force from a handle to the spool, said clutch mechanism being disengaged and engaged respectively by a disengaging portion and an engaging portion disposed distantly from each other;

wherein said engaging portion is disposed above an outer periphery of said spool in the vicinity of a thumb rest extending between upper faces of said right and left frames and said disengaging portion is disposed rearwardly of said spool between said right and left frames with a distance between said engaging portion and said disengaging portion allowing insertion of a thumb or finger therebetween, said engaging portion and disengaging portion facing said spool.

5. A baitcasting reel as defined in claim 4, wherein said engaging portion is disposed between said thumb rest and said spool and extending between said upper faces of said right and left frames such that a part of said engaging portion is covered by said thumb rest.

6. A baitcasting reel as defined in claim 4, wherein said engaging portion projects rearwardly from a rear end of said thumb rest when said clutch mechanism is disengaged.

7. A baitcasting reel as defined in claim 4, wherein said engaging portion is slidable along a bottom face of said thumb rest extending between said upper faces of said right and left frames.

8. A baitcasting reel as defined in claim 4, wherein the path of movement of said engaging portion along a lower face of said thumb rest is an arc drawn about a rotational axis of said spool.

9. A baitcasting reel as defined in claim 4, wherein said disengaging portion, said engaging portion and said clutch mechanism are interconnected so that the clutch mechanism is disengaged by a downward operation of the disengaging portion while the clutch mechanism is engaged by a forward operation of the engaging portion.

10. A baitcasting reel comprising:

a spool;

right and left frames rotatably supporting said spool therebetween; and a clutch mechanism for selectively allowing, when disengaged, free rotation of said spool and transmitting, when engaged, a drive force from a handle to the spool, said clutch mechanism being disengaged and engaged respectively by a disengaging portion and an engaging portion disposed distantly from each other;

wherein said engaging portion is disposed above an outer periphery of said spool and said disengaging portion is disposed rearwardly of said spool with a distance between said engaging portion and said disengaging portion allowing insertion of a thumb or finger therebetween, said engaging portion and disengaging portion being disposed between said right and left frames and facing said spool, said engaging portion moving along a rotational path with respect to a center of said spool.

11. A baitcasting reel as defined in claim 10, wherein said rotational path is located inwardly of an outer periphery of said frames.

* * * * *